US010650052B2

(12) United States Patent
Van Os et al.

(10) Patent No.: US 10,650,052 B2
(45) Date of Patent: May 12, 2020

(54) COLUMN INTERFACE FOR NAVIGATING IN A USER INTERFACE

(71) Applicant: Apple Inc., Cupertino, CA (US)

(72) Inventors: Marcel Van Os, San Francisco, CA (US); Joe Howard, San Jose, CA (US); Joshua McGlinn, Mooresville, NC (US); Jonathan Lochhead, Scotts Valley, CA (US); Benjamin W. Keighran, Menlo Park, CA (US); William M. Bachman, San Jose, CA (US); Elbert D. Chen, Cupertino, CA (US); Jeffrey L. Robbin, Los Altos, CA (US); Jennifer L. C. Folse, San Francisco, CA (US); Lynne Kress, San Jose, CA (US)

(73) Assignee: Apple Inc., Cupertino, CA (US)

(*) Notice: Subject to any disclaimer, the term of this patent is extended or adjusted under 35 U.S.C. 154(b) by 606 days.

(21) Appl. No.: 14/746,095

(22) Filed: Jun. 22, 2015

(65) Prior Publication Data

US 2015/0370920 A1 Dec. 24, 2015

Related U.S. Application Data

(60) Provisional application No. 62/016,599, filed on Jun. 24, 2014.

(51) Int. Cl.
*G06F 3/0484* (2013.01)
*G06F 3/0482* (2013.01)
(Continued)

(52) U.S. Cl.
CPC ...... *G06F 16/90328* (2019.01); *G06F 3/0482* (2013.01); *G06F 3/0488* (2013.01); *G06F 3/04842* (2013.01)

(58) Field of Classification Search
CPC .... G06F 3/0482; G06F 3/0481; G06F 3/0488; G06F 3/0484
See application file for complete search history.

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

CN 101465993 6/2009
JP 2000-163031 A 6/2000
(Continued)

OTHER PUBLICATIONS

TW Search Report dated Nov. 25, 2016, for TW Application No. 104120385, with English translation, two pages.
(Continued)

*Primary Examiner* — Sang H Kim
(74) *Attorney, Agent, or Firm* — Kubota & Basol LLP

(57) ABSTRACT

The invention is directed to an electronic device. The electronic device provides, for display on a display device, a user interface including a first set of columns, two or more columns in the first set of columns each including two or more menu items. The electronic device receives a selection input. In response to receiving the selection input, in accordance with a determination that the selection input corresponds to selection of a first column the electronic device provides, for display on the display device, a second set of columns, two or more of the columns in the second set of columns corresponding to different subsets of menu items that were displayed in the first column that was selected in response to the selection input.

69 Claims, 89 Drawing Sheets

(51) Int. Cl.
*G06F 16/9032* (2019.01)
*G06F 3/0488* (2013.01)

(56) References Cited

U.S. PATENT DOCUMENTS

| | | | |
|---|---|---|---|
| 5,596,373 | A | 1/1997 | White et al. |
| 5,825,352 | A | 10/1998 | Bisset et al. |
| 5,835,079 | A | 11/1998 | Shieh |
| 5,880,411 | A | 3/1999 | Gillespie et al. |
| 5,886,690 | A | 3/1999 | Pond et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,405,371 | B1 | 6/2002 | Oosterhout et al. |
| 6,487,722 | B1 | 11/2002 | Okura et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,241,121 | B2 | 1/2016 | Rudolph |
| 9,774,917 | B1 | 9/2017 | Christie et al. |
| 10,200,761 | B1 | 2/2019 | Gregory et al. |
| 2002/0060750 | A1 | 5/2002 | Istvan et al. |
| 2002/0112239 | A1 | 8/2002 | Goldman |
| 2002/0144269 | A1 | 10/2002 | Connelly |
| 2003/0005445 | A1 | 1/2003 | Schein et al. |
| 2003/0011641 | A1* | 1/2003 | Totman ................. G06F 3/0482 715/810 |
| 2003/0088872 | A1 | 5/2003 | Maissel et al. |
| 2003/0093790 | A1 | 5/2003 | Logan et al. |
| 2003/0167471 | A1 | 9/2003 | Roth et al. |
| 2006/0020904 | A1* | 1/2006 | Aaltonen ................. G06F 3/048 715/850 |
| 2006/0197753 | A1 | 9/2006 | Hotelling |
| 2006/0224987 | A1* | 10/2006 | Caffarelli ............. G06F 3/0481 715/767 |
| 2007/0028267 | A1* | 2/2007 | Ostojic ............. G06F 17/30058 725/52 |
| 2007/0038957 | A1 | 2/2007 | White |
| 2008/0046928 | A1* | 2/2008 | Poling ................. G06F 3/0482 725/40 |
| 2008/0270886 | A1 | 10/2008 | Gossweiler et al. |
| 2008/0307343 | A1 | 12/2008 | Robert et al. |
| 2009/0178083 | A1 | 7/2009 | White et al. |
| 2009/0322962 | A1 | 12/2009 | Weeks |
| 2009/0327952 | A1* | 12/2009 | Karas ................. G06F 3/0485 715/786 |
| 2010/0100899 | A1 | 4/2010 | Bradbury et al. |
| 2010/0153999 | A1* | 6/2010 | Yates ................. H04N 5/44543 725/39 |
| 2011/0289421 | A1* | 11/2011 | Jordan ................. G06F 17/3002 715/739 |
| 2011/0296351 | A1* | 12/2011 | Ewing, Jr. ............. G06F 3/0346 715/841 |
| 2012/0110621 | A1* | 5/2012 | Gossweiler, III ...... G06Q 50/01 725/46 |
| 2012/0216117 | A1* | 8/2012 | Arriola ................. G06F 3/0482 715/716 |
| 2012/0266069 | A1* | 10/2012 | Moshiri ................. G06F 3/0346 715/719 |
| 2014/0344291 | A9* | 11/2014 | Simonson ................. G06F 7/24 707/752 |
| 2015/0195624 | A1 | 7/2015 | Gossweiler, III |
| 2016/0078526 | A1* | 3/2016 | Nations ................. G06Q 30/02 705/27.2 |
| 2019/0058921 | A1 | 2/2019 | Christie |

FOREIGN PATENT DOCUMENTS

| | | |
|---|---|---|
| JP | 2002-342033 A | 11/2002 |
| JP | 2011-512701 A | 4/2011 |
| JP | 2012-095123 A | 5/2012 |
| TW | 200622893 A | 7/2006 |
| TW | 200719204 A | 5/2007 |
| WO | WO-2007/078623 A2 | 7/2007 |
| WO | WO-2015/200227 A1 | 12/2015 |

OTHER PUBLICATIONS

Non-Final Office Action dated May 26, 2017, for U.S. Appl. No. 14/267,671, filed May 1, 2014, seventeen pages.
Non-Final Office Action dated Apr. 1, 2016, for U.S. Appl. No. 14/267,671, filed May 1, 2014, 15 pages.
Final Office Action dated Oct. 26, 2016, for U.S. Appl. No. 14/267,671, filed May 1, 2014, 20 pages.
International Search Report dated Sep. 28, 2015, for PCT Application No. PCT/US2015/037027, filed Jun. 22, 2015, three pages.
Bohn, D. (Jan. 6, 2014). "Rebooting webOS: How LG Rethought the Smart TV," The Verge, located at: http://www.theverge.com/2014/1/6/5279220/rebooting-webos-how-lg-rethought-the-smart-tv, last visited on Jul. 11, 2014, five pages.
Grey, M. (2013). "Comcast's New X2 Platform Moves Your DVR Recordings From the Box to the Cloud," engadget, located at: http://www.engadget.com/2013/06/11/comcast-x2-platform/, last visited on Jul. 11, 2014, two pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
episodecalendar.com, (May 17, 2014). "Keep track of your favorite TV shows!—TV Episode Calendar", retrieved from internet on Oct. 12, 2017, URL: https://web.archive.org/web/20140517060612/https://episodecalendar.com/, published on May 17, 2014 as per Wayback Machine.
Corrected Notice of Allowance received for U.S. Appl. No. 14/267,671, dated Nov. 29, 2018, 3 pages.
Decision to Refuse received for European Patent Application No. 15739075.8, dated Apr. 25, 2019, 18 pages.
Final Office Action received for U.S. Appl. No. 14/267,671, dated May 23, 2018, 17 pages.
Non-Final Office Action received for U.S. Appl. No. 14/267,671, dated Dec. 1, 2017, 18 pages.
Non-Final Office Action received for U.S. Appl. No. 16/108,519, dated Aug. 2, 2019, 10 pages.
Notice of Allowance received for U.S. Appl. No. 14/267,671, dated Sep. 19, 2018, 8 pages.

* cited by examiner

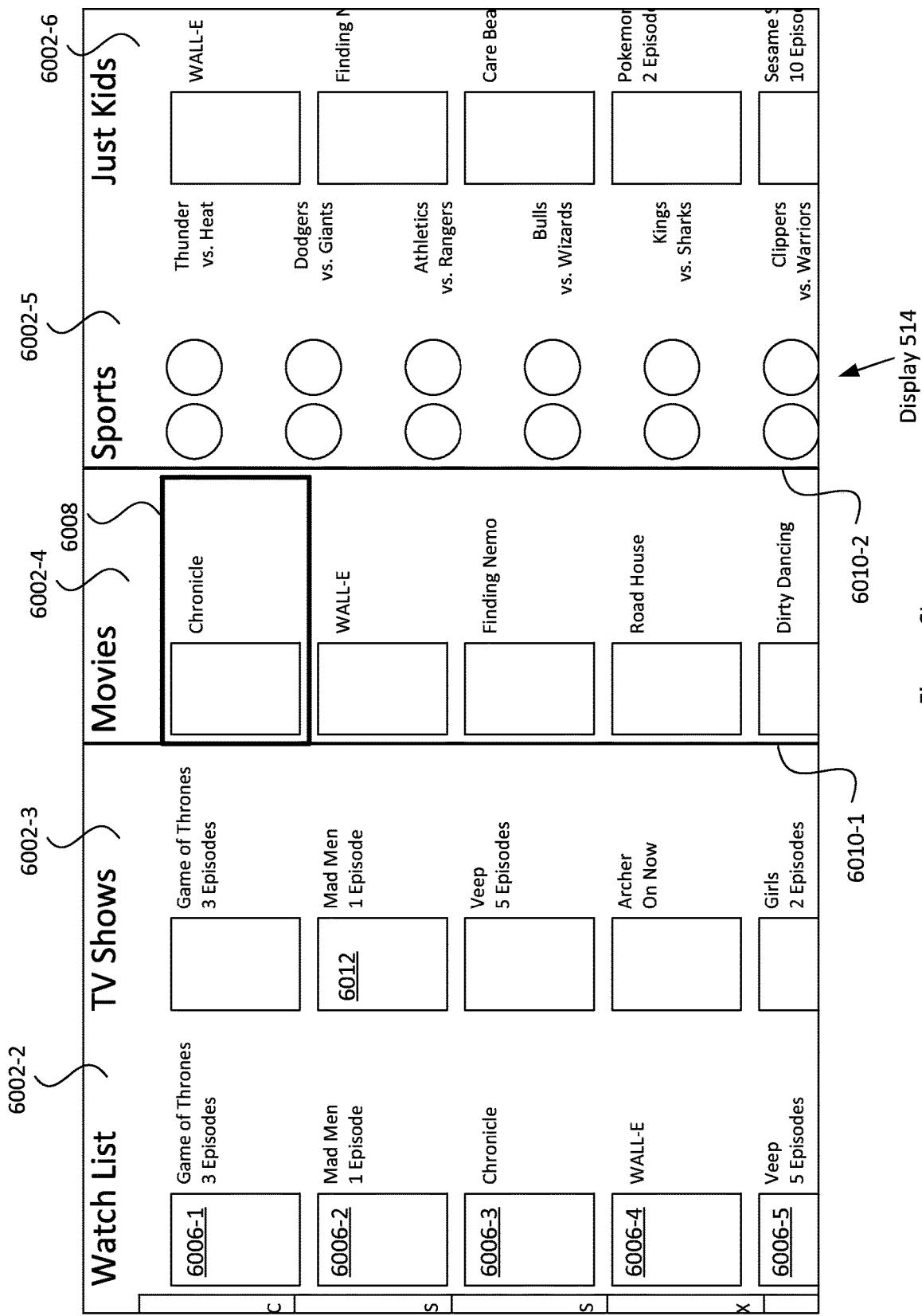

| On Now | | Watch List | | TV Shows | Movies | Sports |
|---|---|---|---|---|---|---|
| 6002-1 | | 6002-2 | | 6002-3 | 6002-4 | 6002-5 |

On Now
- 6004-1 — Top Gear — BBC
- 6004-2 — Downton Abbey — PBS
- 6004-3 — Two Broke Girls — CBS
- 6004-4 — Justified — FX

Watch List
- 6006-1 — Game of Thrones — 3 Episodes
- 6006-2 — Mad Men — 1 Episode
- 6006-3 — Chronicle
- 6006-4 — WALL-E
- 6006-5 — Veep — 5 Episodes

TV Shows
- Mad Men 6020-2, Season 6, Episode 5
- Veep 6020-3, "Chung", Season 1, Episode 4
- "Nicknames", Season 1, Episode 5
- "Baseball", Season 1, Episode 6
- "Full Disclosure", Season 1, Episode 7
- "Tears", Season 1, Episode 8
- Girls 6020-4, "All Adventurous Women Do", Season 1, Episode 3
- "Hannah's Diary"

Movies
- Chronicle
- WALL-E
- Finding Nemo
- Road House
- Dirty Dancing

Sports
- vs.
- vs.
- vs.
- vs.
- vs.
- vs.

Display 514

Figure 6U

| 6022-1 | 6022-2 | 6022-3 | 6022-4 | 6022-5 |

Game of Thrones

6024

"Valar Dohaeris" 6026-1
Season 3, Episode 1
March 31, 2013 6026-2

"Dark Wings, Dark Words"
Season 3, Episode 2
April 7, 2013 6026-3

"Walk of Punishment"
Season 3, Episode 3
April 14, 2013

6032
Mad Men

"The Flood"
Season 6, Episode 5
April 28, 2013

Chronicle
2012
83 minutes

Directed by Josh Trank

Three high school seniors, bullied Andrew, his cousin Matt, and more popular Steve, form a bond after gaining telekinetic abilities from an unknown object.

WALL-E
2008
98 minutes

Directed by Andrew Stanton

The story follows a robot named WALL-E, who is designed to clean up a waste-covered Earth far in the future.

Veep

"Chung"
Season 1, Episode 4
May 13, 2012

"Nicknames"
Season 1, Episode 5
May 20, 2012

"Baseball"
Season 1, Episode 6
May 27, 2012

"Full Disclosure"
Season 1, Episode 7
June 3, 2012

← Display 514

Figure 6V

| 6022-1 | 6022-2 | 6022-3 | 6022-4 | 6022-5 |

Game of Thrones

6024

"Valar Dohaeris" 6026-1
Season 3, Episode 1
March 31, 2013    6026-2

"Dark Wings, Dark
Words"
Season 3, Episode 2
April 7, 2013    6026-3

"Walk of Punishment"
Season 3, Episode 3
April 14, 2013

Mad Men

6032

"The Flood"
Season 6, Episode 5
April 28, 2013

Chronicle
2012
83 minutes

Directed by Josh Trank

Three high school seniors,
bullied Andrew, his
cousin Matt, and more
popular Steve, form a
bond after gaining
telekinetic abilities from
an unknown object.

WALL-E
2008
98 minutes

Directed by Andrew
Stanton

The story follows a robot
named WALL-E, who is
designed to clean up a
waste-covered Earth far
in the future.

Veep

"Chung"
Season 1, Episode 4
May 13, 2012

"Nicknames"
Season 1, Episode 5
May 20, 2012

"Baseball"
Season 1, Episode 6
May 27, 2012

"Full Disclosure"
Season 1, Episode 7
June 3, 2012

Display 514

Figure 6W

Game of Thrones

"Valar Dohaeris"
Season 3, Episode 1
March 31, 2013

"Dark Wings, Dark Words"
Season 3, Episode 2
April 7, 2013

"Walk of Punishment"
Season 3, Episode 3
April 14, 2013

Mad Men

"The Flood"
Season 6, Episode 5
April 28, 2013

Chronicle
2012
83 minutes

Directed by Josh Trank

Three high school seniors, bullied Andrew, his cousin Matt, and more popular Steve, form a bond after gaining telekinetic abilities from an unknown object.

WALL-E
2008
98 minutes

Directed by Andrew Stanton

The story follows a robot named WALL-E, who is designed to clean up a waste-covered Earth far in the future.

Veep

"Chung"
Season 1, Episode 4
May 13, 2012

"Nicknames"
Season 1, Episode 5
May 20, 2012

"Baseball"
Season 1, Episode 6
May 27, 2012

"Full Disclosure"
Season 1, Episode 7
June 3, 2012

Figure 6X

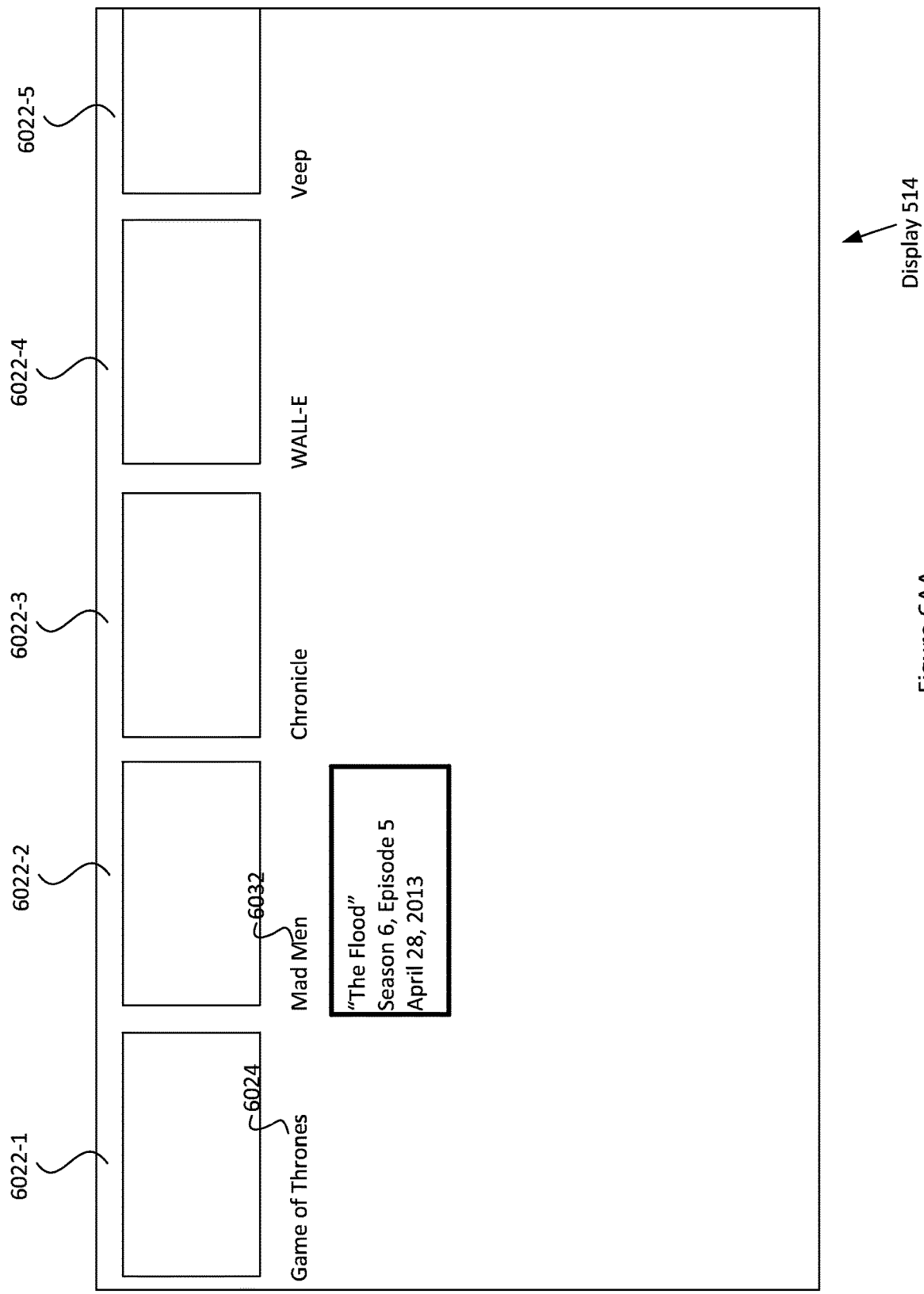

Mad Men

TV-14
AMC
Sundays @ 9pm
6 Seasons

Add Show to Watch List   +
Buy Season    $34.99

6028

Next — 6030-1

Mad Men

"The Flood"
Season 6, Episode 5
April 28, 2013

Season 6   >

Season 1 — 6030-2

"Smoke Gets in Your Eyes"
Season 1, Episode 1
July 19, 2007

"Ladies Room"
Season 1, Episode 2
July 26, 2007

"Marriage of Figaro"
Season 1, Episode 3
August 2, 2007

"New Amsterdam"
Season 1, Episode 4
August 9, 2007

"5G"

← Display 514

Figure 6CC

| ext | Season 1 | Season 2 | Season 3 | Extras |
|---|---|---|---|---|
| 6030-1 | 6030-2 | 6030-3 | 6030-4 | 6030-5 |
| | | | | |
| ad Men | "Smoke Gets in Your Eyes" Season 1, Episode 1 July 19, 2007 | "For Those Who Think Young" Season 2, Episode 1 July 27, 2008 | "Out of Town" Season 3, Episode 1 August 16, 2009 | Jon Hamm Tonight Show |
| he Flood" ason 6, Episode 5 ril 28, 2013 | "Ladies Room" Season 1, Episode 2 July 26, 2007 | "Flight 1" Season 2, Episode 2 August 3, 2008 | "Love Among the Ruins" Season 3, Episode 2 August 23, 2009 | |
| | "Marriage of Figaro" Season 1, Episode 3 August 2, 2007 | "The Benefactor" Season 2, Episode 3 August 10, 2008 | "My Old Kentucky Home" Season 3, Episode 3 August 30, 2009 | Mad Men Parody Saturday Night Live |
| > | "New Amsterdam" Season 1, Episode 4 August 9, 2007 | "Three Sundays" Season 2, Episode 4 August 17, 2008 | "The Arrangements" Season 3, Episode 4 September 6, 2009 | |
| ason 6 | "5G" | "The New Girl" | "The Fog" Season 3, Episode 5 | Christina Hendricks Good Morning Americ |

Display 514

902 While a user interface that includes visual content is displayed on a display, receive a request to display a menu for controlling the visual content that is displayed in the user interface.

904 In response to receiving the request to display the menu, provide, for display on the display device, an updated user interface that includes the menu. The menu includes at least one translucent portion with a first degree of translucency, so that an indication of the visual content in the user interface can be seen through the translucent portion fo the menu in accordance with the first degree of translucency.

906 The menu includes a first set of columns, two or more columns in the first set of columns each including two or more menu items.

908 While the menu with the translucent portion is displayed on the display device, receive a request to perform an operation in the menu.

910 The menu operation is a navigation operation that corresponds to a request to move the menu in a respective direction.

5:45 72°
Monday, April 21 2014

Figure 10A

5:45  72°
Monday, April 21 2014

| On Now | | | | |
|---|---|---|---|---|
| Top Gear<br>BBC | Downton Abbey<br>PBS | Two Broke Girls<br>CBS | Justified<br>FX | |

10004-1

← Display 514

Display 514

10004-3 — TV Shows
- Game of Thrones, 3 Episodes
- Mad Men, 1 Episode
- Veep, 5 Episodes
- Archer, On Now
- Girls, 2 Episodes 10004-2 — Watch List
- Game of Thrones, 3 Episodes
- Mad Men, 1 Episode
- Chronicle
- WALL-E
- Veep, 5 Episodes 10004-1 — On Now
- Top Gear — BBC
- Downton Abbey — PBS
- Two Broke Girls — CBS
- Justified — FX 5:45
Monday, April 21 201

| Mad Men | Next | Season 1 |
|---|---|---|
| | 12002 | "Smoke Gets in Your Eyes"<br>Season 1, Episode 1<br>July 19, 2007 |
| | Mad Men | "Ladies Room"<br>Season 1, Episode 2<br>July 26, 2007 |
| | "The Flood"<br>Season 6, Episode 5<br>April 28, 2013 | "Marriage of Figaro"<br>Season 1, Episode 3<br>August 2, 2007 |
| | | "New Amsterdam"<br>Season 1, Episode 4<br>August 9, 2007 |
| | Season 6 > | "5G" |

TV-14
AMC
Sundays @ 9pm
6 Seasons

Add Show to Watch List +
Buy Season      $34.99

← Display 514

Figure. 12A

Mad Men

TV-14
AMC
Sundays @ 9pm
6 Seasons

Add Show to Watch List  +
Buy Season  $34.99

Next

12004

Mad Men

"For Immediate Release"
Season 6, Episode 6
Airing May 5, 2013
@9pm on A&E

Season 6  >

Season 1

"Smoke Gets in Your Eyes"
Season 1, Episode 1
July 19, 2007

"Ladies Room"
Season 1, Episode 2
July 26, 2007

"Marriage of Figaro"
Season 1, Episode 3
August 2, 2007

"New Amsterdam"
Season 1, Episode 4
August 9, 2007

"5G"

← Display 514

Figure 12B

Mad Men

TV-14
AMC
Sundays @ 9pm
6 Seasons

Add Show to Watch List +
Buy Season $34.99

Next

Mad Men
"Smoke Gets in Your Eyes"
Season 1, Episode 1
July 19, 2007

12006

Season 6 >

Season 1

"Smoke Gets in Your Eyes"
Season 1, Episode 1
July 19, 2007

"Ladies Room"
Season 1, Episode 2
July 26, 2007

"Marriage of Figaro"
Season 1, Episode 3
August 2, 2007

"New Amsterdam"
Season 1, Episode 4
August 9, 2007

"5G"

← Display 514

Figure 12C

| | Next | Season 1 |
|---|---|---|
| | | "Smoke Gets in Your Eyes"<br>Season 1, Episode 1<br>July 19, 2007 |
| | 12008 | "Ladies Room"<br>Season 1, Episode 2<br>July 26, 2007 |
| | Mad Men | "Marriage of Figaro"<br>Season 1, Episode 3<br>August 2, 2007 |
| | "Out of Town"<br>Season 3, Episode 1<br>August 16, 2009 | "New Amsterdam"<br>Season 1, Episode 4<br>August 9, 2007 |
| | Season 6  > | "5G" |

← Display 514

Mad Men

TV-14
AMC
Sundays @ 9pm
6 Seasons

Add Show to Watch List    +
Buy Season    $34.99

Figure 12D

| Mad Men | Next | Season 1 |
|---|---|---|
| | | "Smoke Gets in Your Eyes"<br>Season 1, Episode 1<br>July 19, 2007 |
| | 12010 | "Ladies Room"<br>Season 1, Episode 2<br>July 26, 2007 |
| | Mad Men | "Marriage of Figaro"<br>Season 1, Episode 3<br>August 2, 2007 |
| | "The Flood"<br>Season 6, Episode 5<br>On Now | "New Amsterdam"<br>Season 1, Episode 4<br>August 9, 2007 |
| | Season 6 > | "5G" |
| TV-14<br>AMC<br>Sundays @ 9pm<br>6 Seasons | | |
| Add Show to Watch List +<br>Buy Season        $34.99 | | |

← Display 514

Figure 12E (A)

| |
|---|
| In response to receiving the request, provide a user interface for display on a display that includes information about the content series, including respective contextual information that is based on the release status of the content series. — 1304 |

In accordance with a determination that the release status is a first release status, the respective contextual information is first contextual information provided based on recent release-status activity for the content series. — 1306

> The first contextual information includes an affordance that, when selected, causes an episode of the content series to be provided for display on the display. — 1314

> The first release status is currently releasing, and a most recently released episode is marked as watched. Providing the first contextual information based on recent release-status activity includes providing, for display, a date of a next releasing episode. — 1316

> The first release status is currently releasing, and a most recently released episode is not marked as watched. Providing the first contextual information based on recent release-status activity includes providing an affordance for presenting a most recently released episode of the content series — 1318

> The first release status is currently releasing, and an episode of the content series is currently airing live on a respective channel. Providing the first contextual information based on recent release-status activity includes providing an affordance for providing for display the respective channel on which the episode is currently airing live. — 1320

Figure 13B

| Next | Season 1 |
|---|---|
| | |
| Mad Men | "Smoke Gets in Your Eyes"<br>Season 1, Episode 1<br>July 19, 2007 |
| "The Flood"<br>Season 6, Episode 5<br>April 28, 2013 | "Ladies Room"<br>Season 1, Episode 2<br>July 26, 2007 |
| | "Marriage of Figaro"<br>Season 1, Episode 3<br>August 2, 2007 |
| 14004 | "New Amsterdam"<br>Season 1, Episode 4<br>August 9, 2007 |
| Add Episode to Watch List +<br>Season 6 > | "5G" |

Mad Men

TV-14
AMC
Sundays @ 9pm    14002
6 Seasons

Add Show to Watch List    +
Buy Season    $34.99

← Display 514

COLUMN INTERFACE FOR NAVIGATING IN A USER INTERFACE

CROSS REFERENCE TO RELATED APPLICATIONS

This application claims the benefit of U.S. Provisional Application No. 62/016,599 filed on Jun. 24, 2014, the entire disclosure of which is herein incorporated by reference for all purposes.

FIELD OF THE DISCLOSURE

This relates generally to user interfaces for navigating and displaying content items.

BACKGROUND OF THE DISCLOSURE

Electronic devices that provide a user interface for navigating and displaying content items are often cluttered and confusing for users. Further, bringing up the user interface after viewing video, for example, can be a jarring and unintuitive experience.

SUMMARY OF THE DISCLOSURE

Many electronic devices have graphical user interfaces that allow a user to navigate through numerous content items. There is a need to provide a fast, efficient, and convenient way for users to navigate through and select content items for consumption (e.g., viewing, listening, etc.). The embodiments described below provide a fast, efficient, and convenient way for users to navigate through and select content items for consumption using a column user interface.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 9A-9C are flow diagrams illustrating a method of providing a user interface with translucent portions in accordance with some embodiments.

FIGS. 10A-10F illustrate the gradual display of a column user interface over passive content in accordance with some embodiments of the disclosure.

FIGS. 12A-12E illustrate exemplary user interfaces including intelligent presentation of contextual information for a content series in accordance with some embodiments of the disclosure.

FIGS. 13A-13C are flow diagrams illustrating a method of intelligent presentation of contextual information for a content series in accordance with some embodiments.

FIGS. 14A-14H illustrate exemplary user interfaces for adding both content and non-content items to a watch list in accordance with some embodiments of the disclosure.

DETAILED DESCRIPTION

Figure 1A:
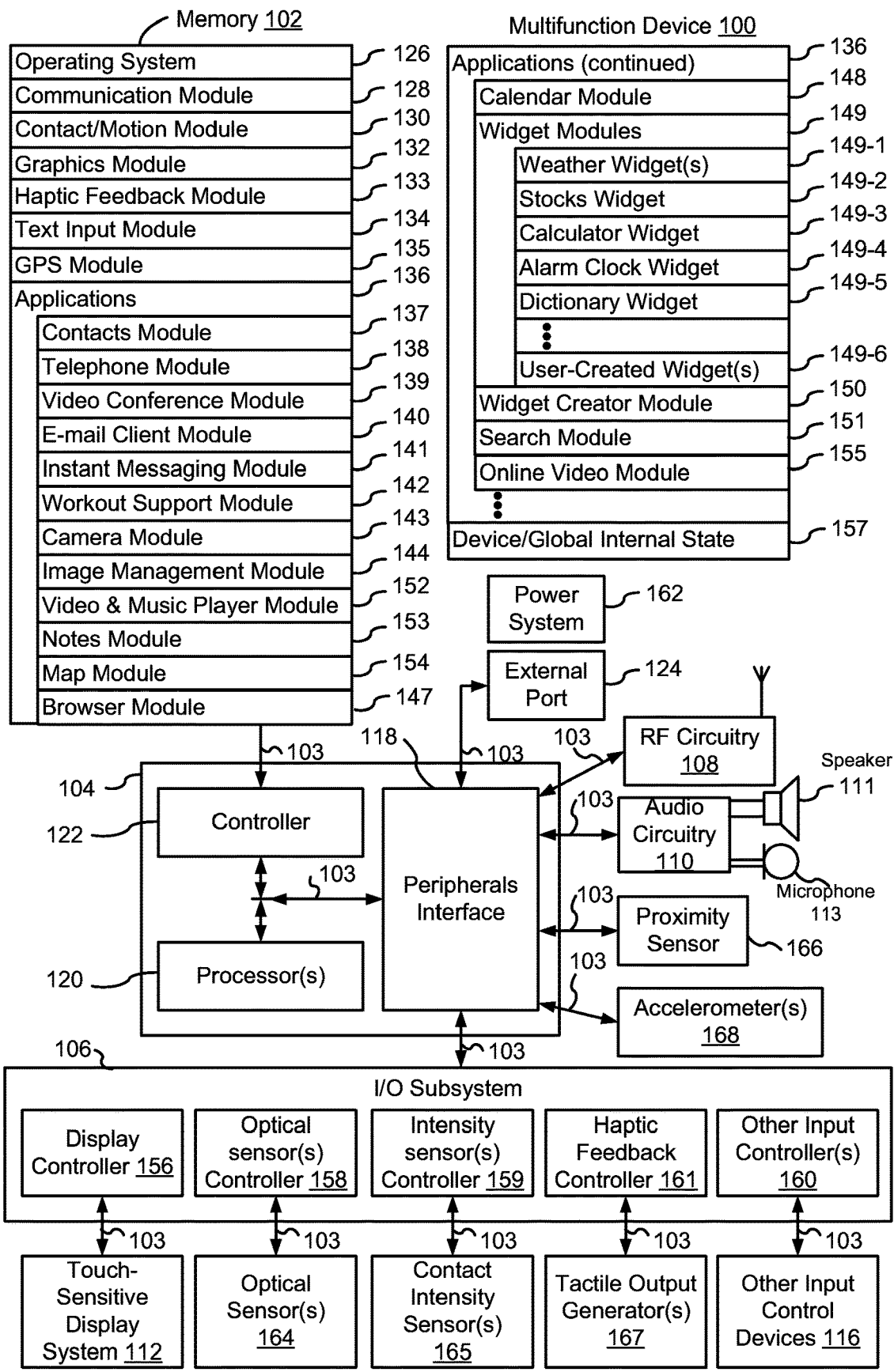
FIG. 1A is a block diagram illustrating a multifunction device with a touch-sensitive display in accordance with some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
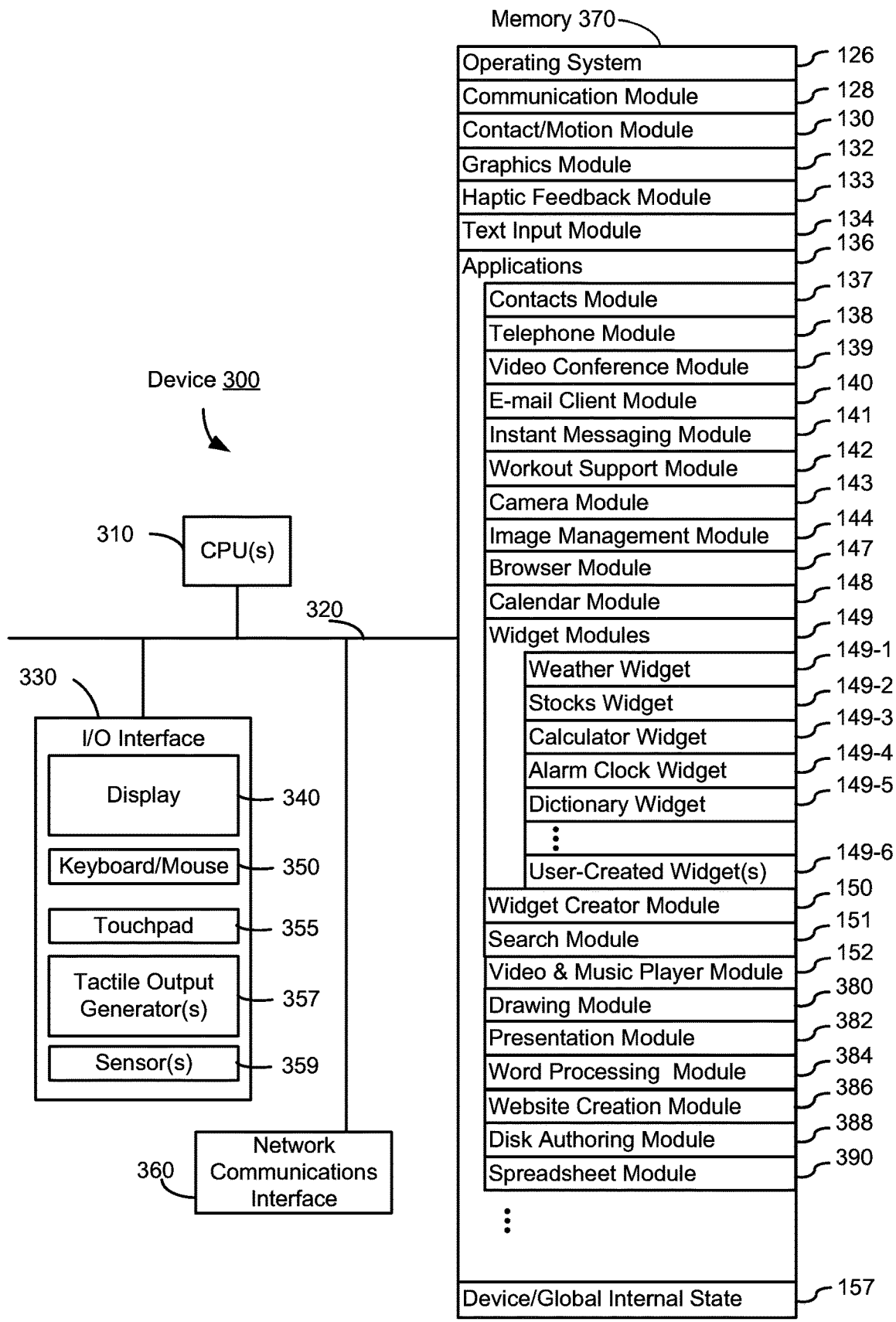
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154;
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
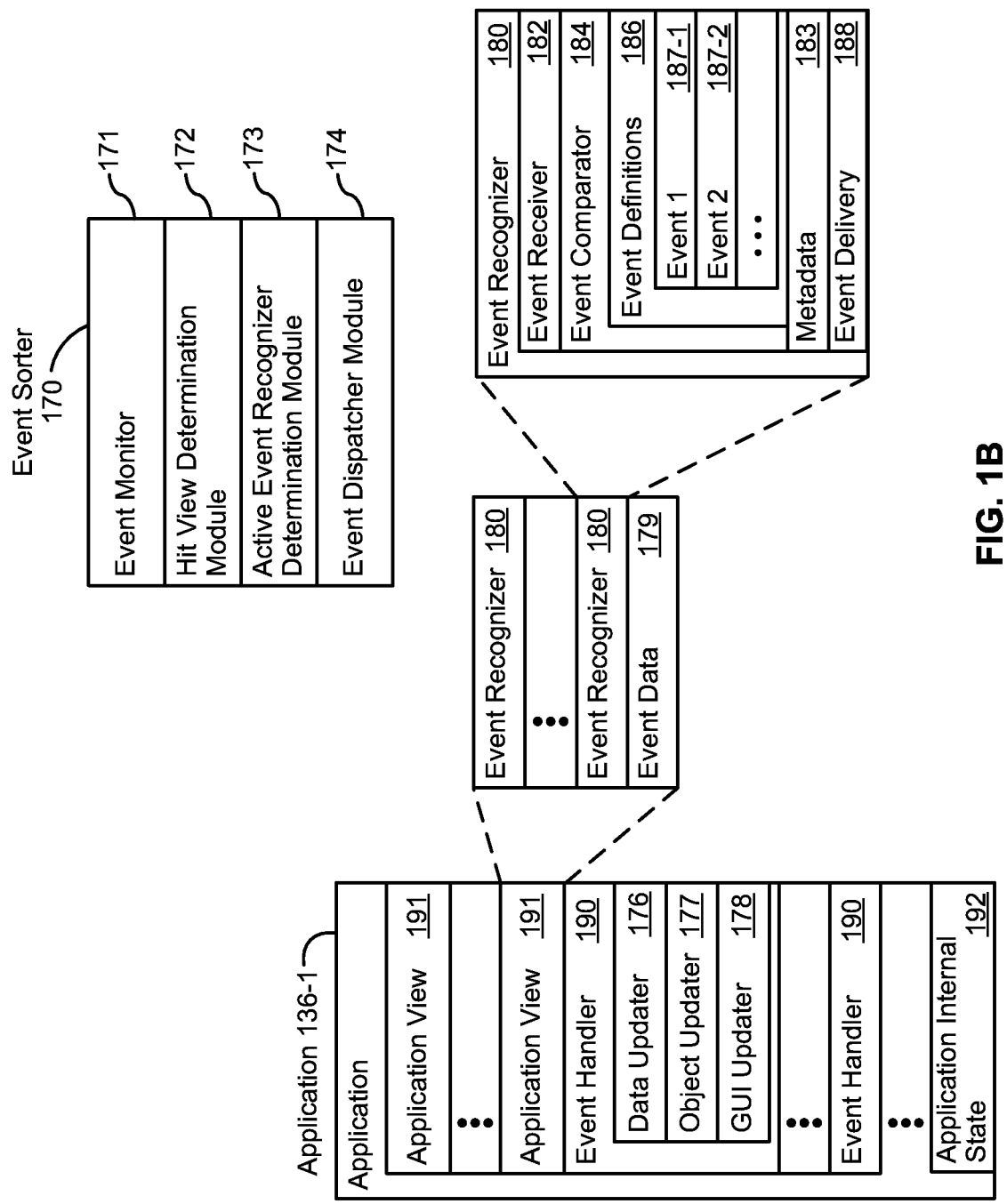
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
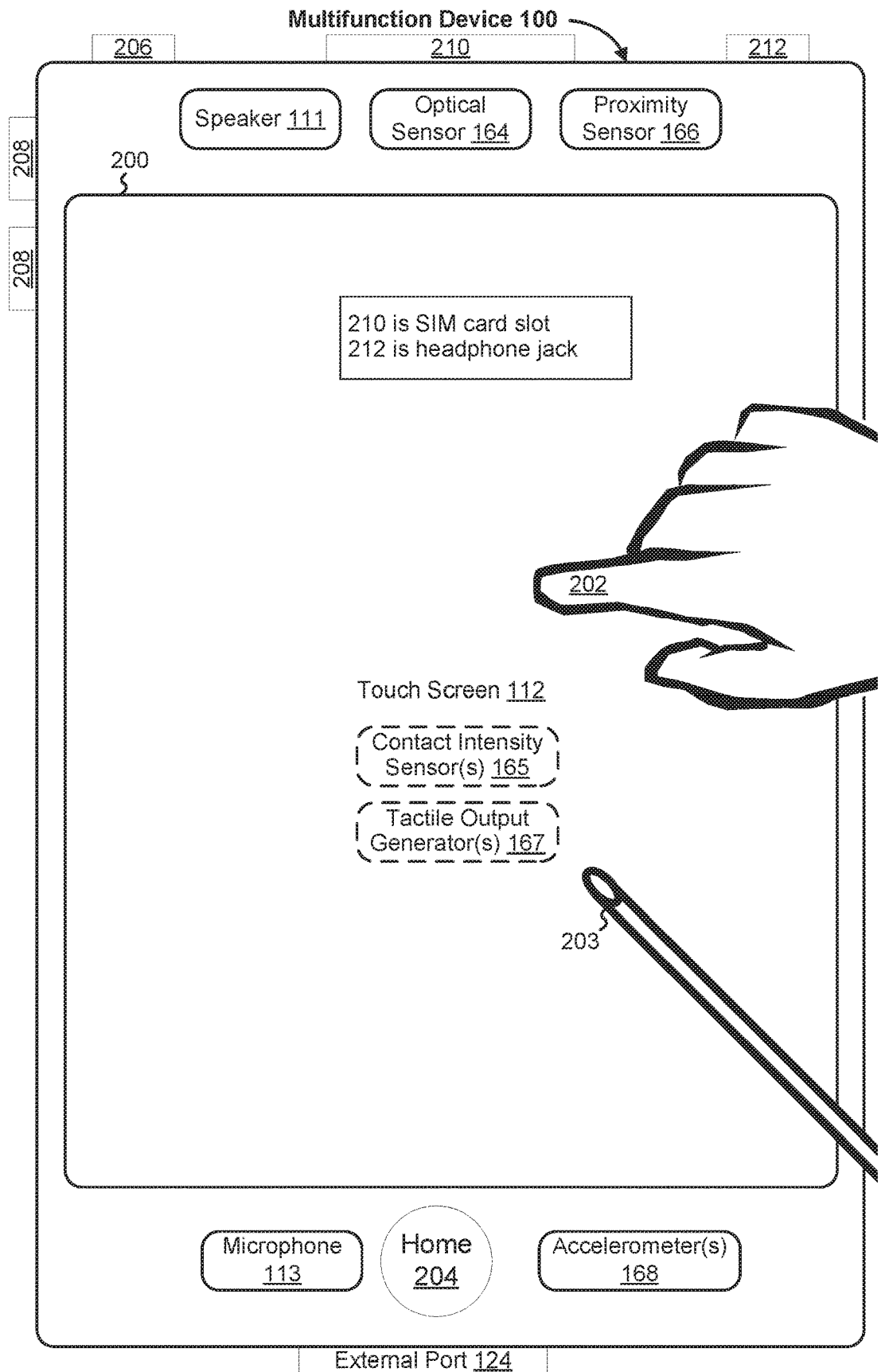
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
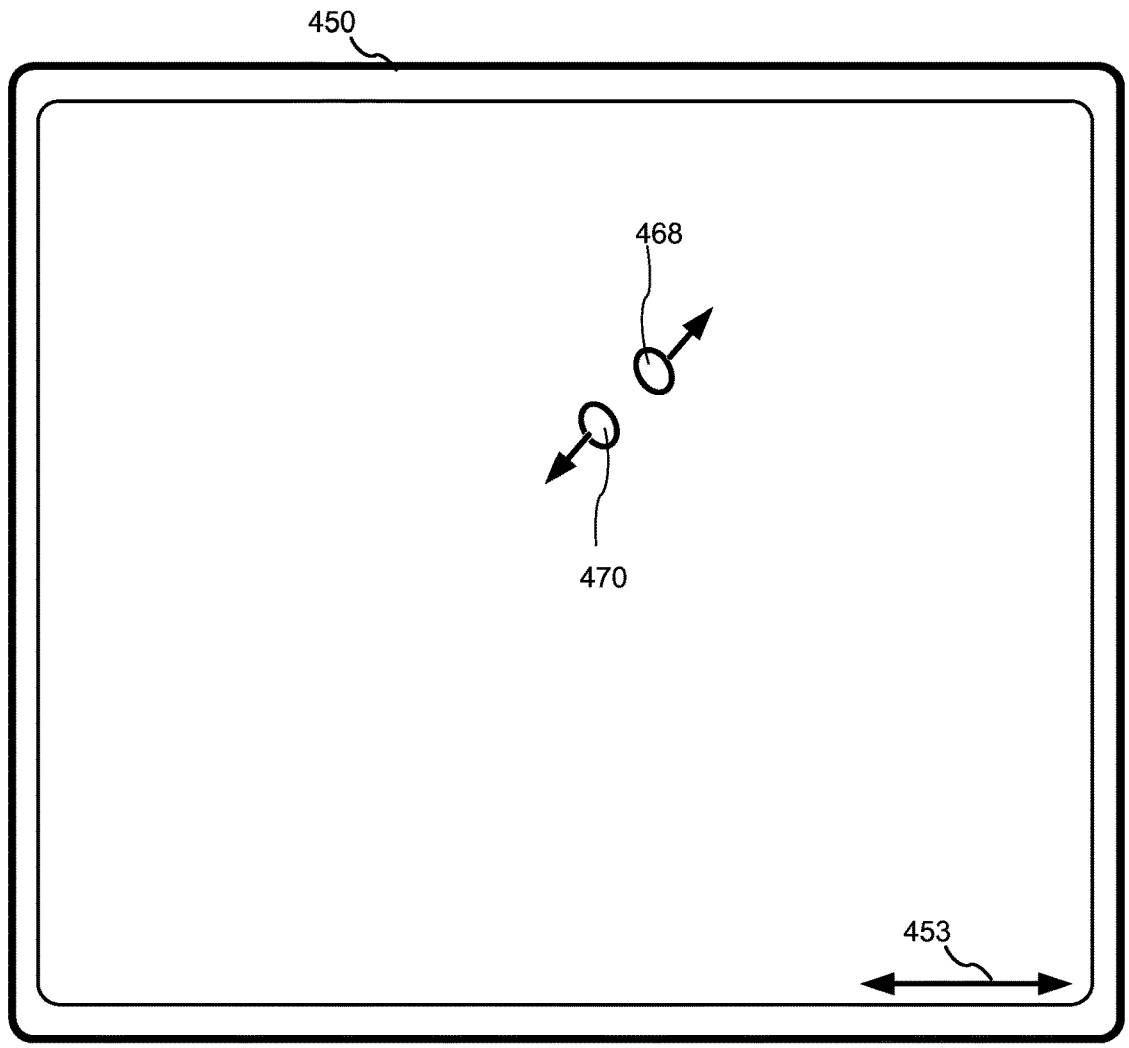
FIG. 4 illustrates an exemplary user interface for a multifunction device with a touch-sensitive surface that is separate from the display in accordance with some embodiments.
Figure 4:
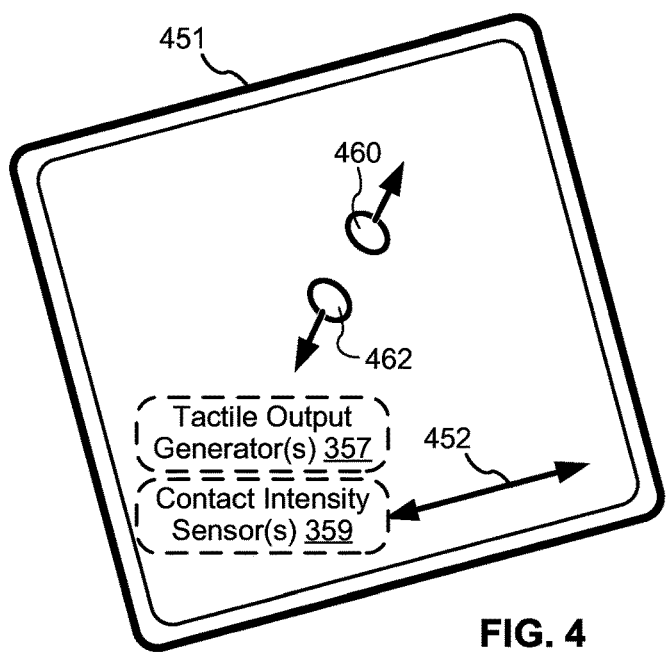

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
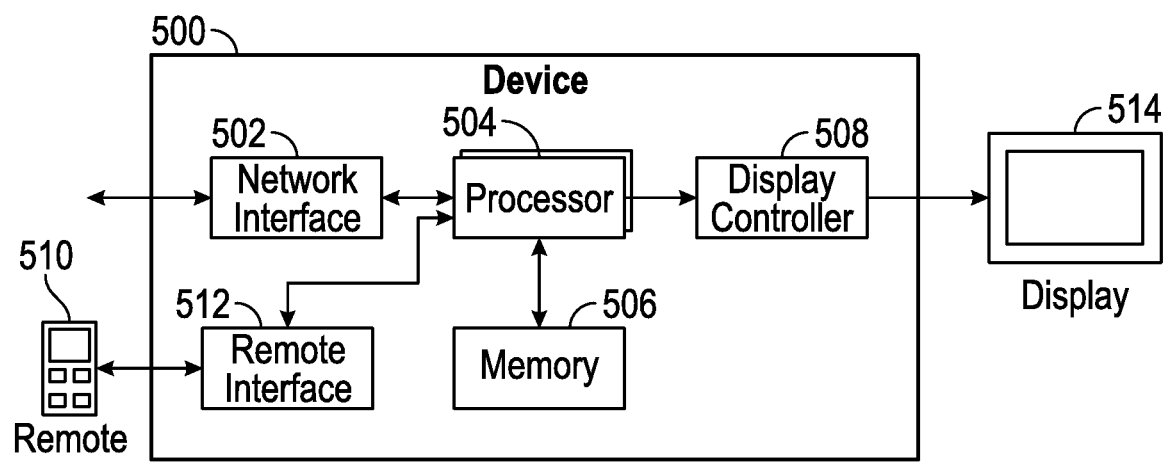
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, 1300, and/or 1500).

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

User Interfaces and Associated Processes

Column User Interface

Many electronic devices have graphical user interfaces that allow a user to navigate through numerous content items. There is a need to provide a fast, efficient, and convenient way for users to navigate through and select content items for consumption (e.g., viewing, listening, etc.). The embodiments described below provide a fast, efficient, and convenient way for users to navigate through and select content items for consumption using a column user interface.

Figure 6A:
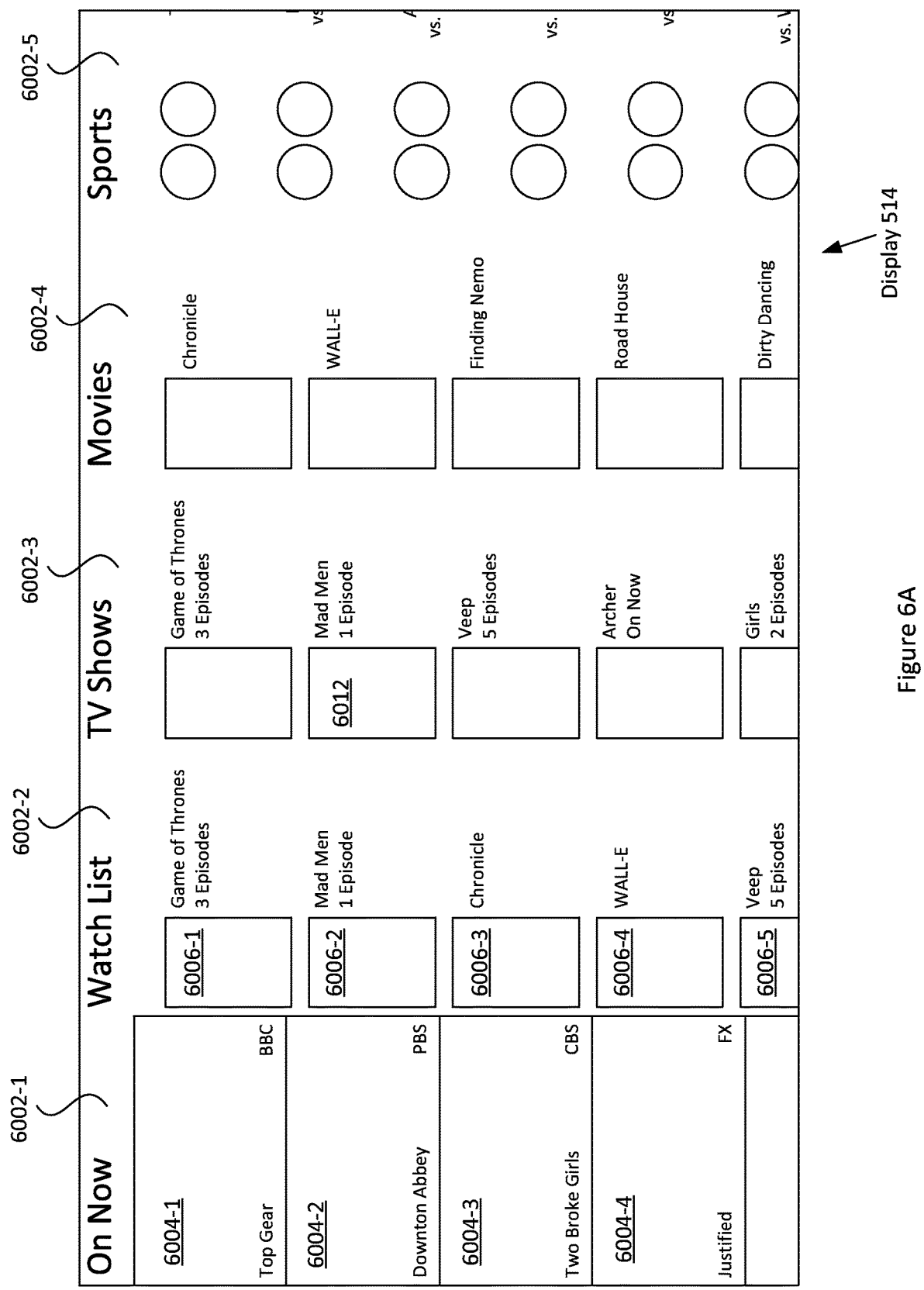
FIGS. 6IA-6NN illustrate exemplary user interfaces for navigating through and selecting content items in accordance with some embodiments of the disclosure.
Figure 6B:
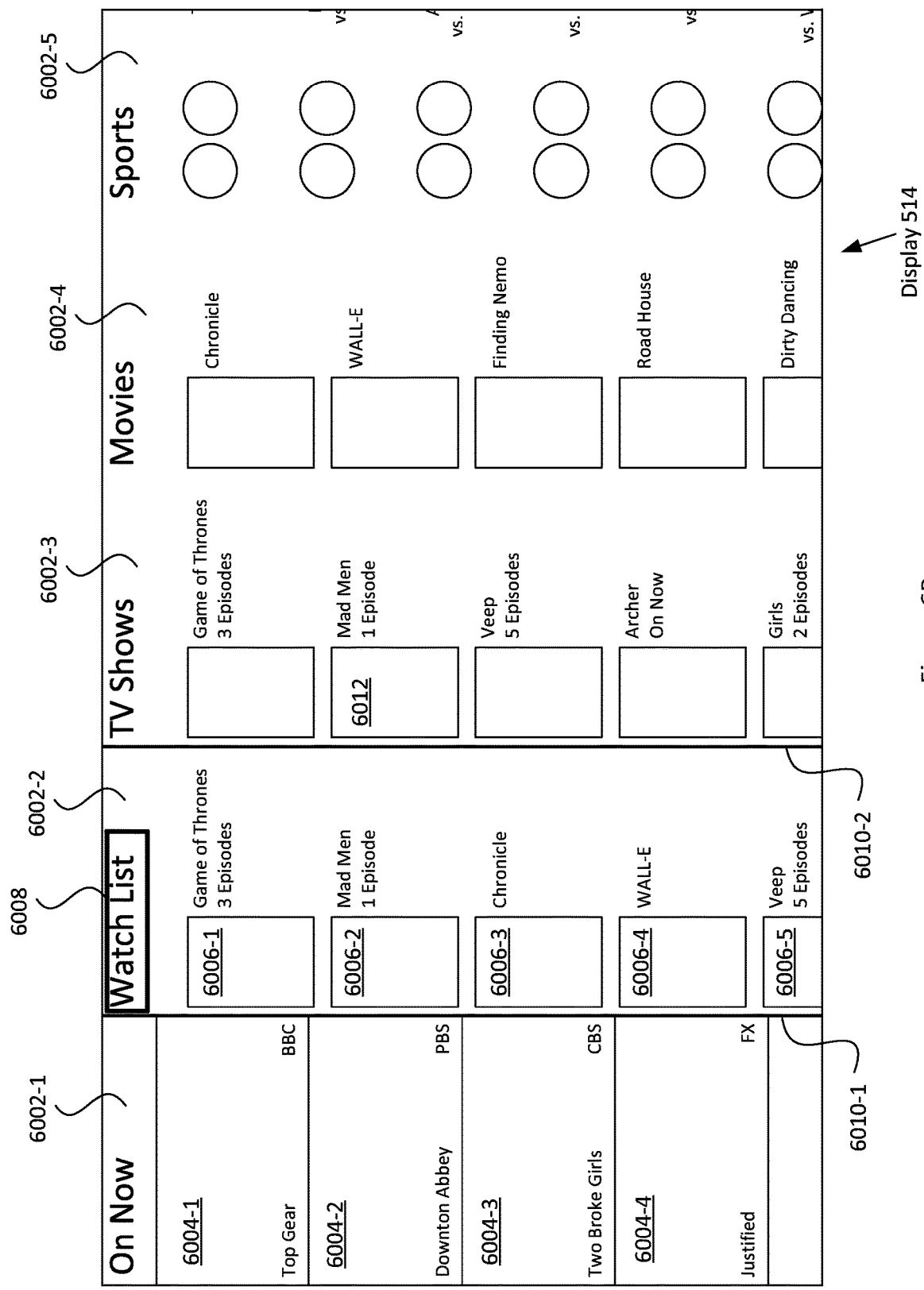
Figure 6C:
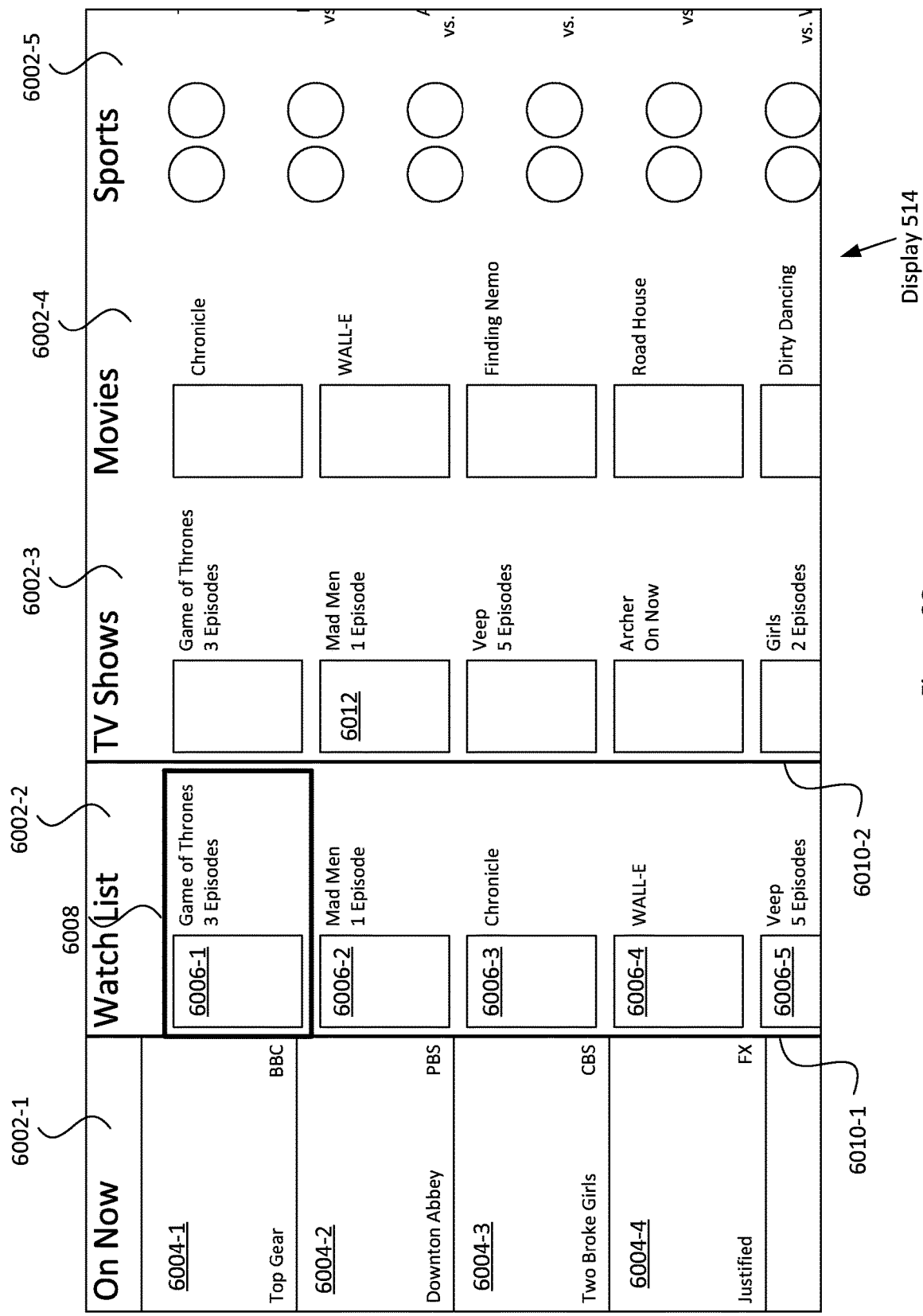
Figure 6D:
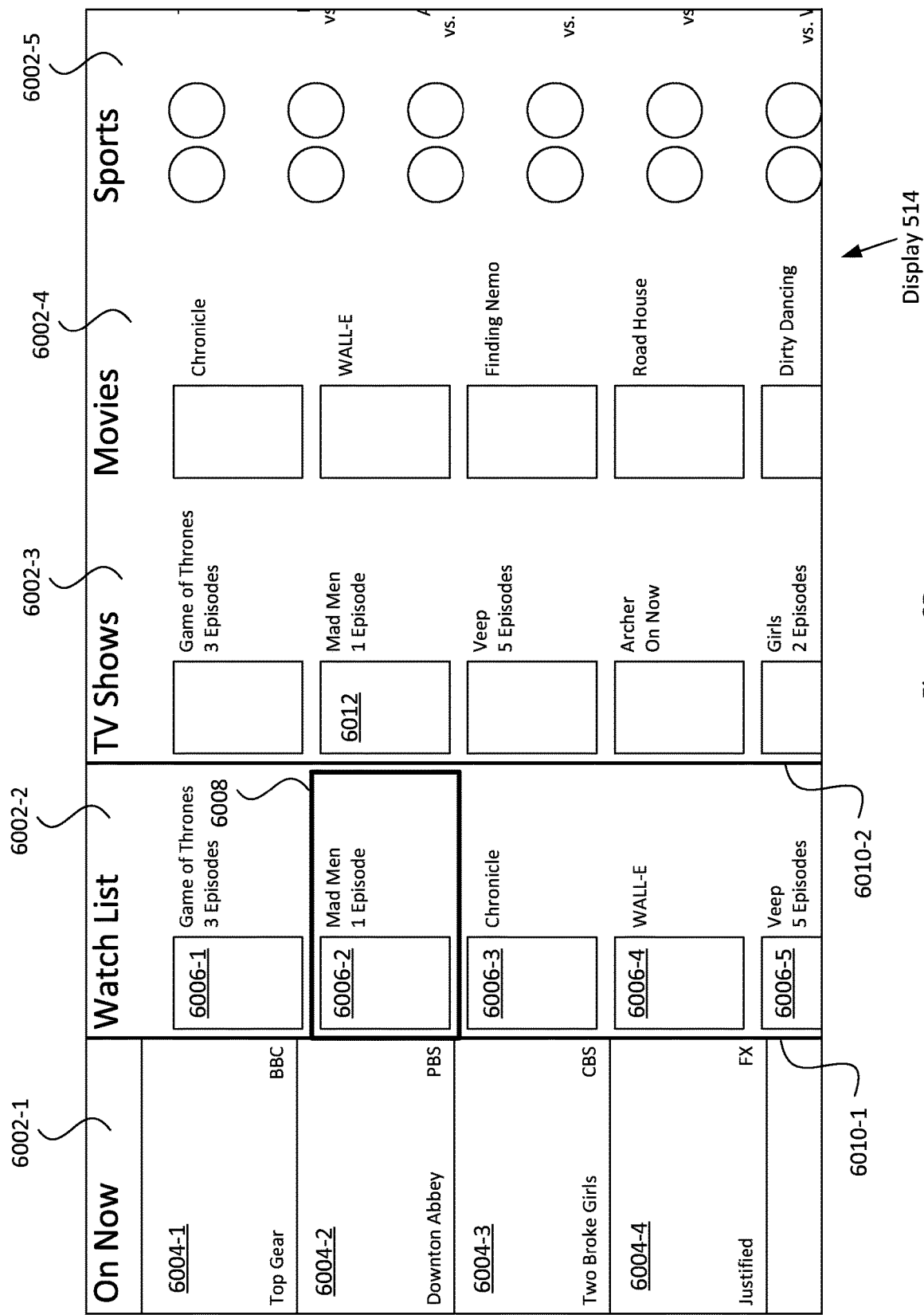
Figure 6E:
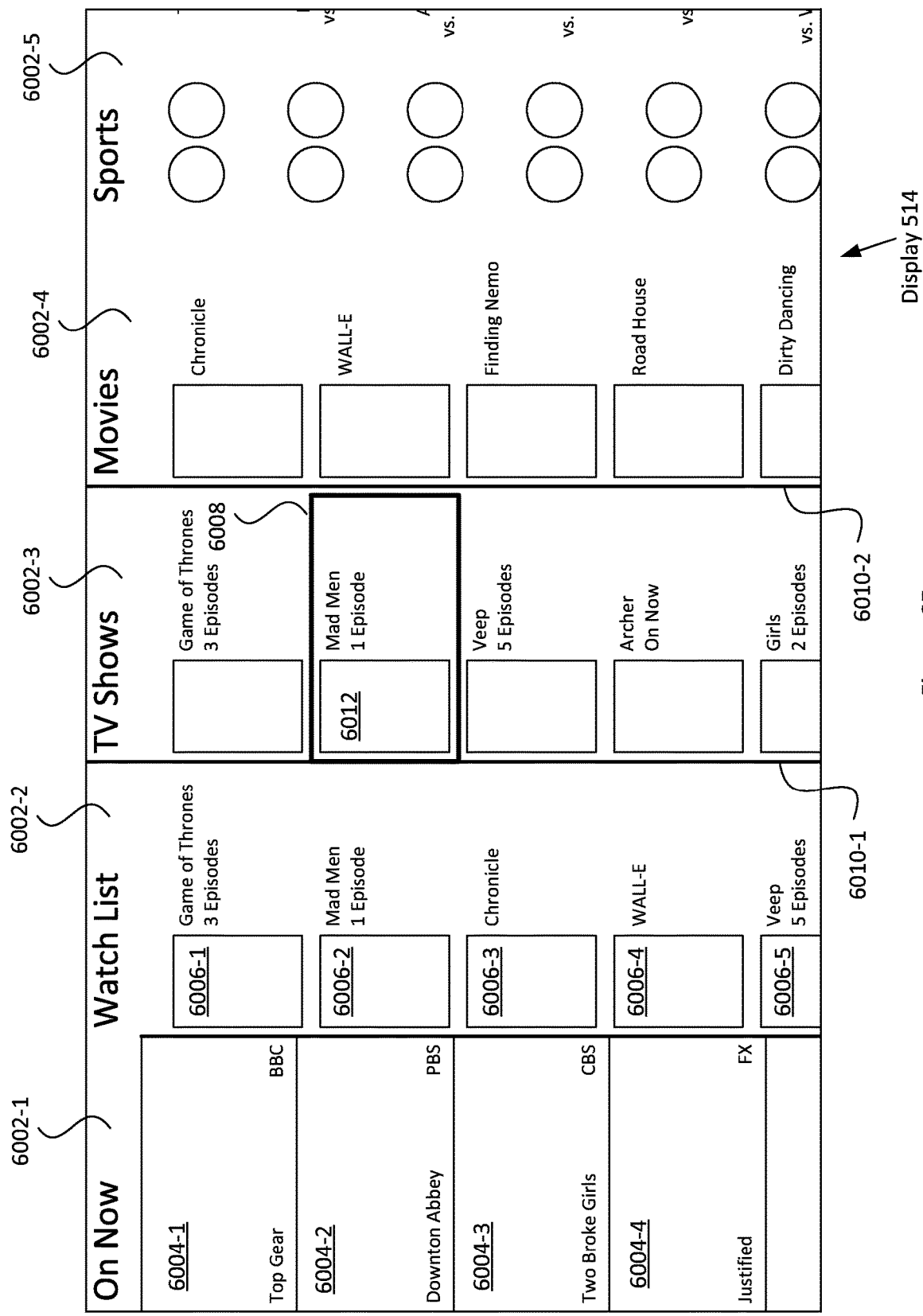
Figure 6F:
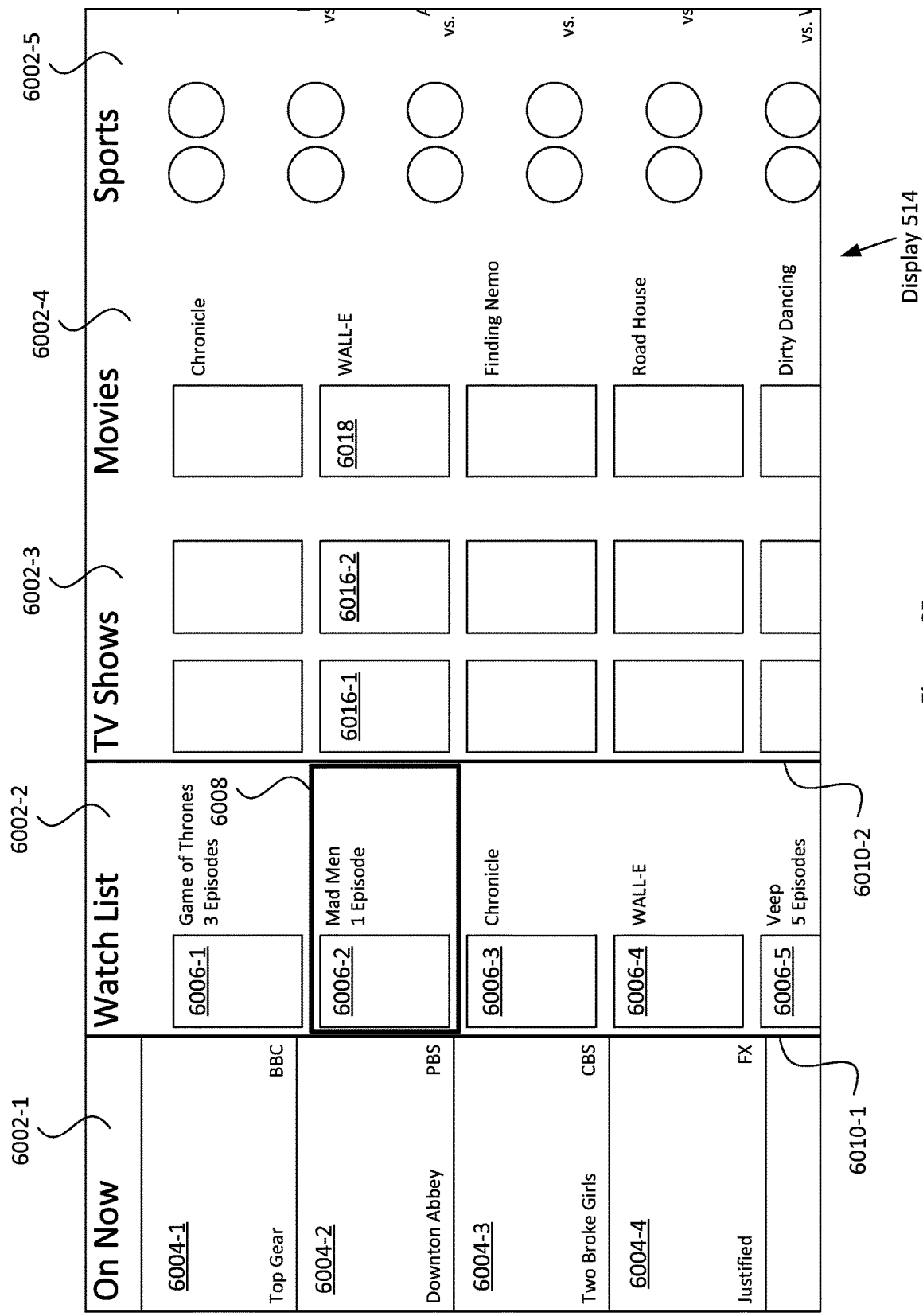
Figure 6G:
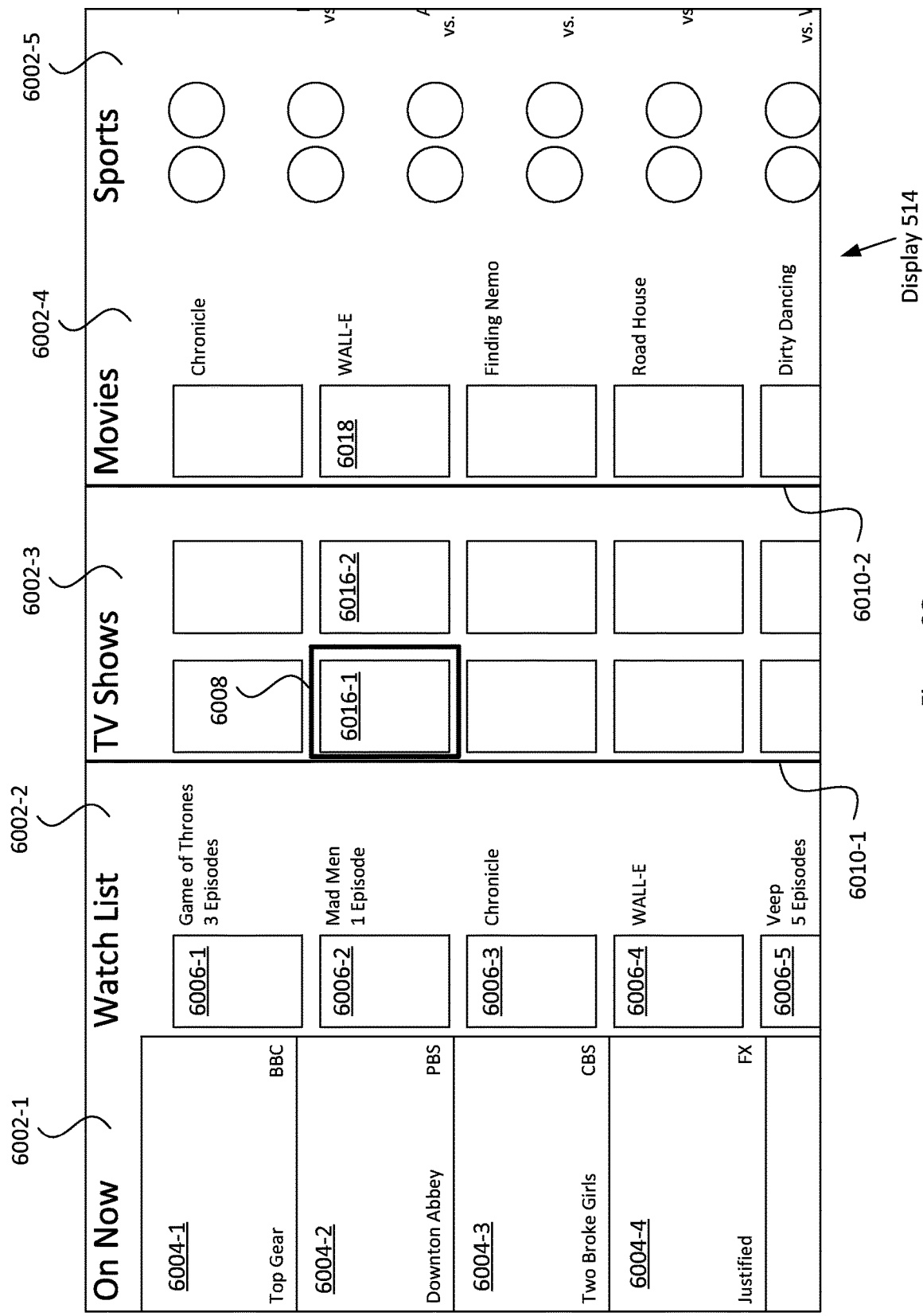
Figure 6H:
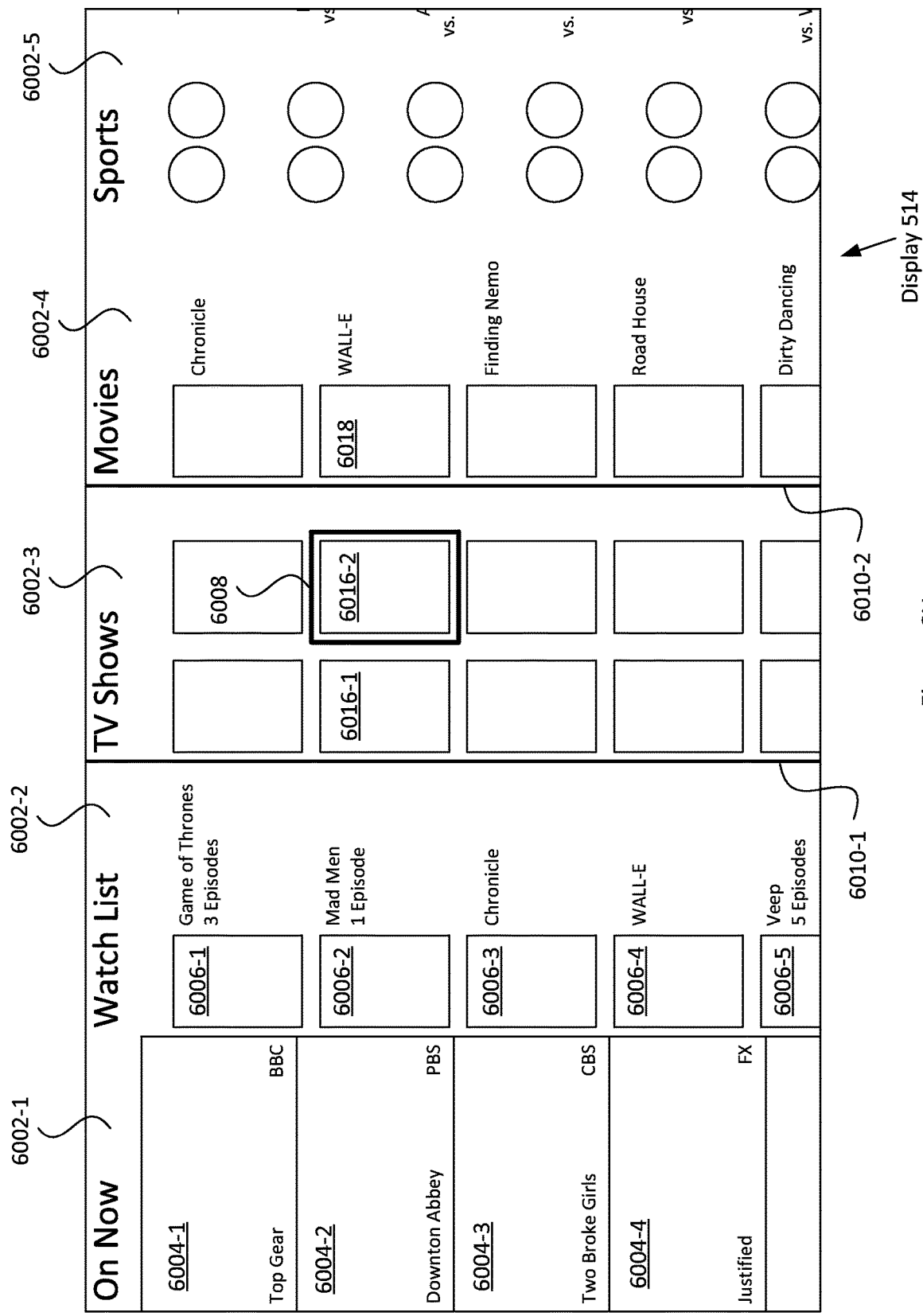
Figure 6I:
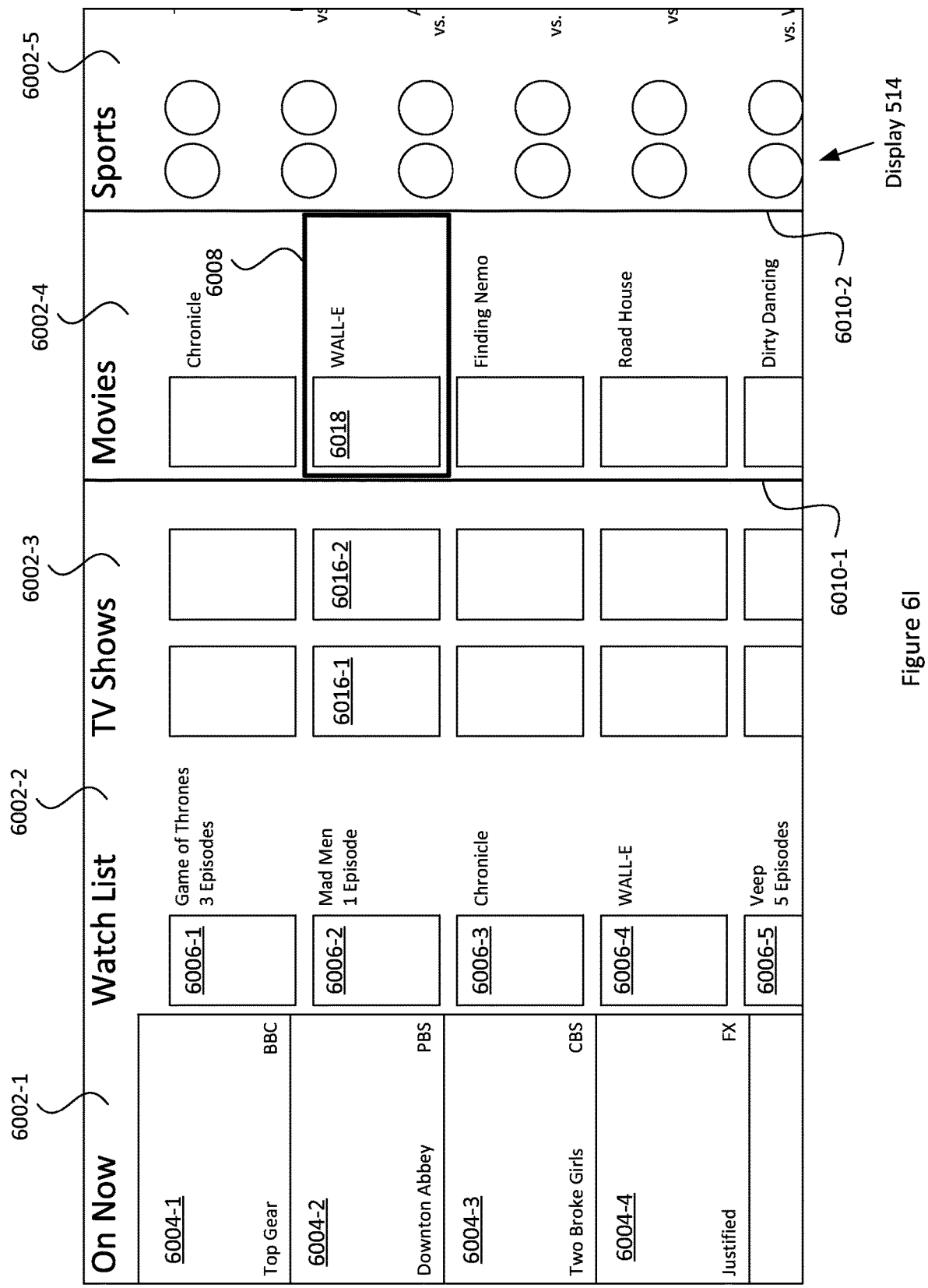
Figure 6J:
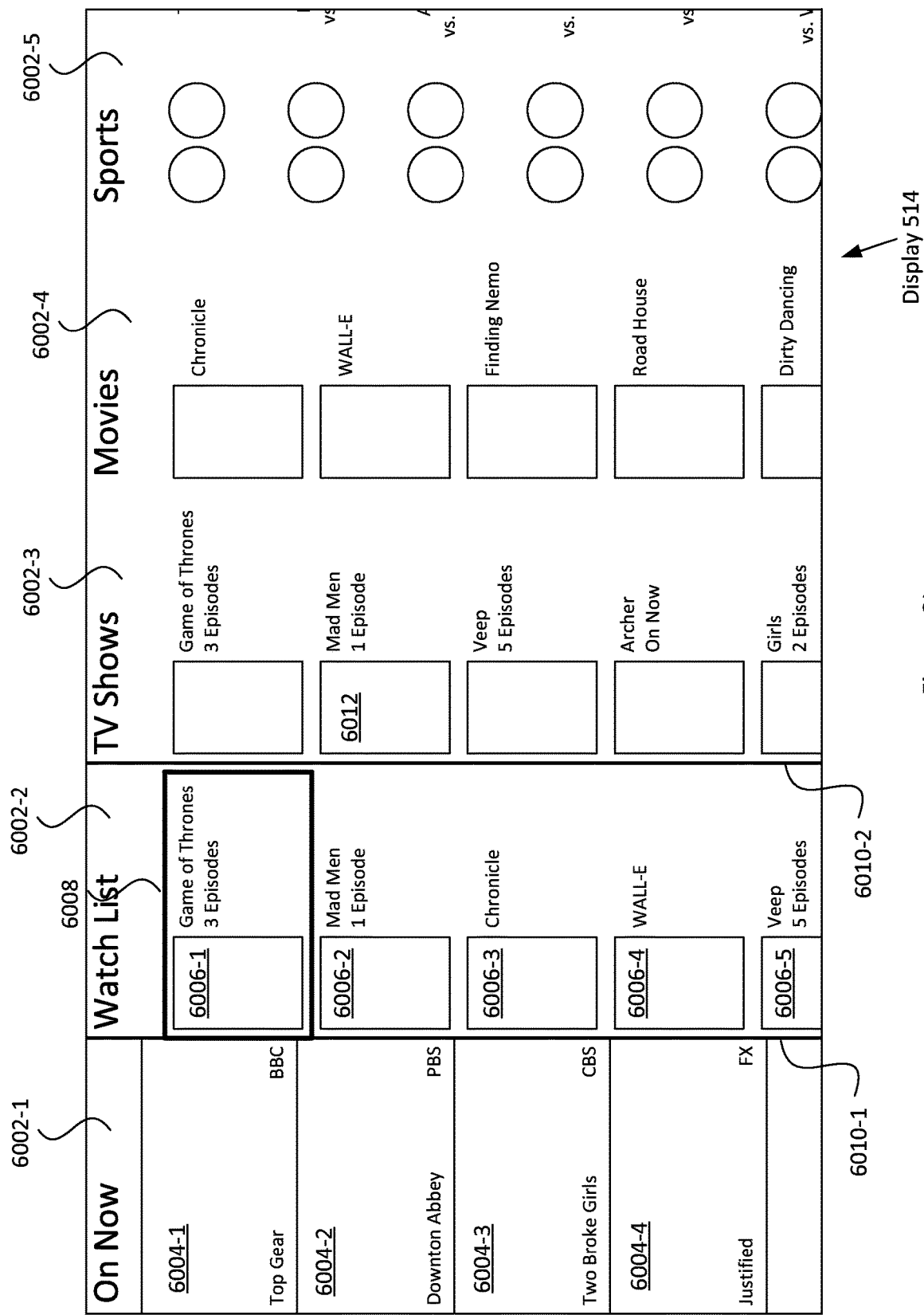
Figure 6K:
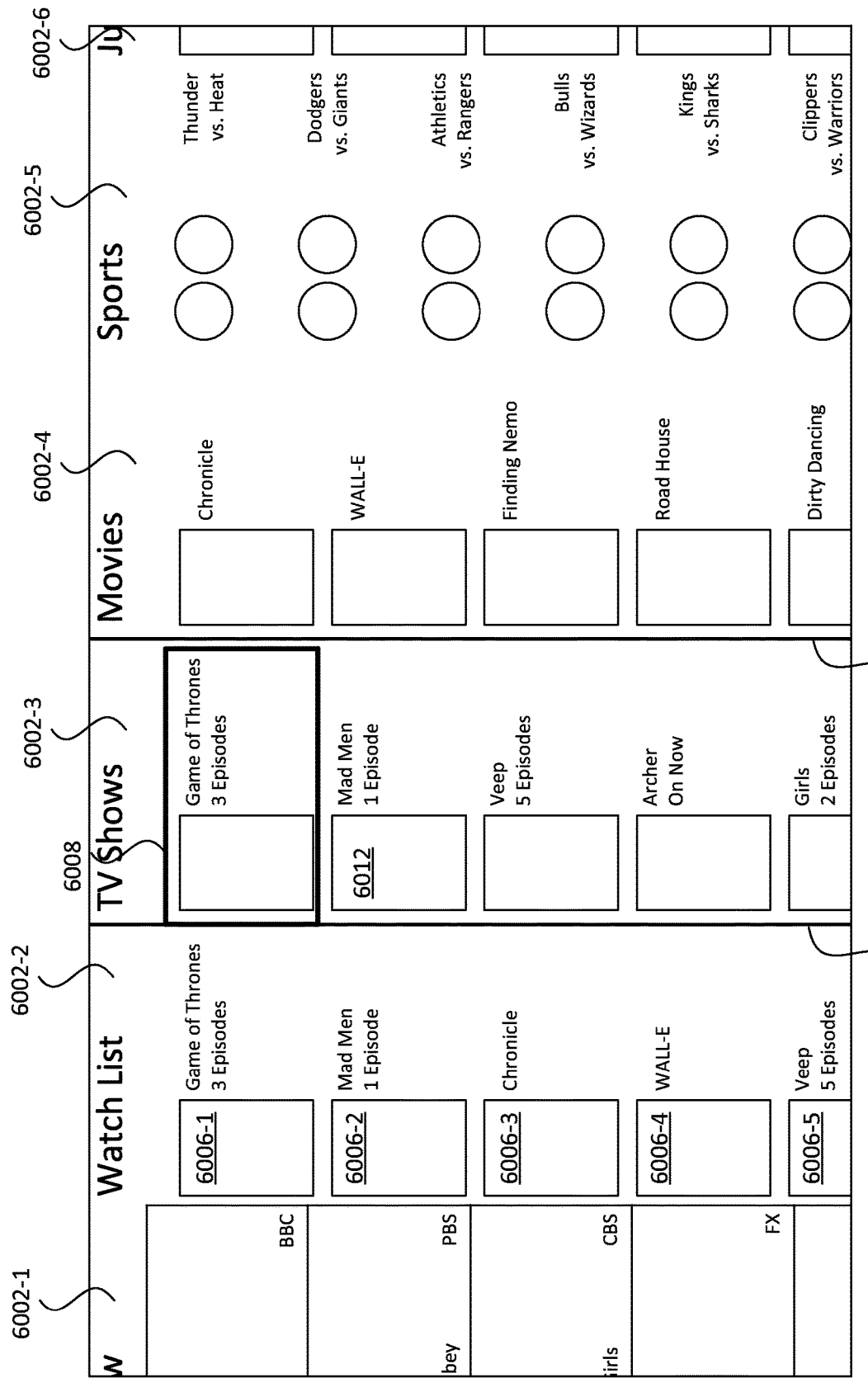
Figure 6M:
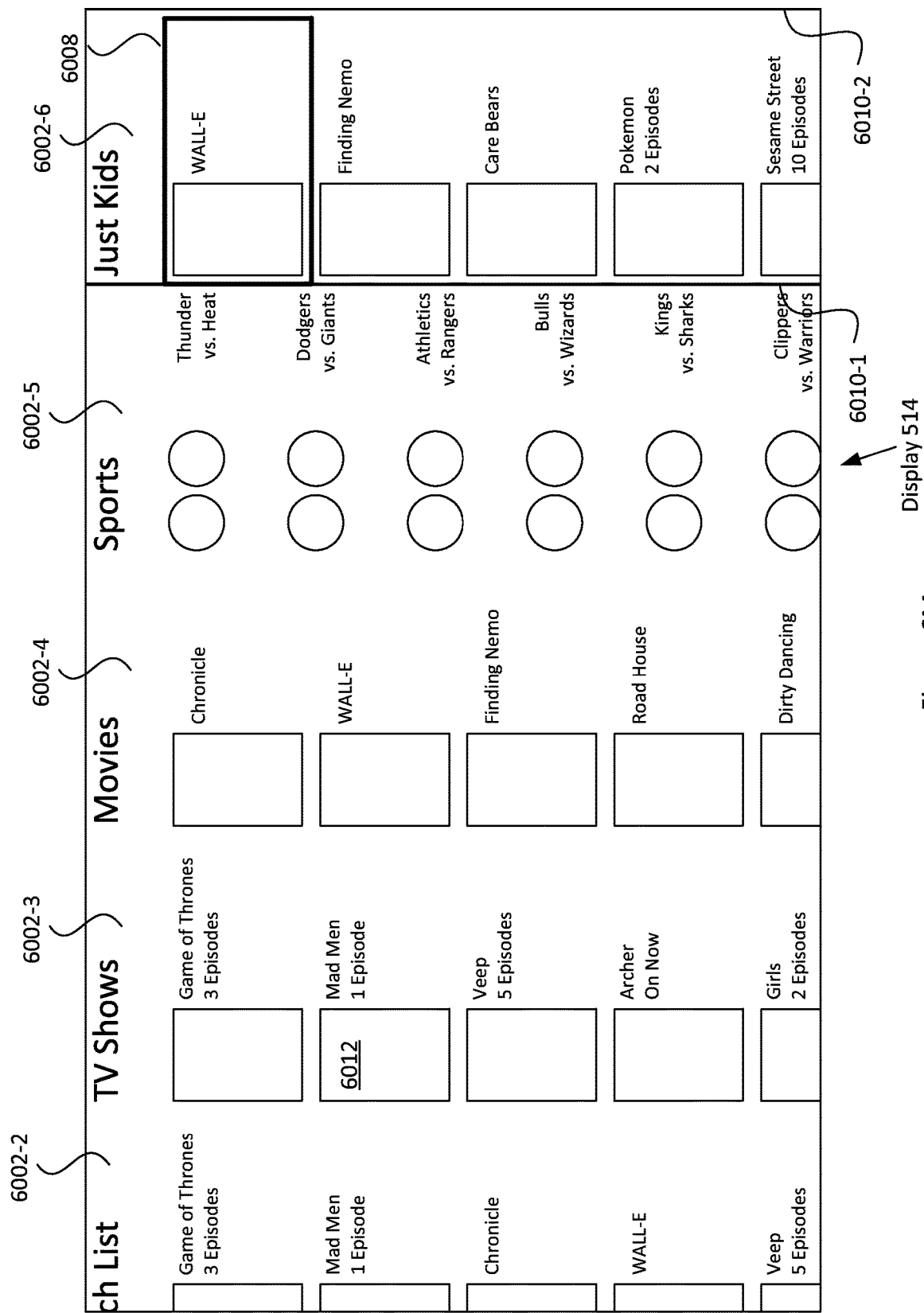
Figure 6N:
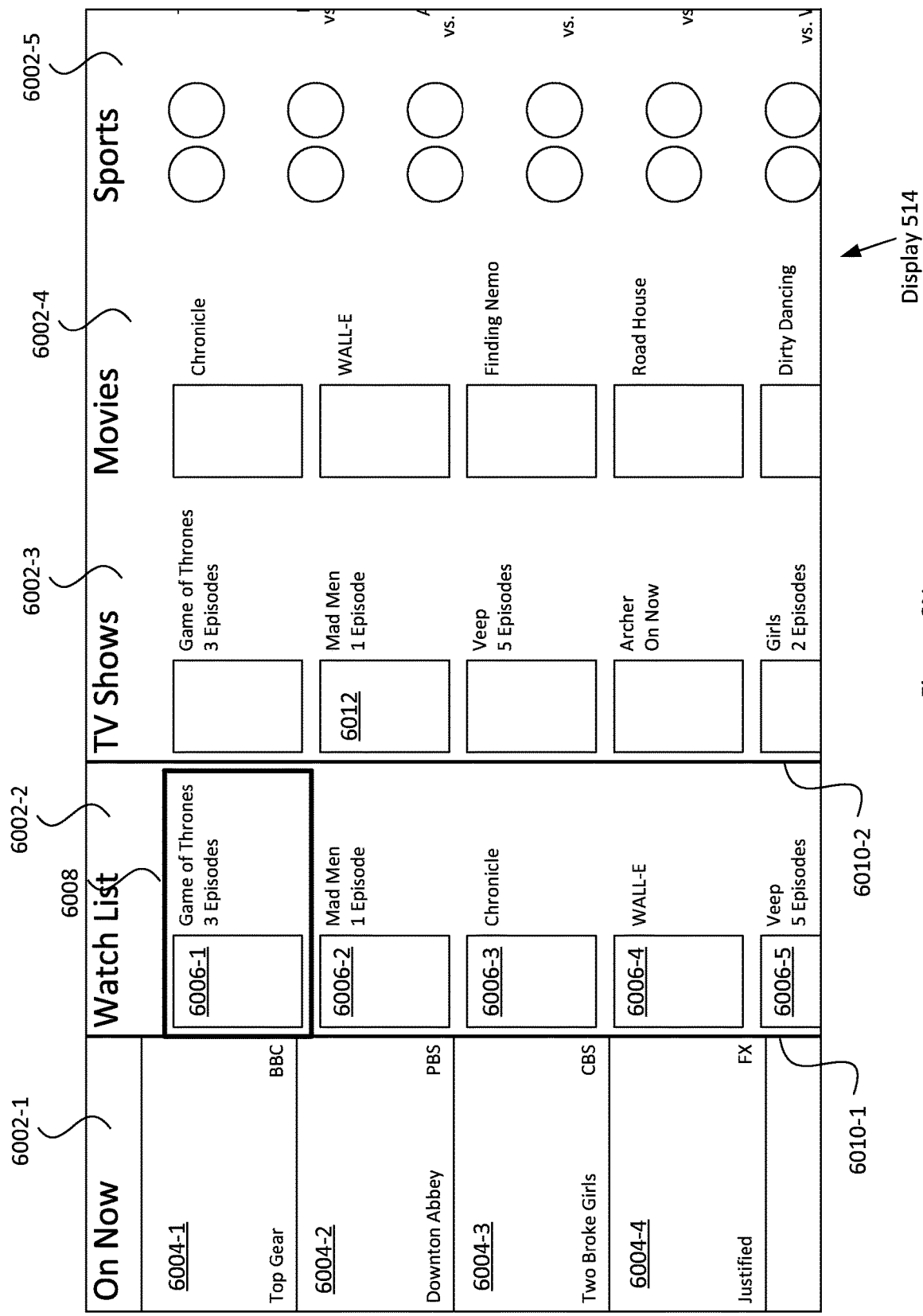

FIGS. 6A-6NN illustrate exemplary user interfaces for navigating through and selecting content items in accordance with some embodiments. The user interfaces in these figures are used to illustrate the processes described below, including the processes described below with reference to FIGS. 7A-7E.

FIGS. 6A-6U illustrate an example of a column user interface. A column user interface is displayed on display 514 of a device (e.g., device 500) and is responsive to user input, such as on touch-sensitive surface 451 and/or remote 510. The column user interface in FIGS. 6A-6U includes columns 6002-1, 6002-2, 6002-3, 6002-4, 6002-5, and 6002-6. The columns include headings "On Now", "Watch List", "TV Shows", "Movies", "Sports", and "Just Kids", respectively. The columns include one or more menu items that are optionally selected by a user to access content and/or navigate through further user interfaces, among other possibilities.

For example, the menu items in the "On Now" column 6002-1 each correspond to video content that is currently airing live, and a user can view the corresponding video content by selecting one of the menu items. Menu items corresponding to live video content, such as menu items 6004-1, 6004-2, 6004-3, and 6004-4, are optionally represented in the user interface by live video. The menu items in the "Watch List" column 6002-2 each correspond to video content that is available to view on-demand, and a user can view the corresponding on-demand video content by selecting one of the menu items in the "Watch List" column. Menu items corresponding to live video content, such as menu items 6006-1, 6006-2, 6006-3, 6006-4, and 6006-5, are optionally represented in the user interface by one or more still images and/or text. Further, the text optionally indicates a number of unwatched episodes of a content series corresponding to the menu item. For example, menu item 6006-1 indicates that the user has three unwatched episodes of Game of Thrones in the watch list.

In FIG. 6B, column 6002-2 is currently highlighted, as indicated by column focus indicators 6010-1 and 6010-2. Further, the heading "Watch List" 6014 is currently highlighted, as indicated by item focus indicator 6008. Upon receiving user input selected the heading "Watch List" 6014, a "Watch List" column interface (as illustrated in FIGS. 6V-6BB) is optionally presented on the display 514. In FIG. 6C, column 6002-2 remains highlighted, and now the menu item "Game of Thrones" 6006-1 is highlighted by item focus indicator 6008. Focus is, optionally, changed in response to detecting input by the user using an input device, such as remote 510. For example, a down button is optionally pressed on the remote, or a swipe down gesture is optionally received on the remote, and in response a down navigation operation is optionally received and the item focus indicator 6008 optionally moves down from the "Watch List" heading 6014 to the menu item "Game of Thrones" 6006-1, as illustrated in FIGS. 6B-6C. In FIG. 6D, the item focus indicator 6008 moves down to the next menu item "Mad Men" 6006-2.

In some embodiments, a background color of the user interface optionally changes based on the menu item that is currently highlighted. For example, the logo of "Game of Thrones" contains the color brown, and thus the background of the user interface may be brown when the "Game of Thrones" menu item 6006-1 is highlighted by the item focus indicator 6008. The logo of "Mad Men" contains the color red, and thus the background of the user interface may be red when the "Mad Men" menu item 6006-2 is highlighted by the item focus indicator 6008.

In FIG. 6E, column 6002-3 is currently highlighted, as indicated by column focus indicators 6010-1 and 6010-2. Further the menu item "Mad Men" 6012 is currently highlighted, as indicated by the item focus indicator 6008. Receiving a right navigation operation optionally causes the item focus indicator 6008 to move from one column (e.g., column 6002-2) to a column adjacent to the right (e.g., column 6002-3), as illustrated in FIGS. 6D-6E.

In some embodiments, one or more columns optionally have multiple menu items on a row, as illustrated in FIGS. 6F-6I. In FIGS. 6F-6I, each row of column 6002-3 has multiple menu items. For example, menu items 6016-1 and 6016-2 are in the same row in column 6002-3. In such a case, a right navigation operation does not always navigate to the next column. In FIGS. 6F-6I, a series of three right navigation operations optionally navigates from menu item 6006-2 (FIG. 6F), to menu item 6016-1 (FIG. 6G), to menu item 6016-2 (FIG. 6H), and to menu item 6018 (FIG. 6I). However, in this example, only the first and third right navigation operations navigate to the next column—the second right navigation operation only moves from 6016-1 to 6016-2 within column 6002-3.

Figure 6O:
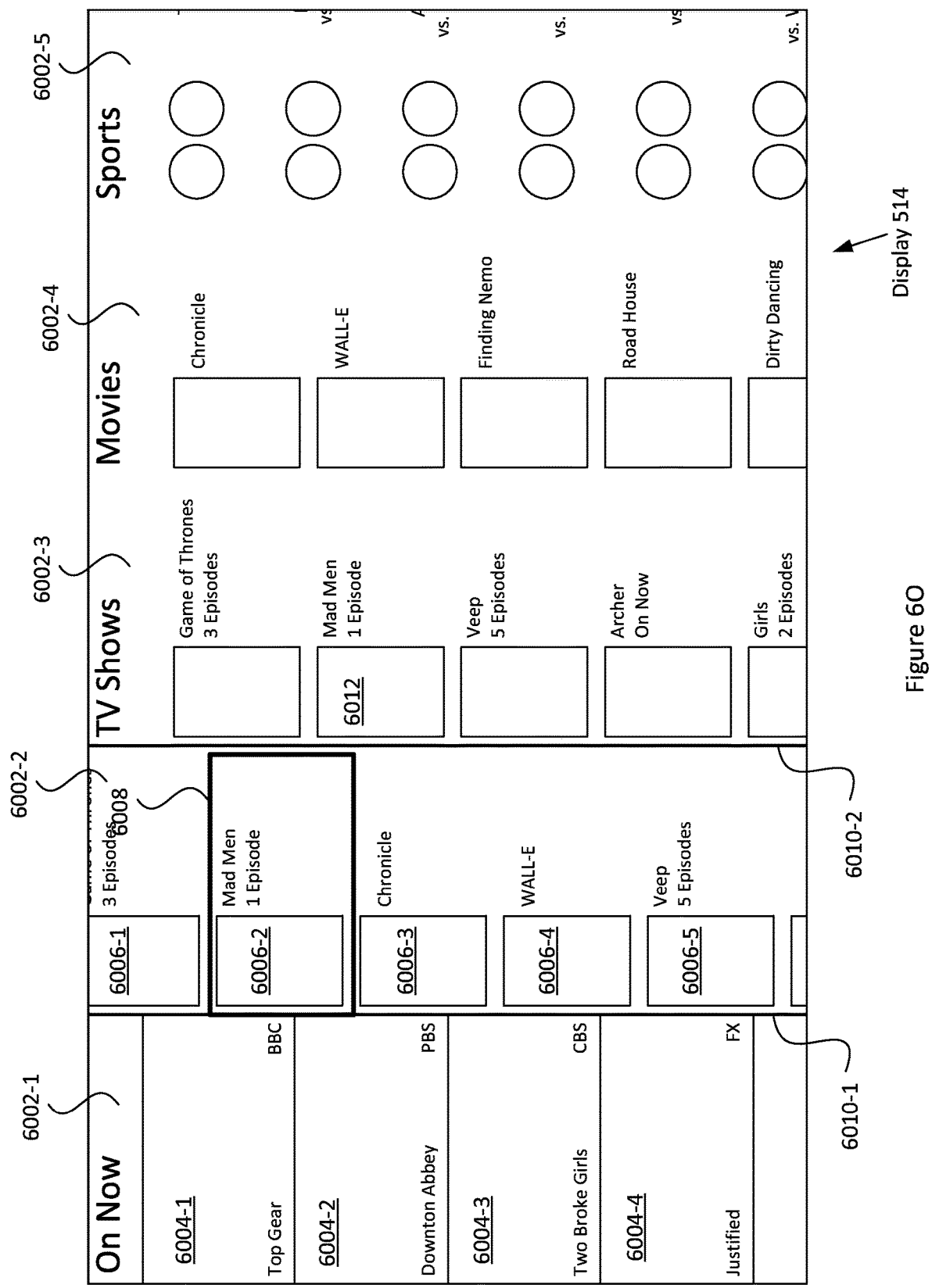
Figure 6P:
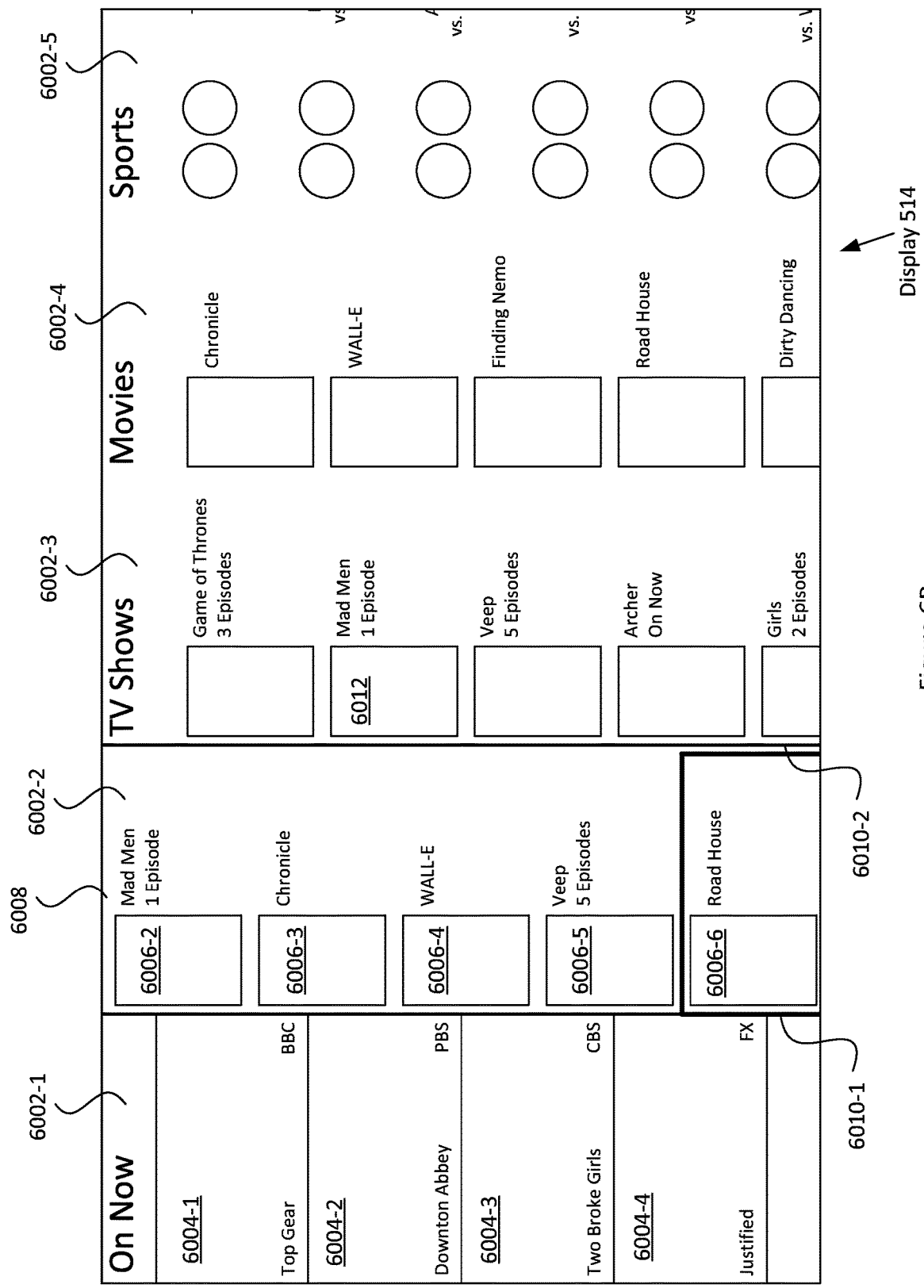
Figure 6Q:
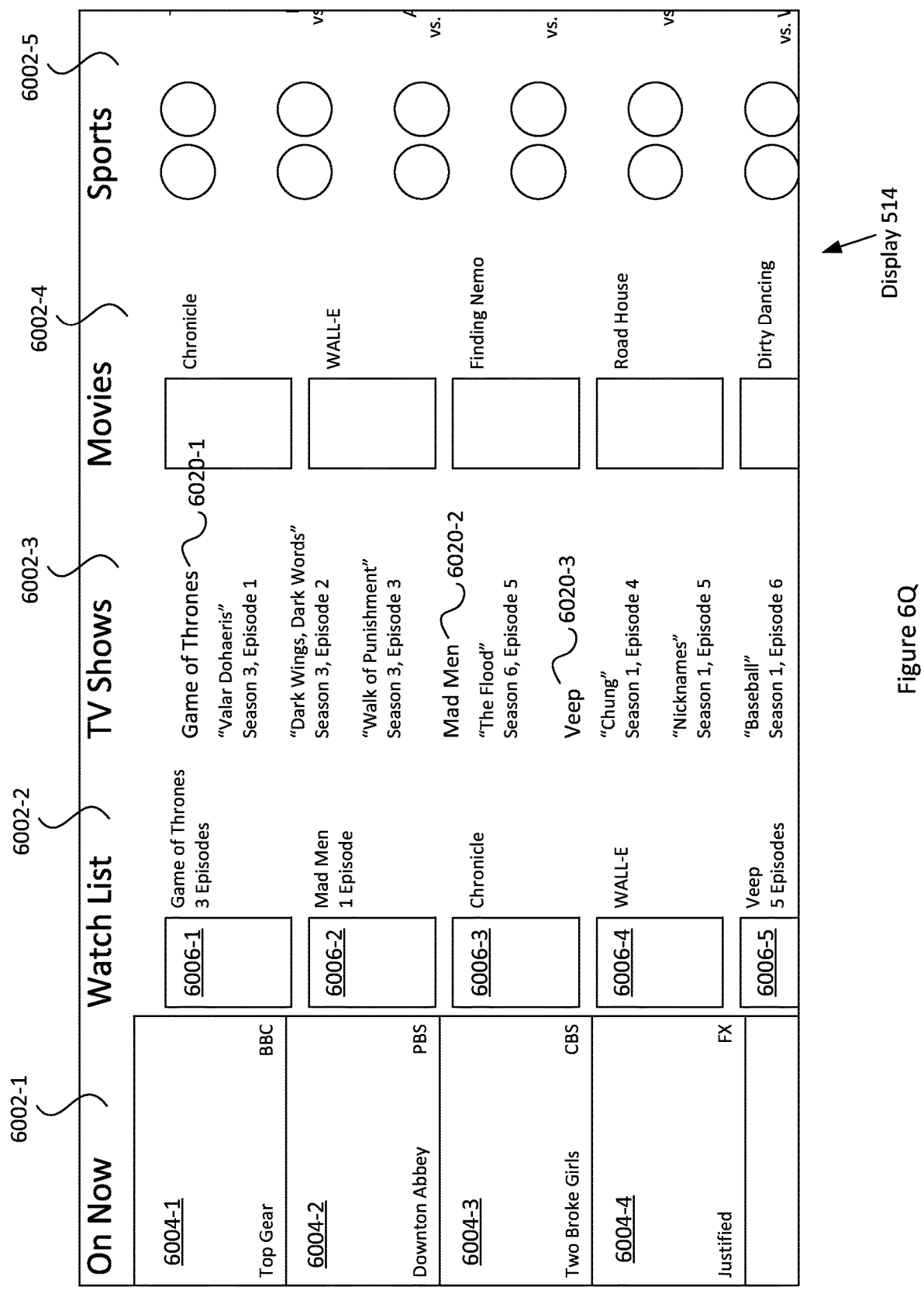
Figure 6R:
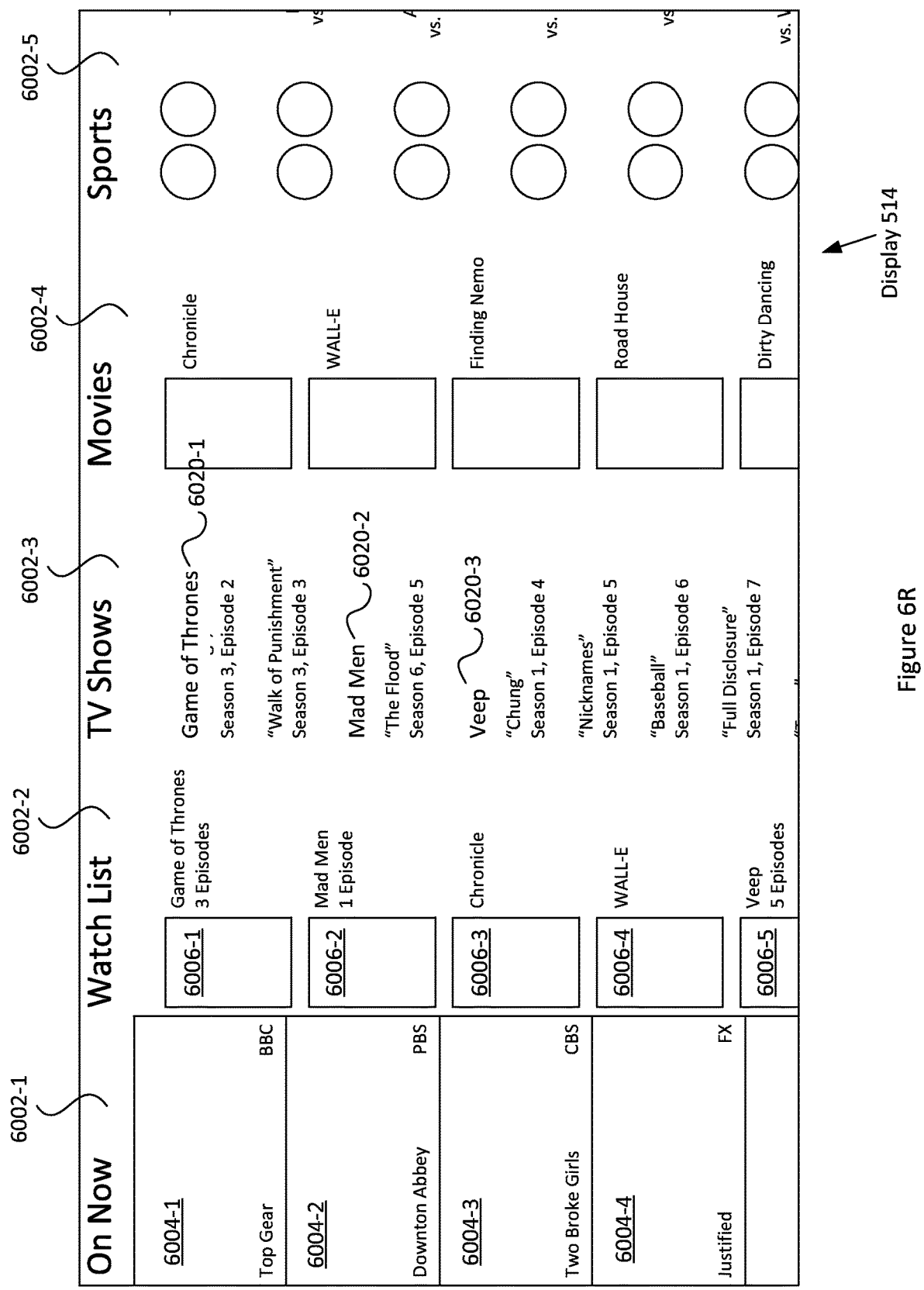
Figure 6S:
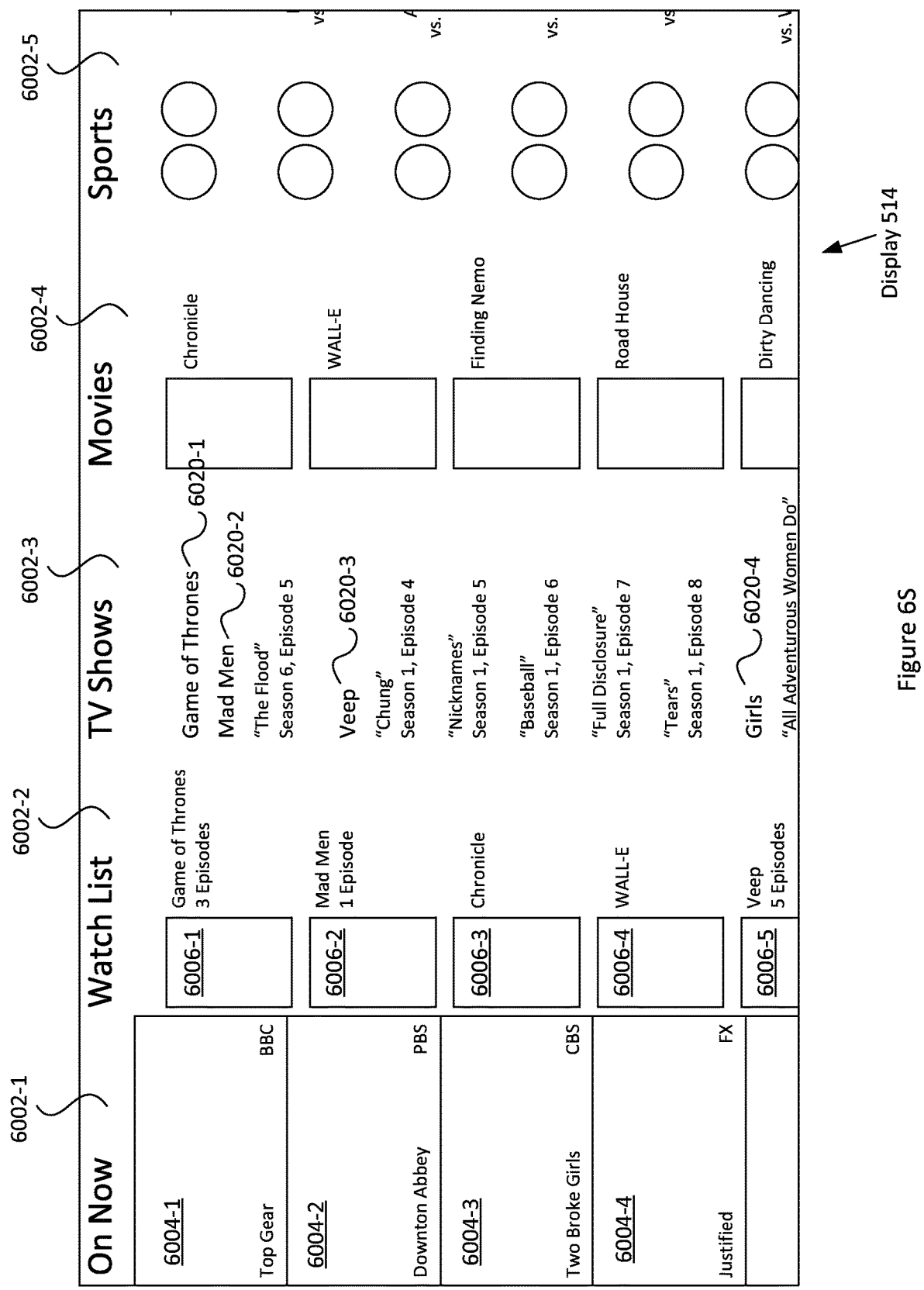
Figure 6T:
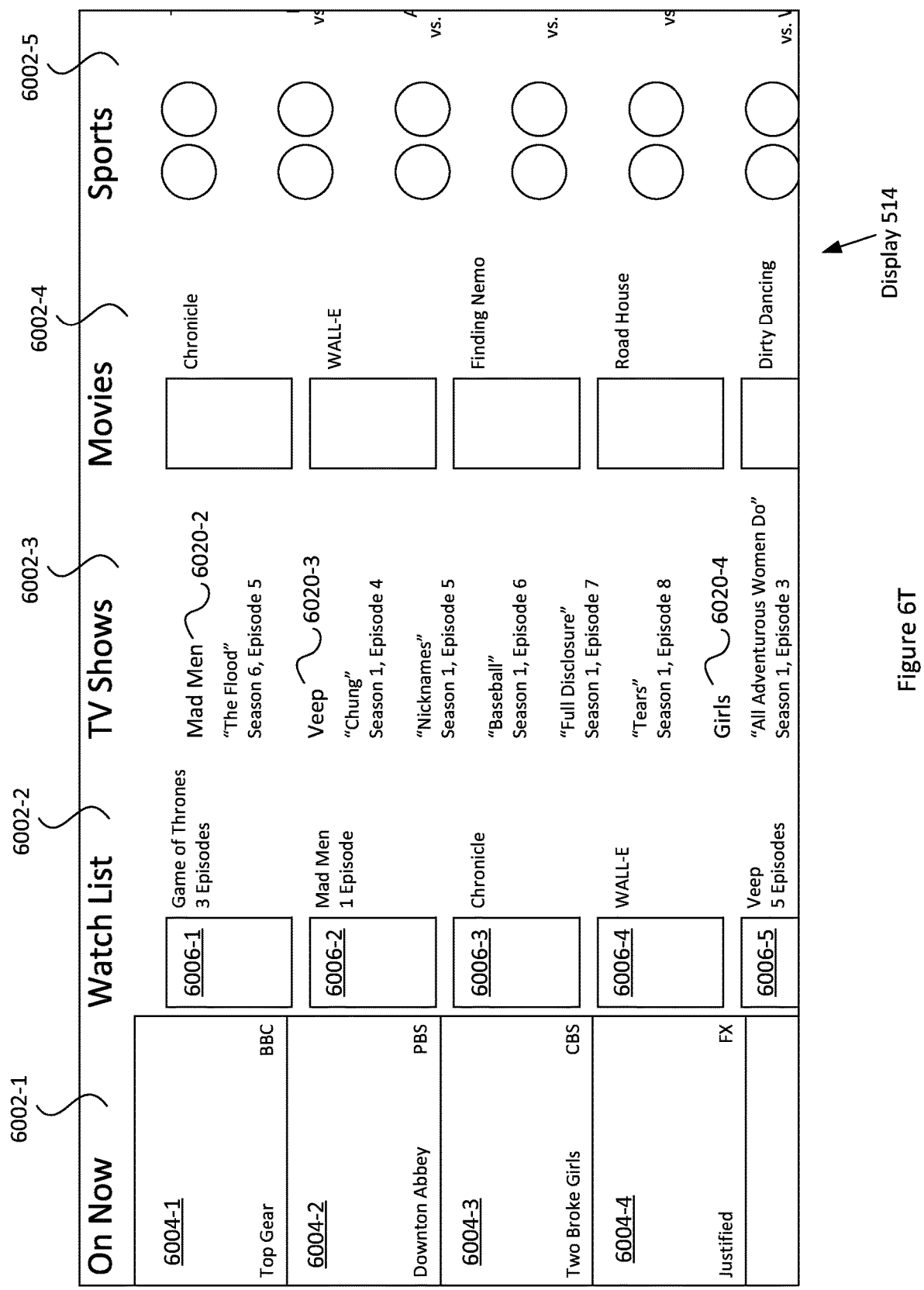
Figure 6Y:
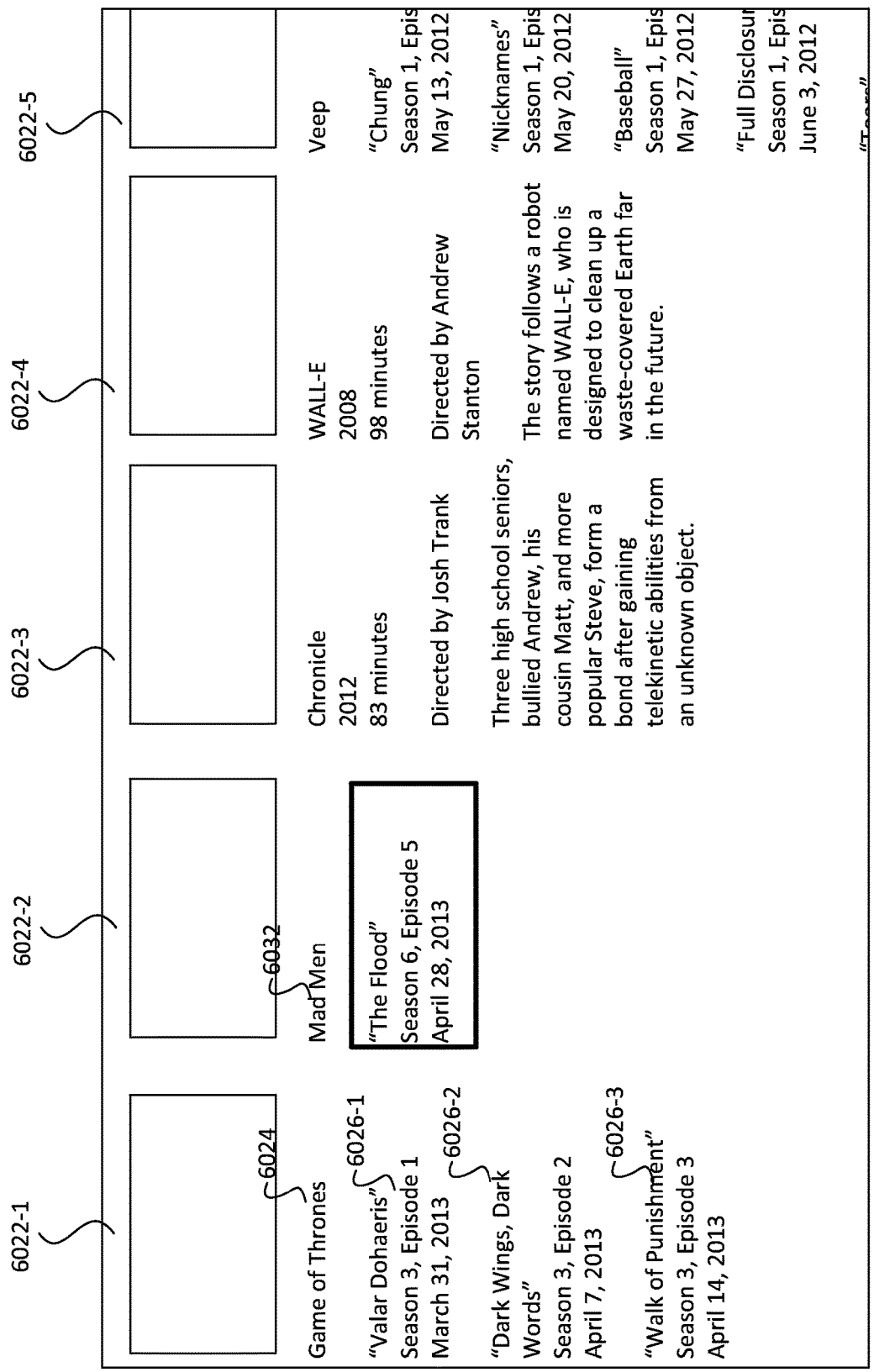
Figure 6Z:
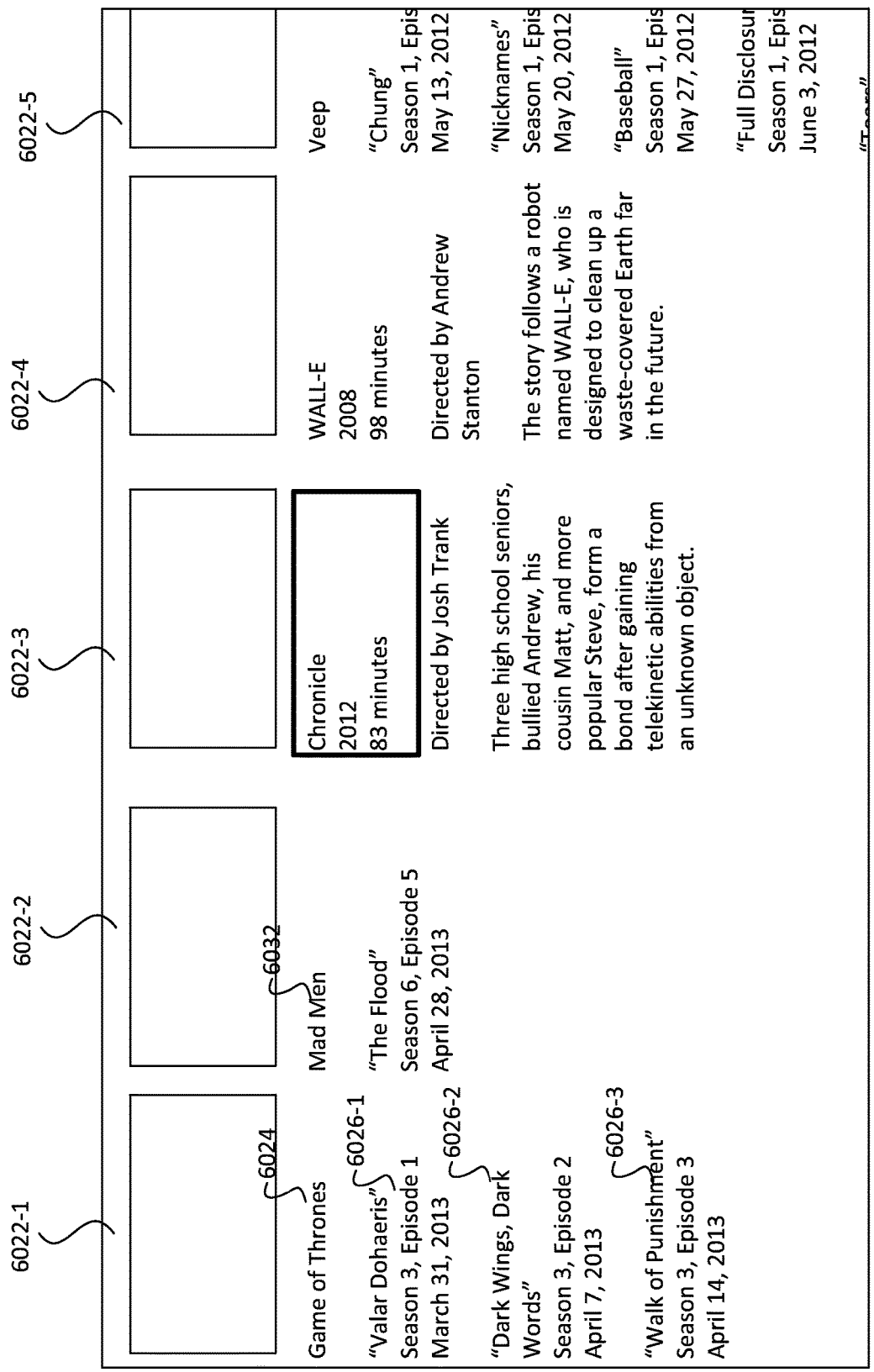
Figure 6B:
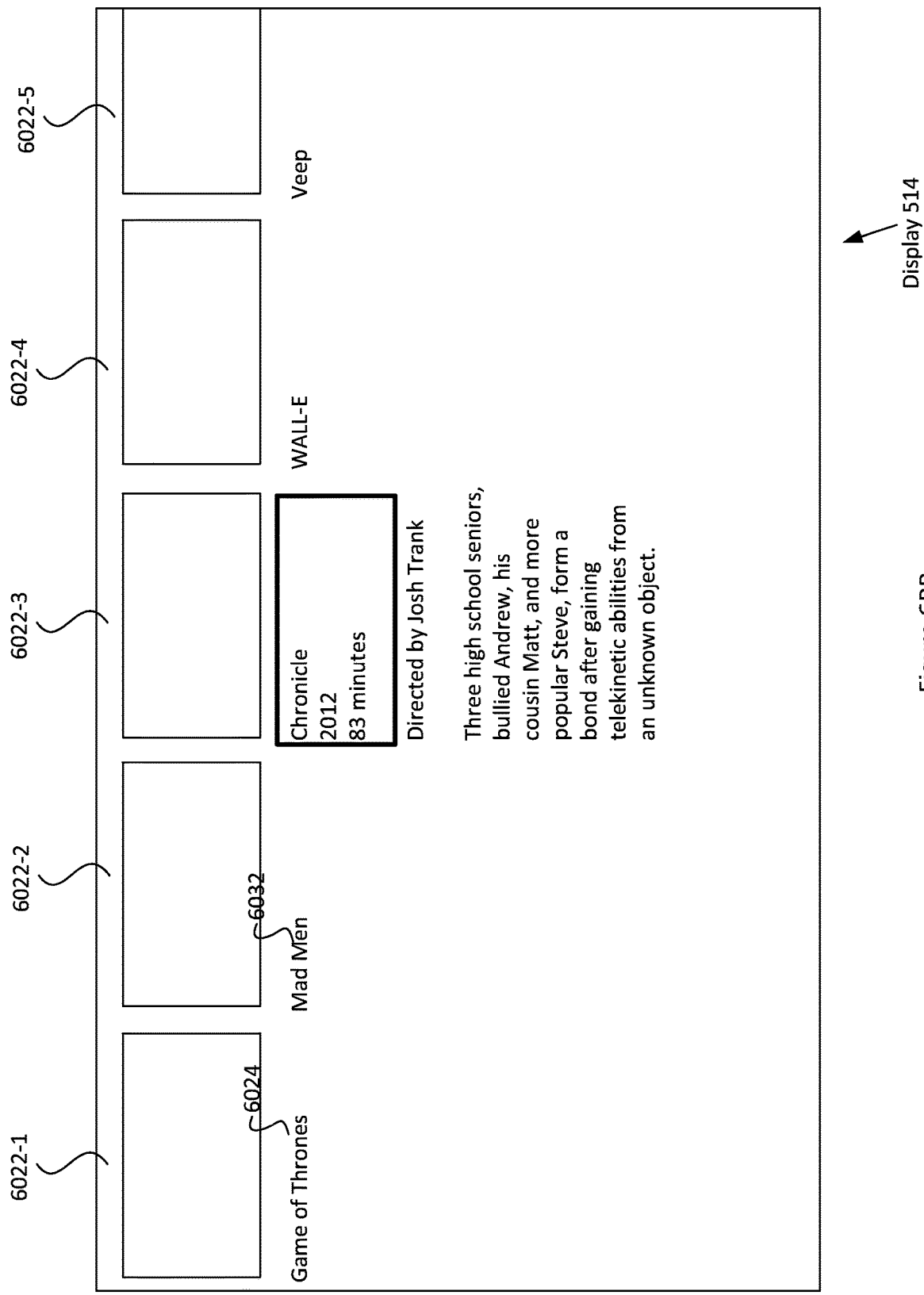
Figure 6E:
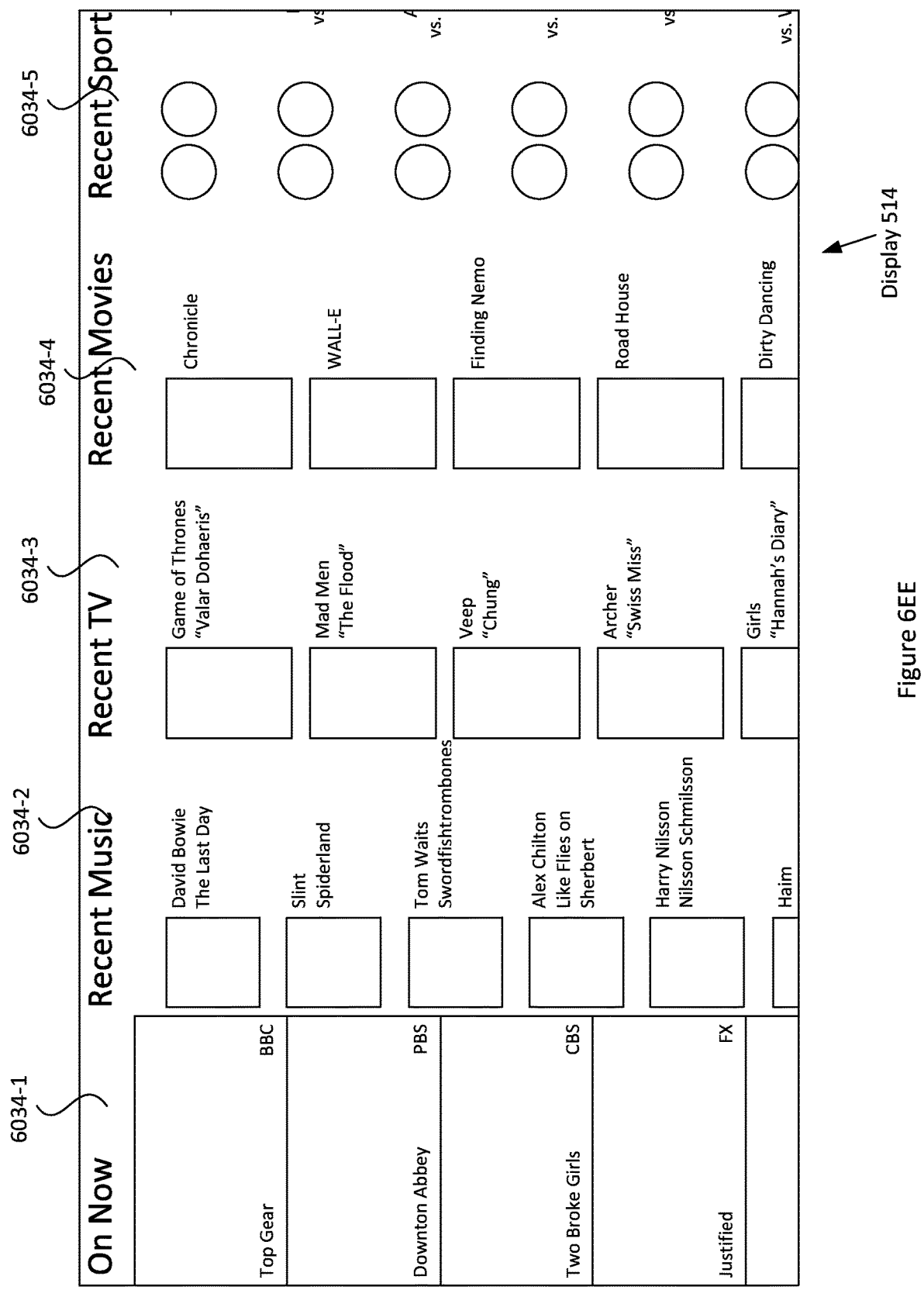
Figure 6F:
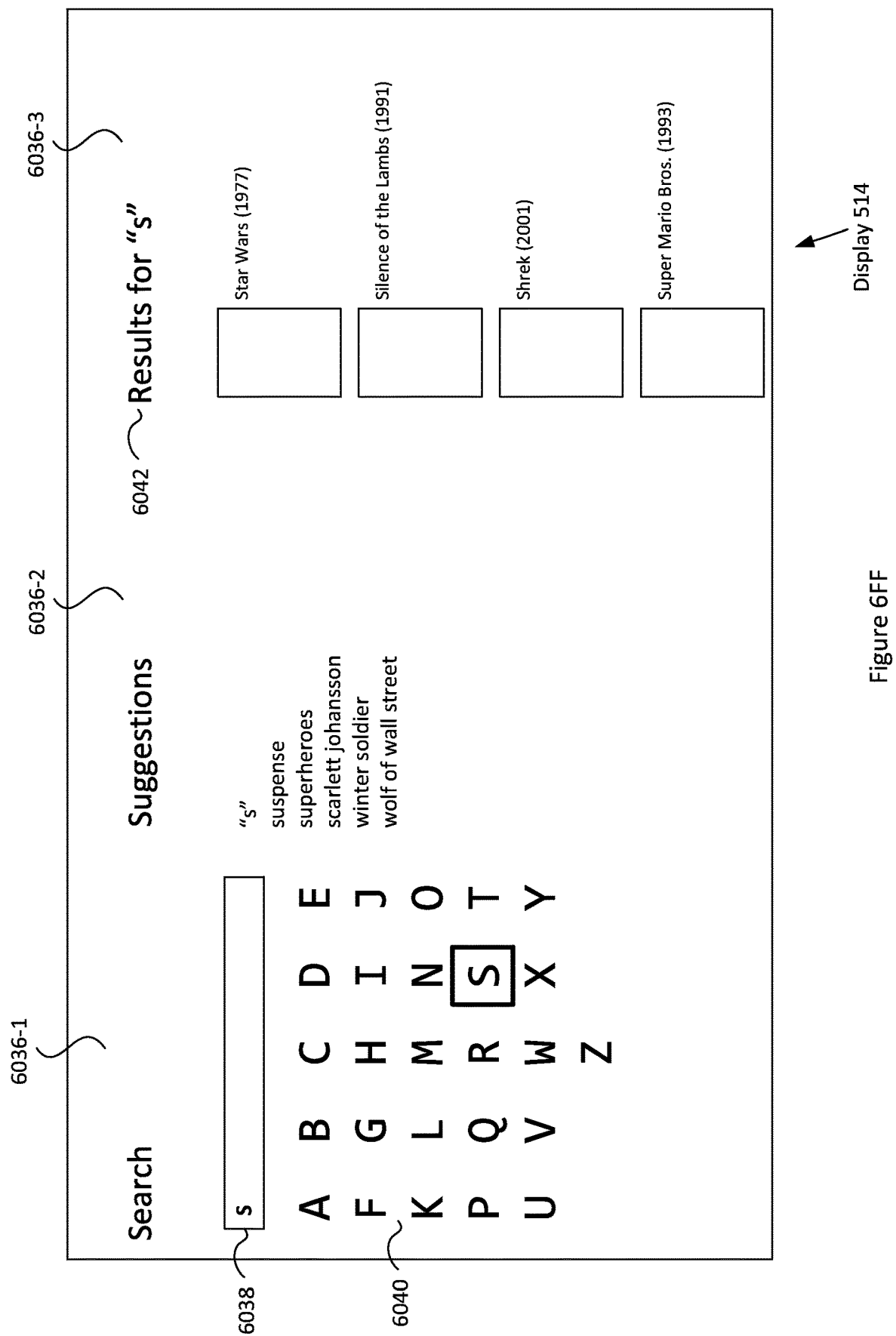
Figure 6G:
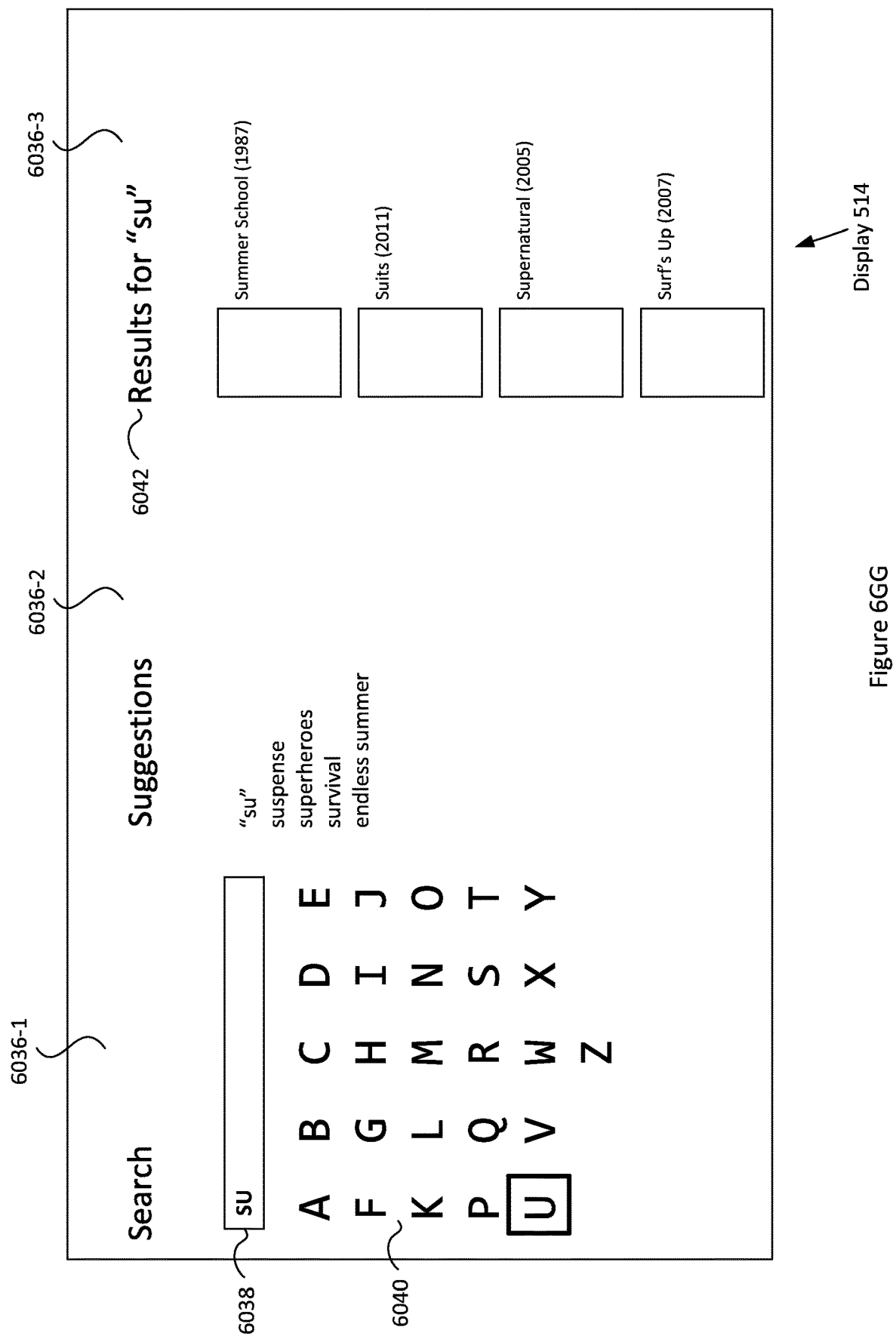
Figure 6H:
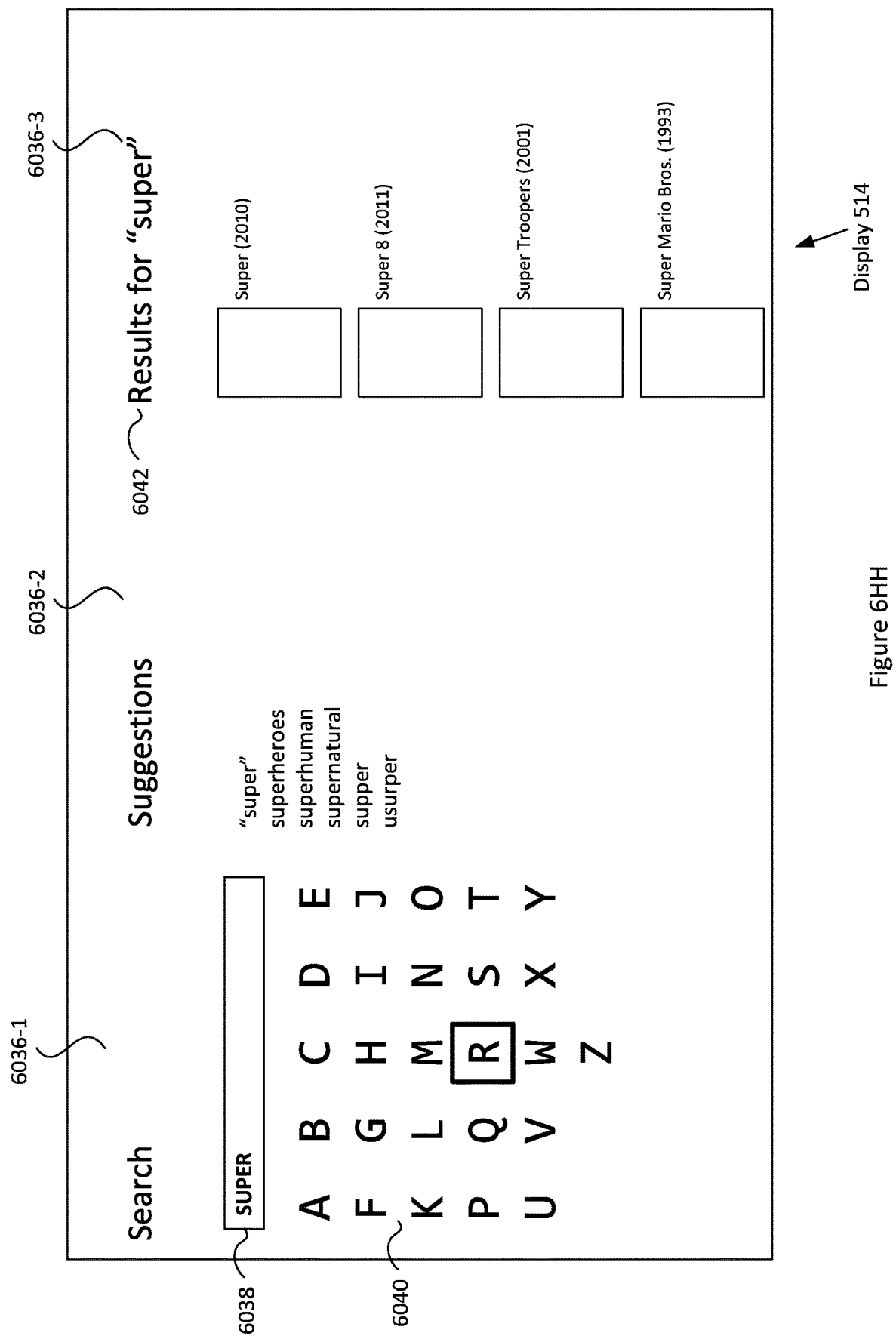
Figure 6I:
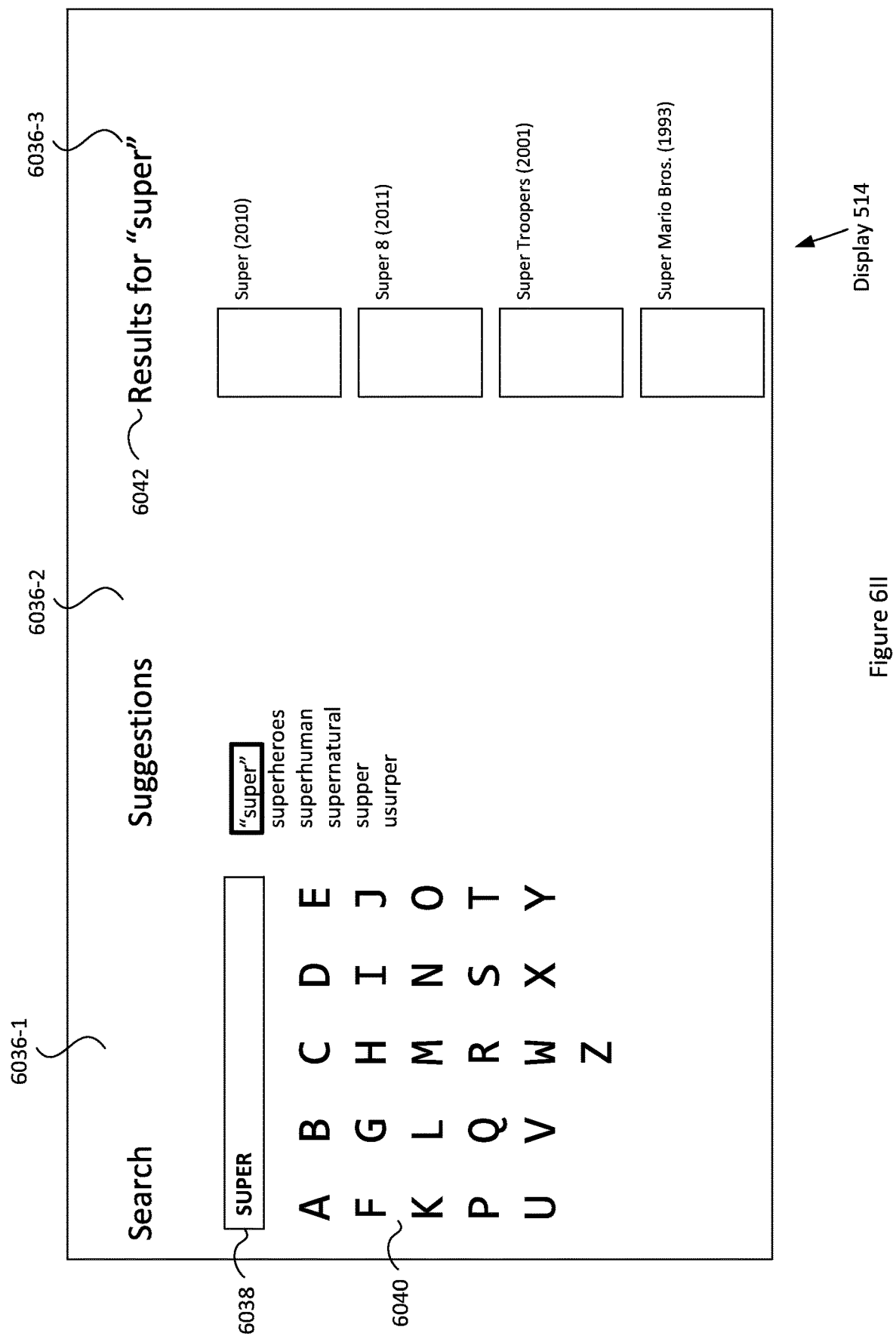
Figure 6J:
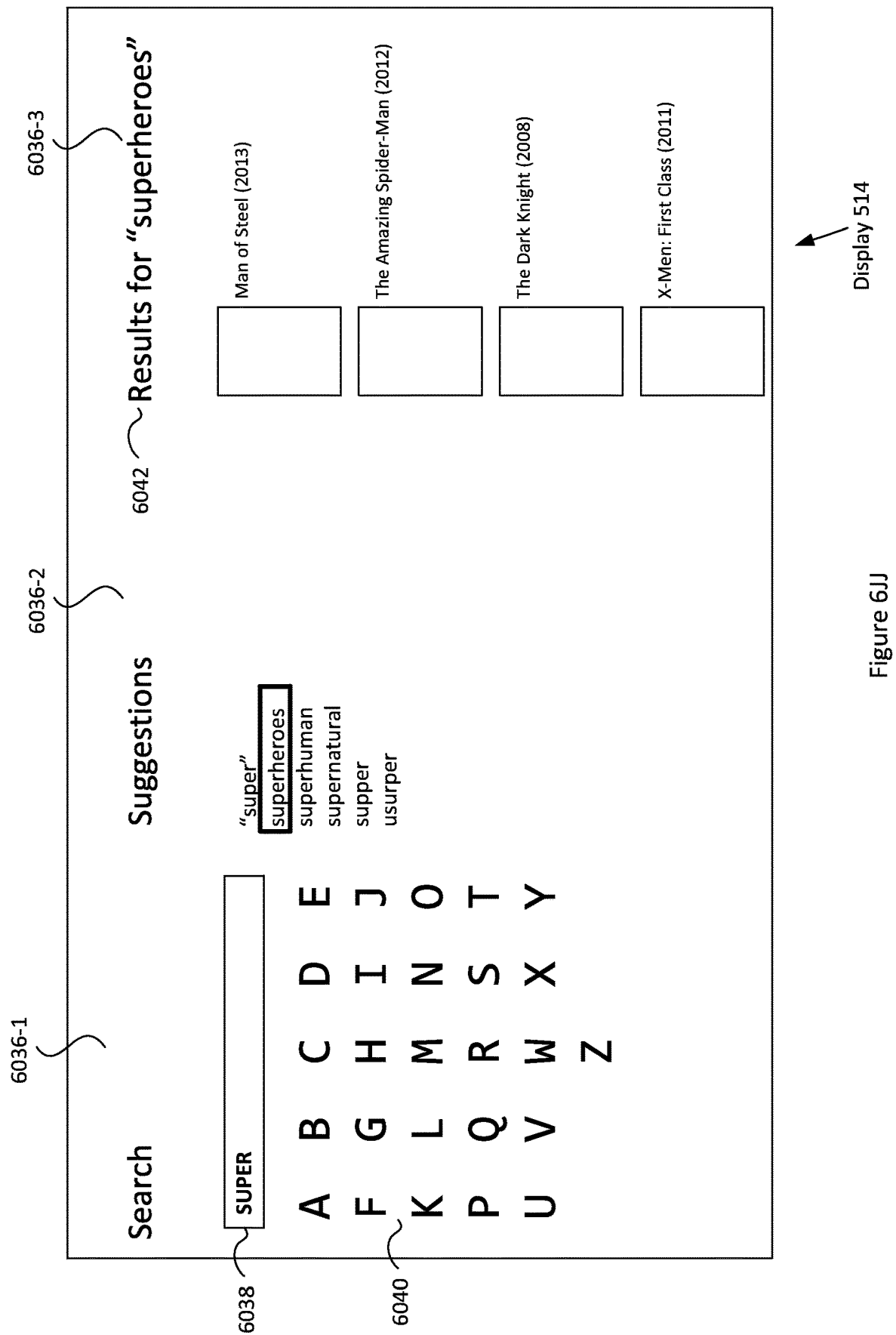
Figure 6K:
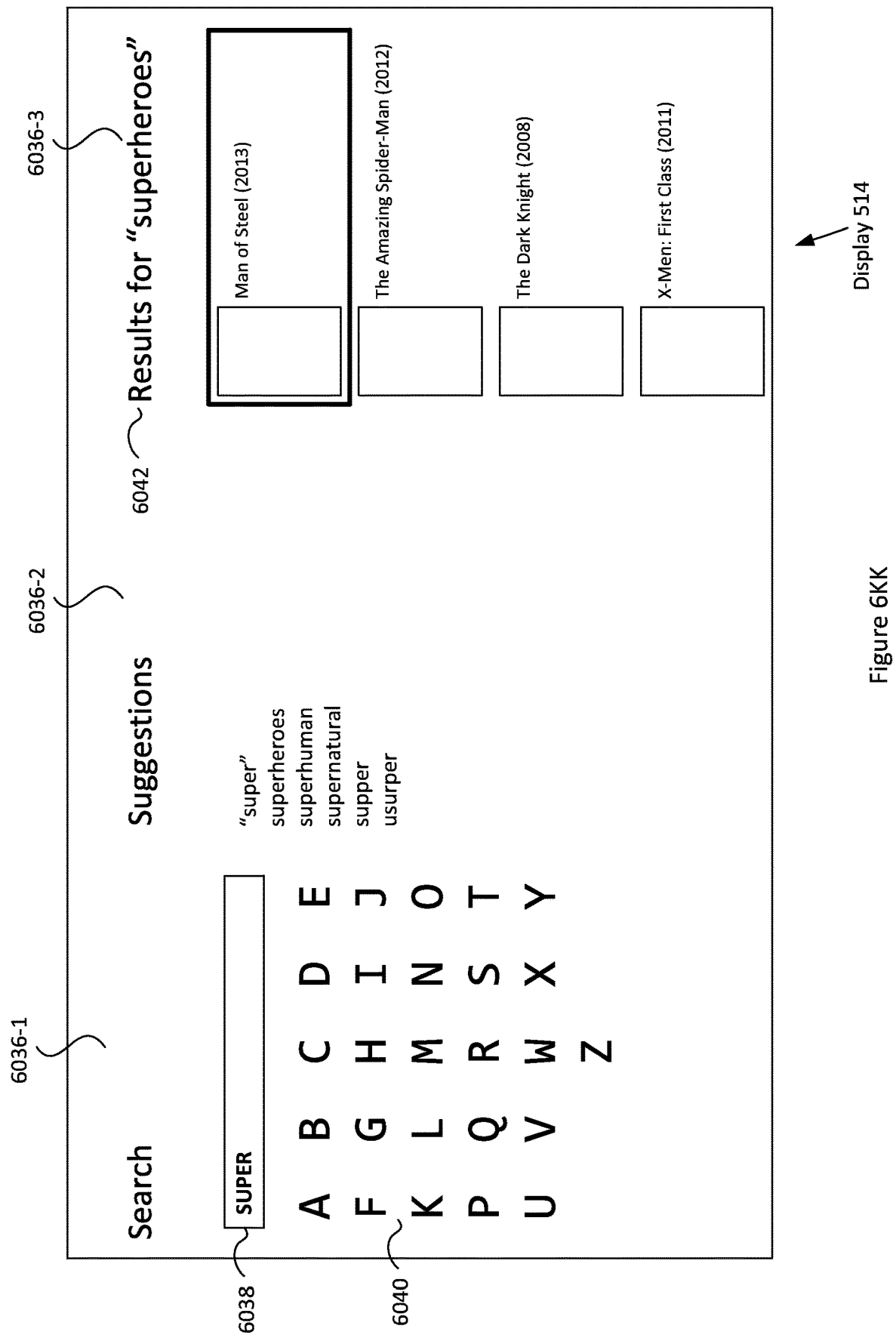
Figure 6L:
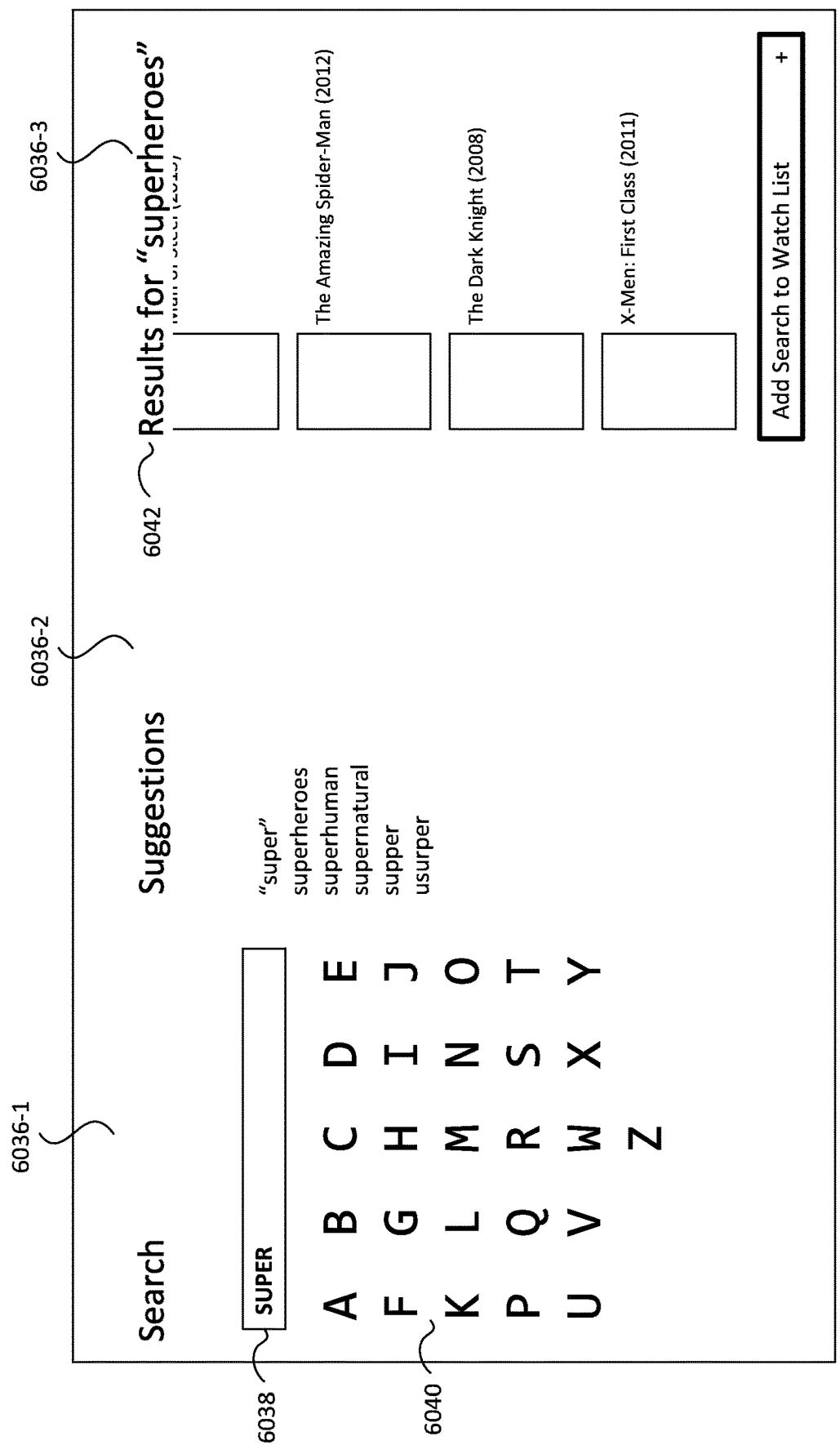
Figure 6M:
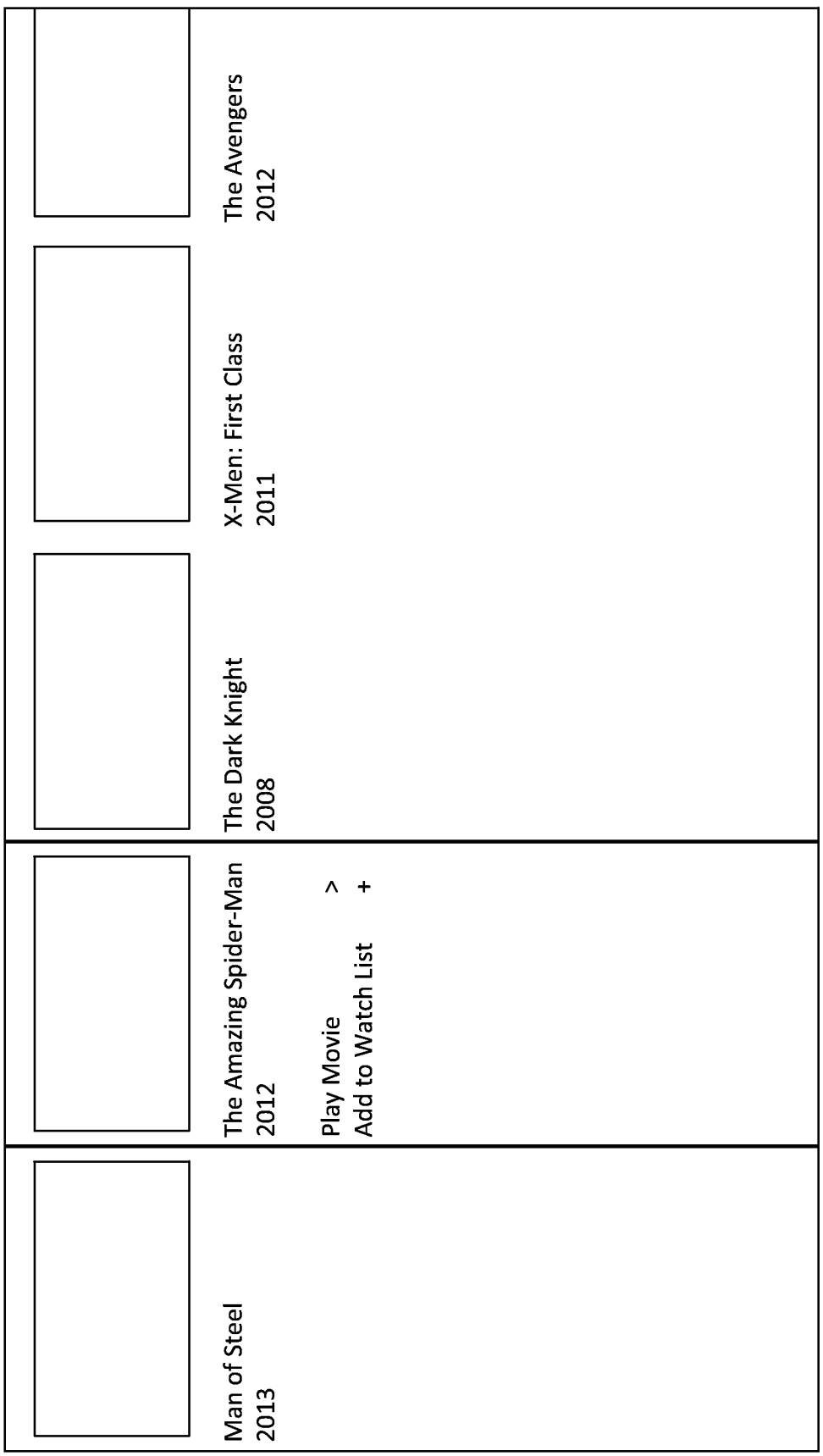
Figure 6N:
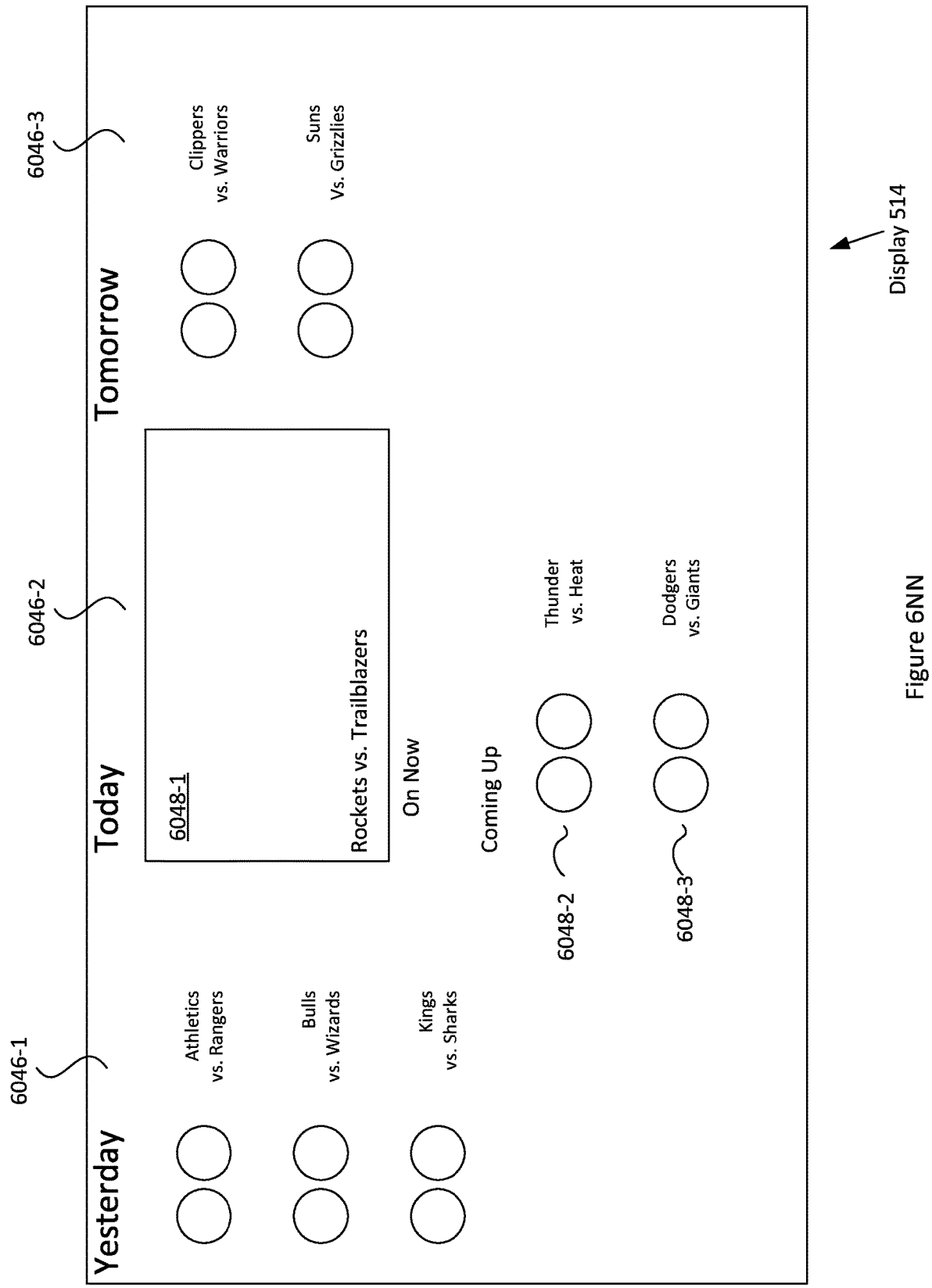
Figure 7A:
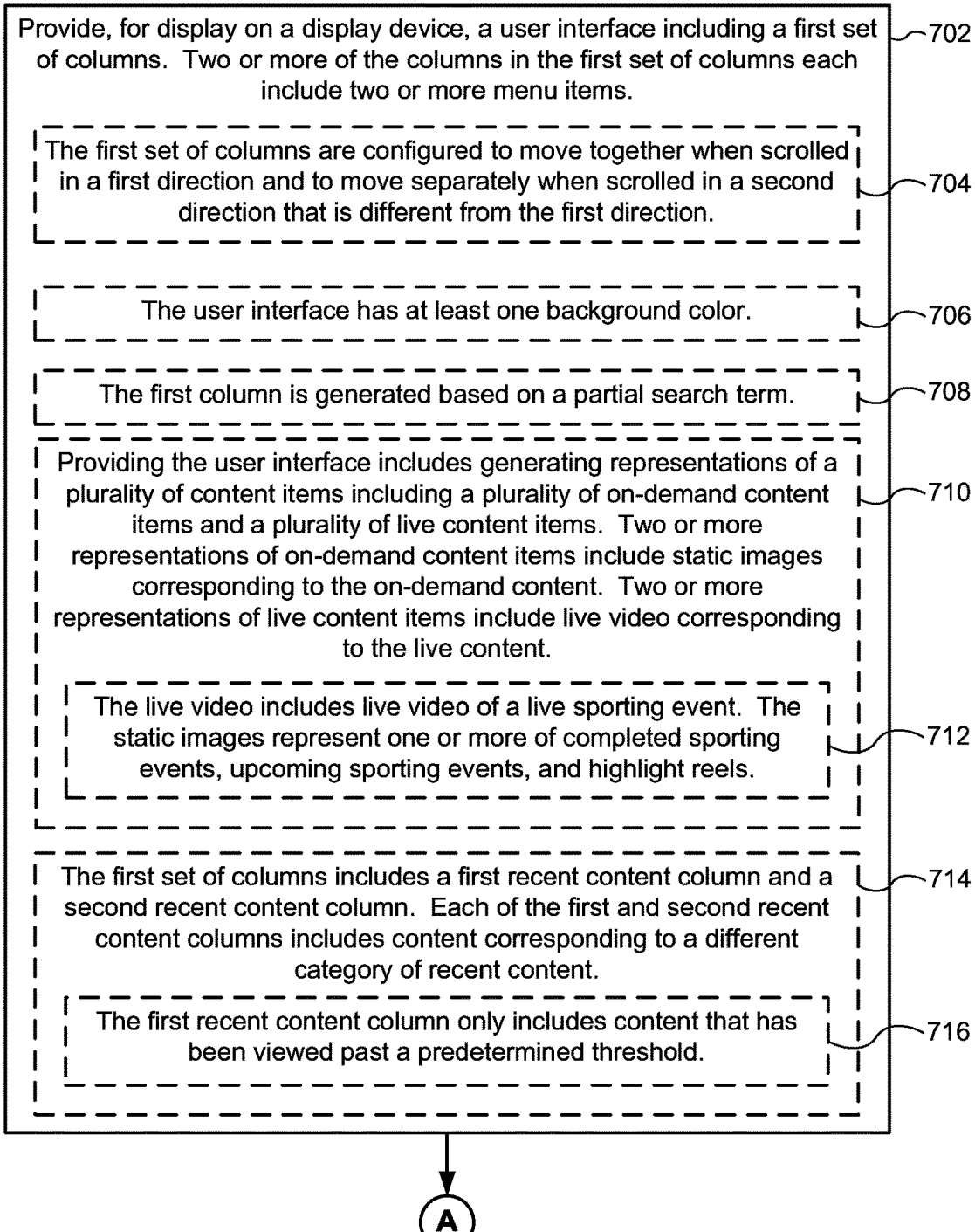
FIGS. 7A-7E are flow diagrams illustrating a method of providing a column user interface in accordance with some embodiments.
Figure 7B:
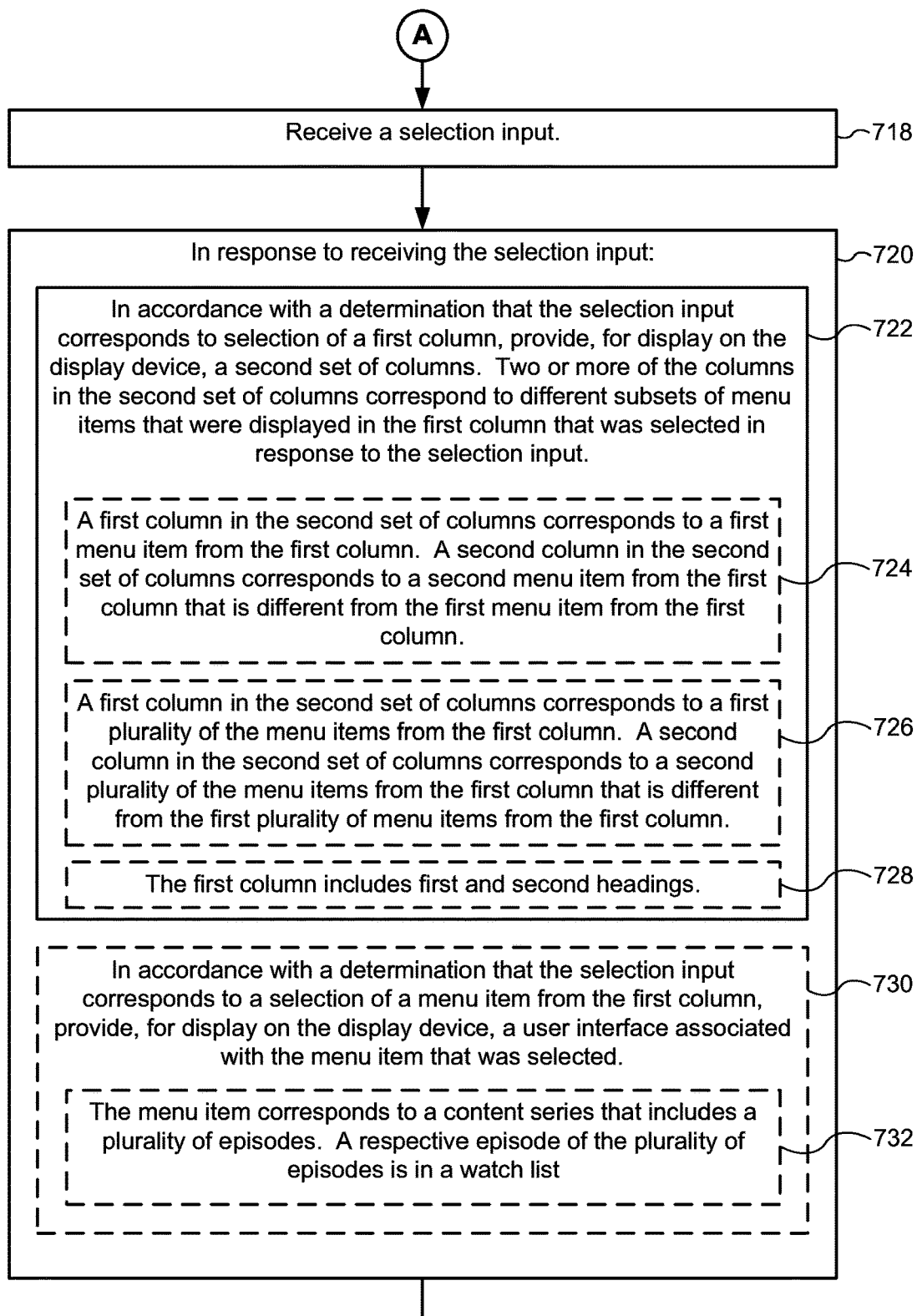
Figure 7C:
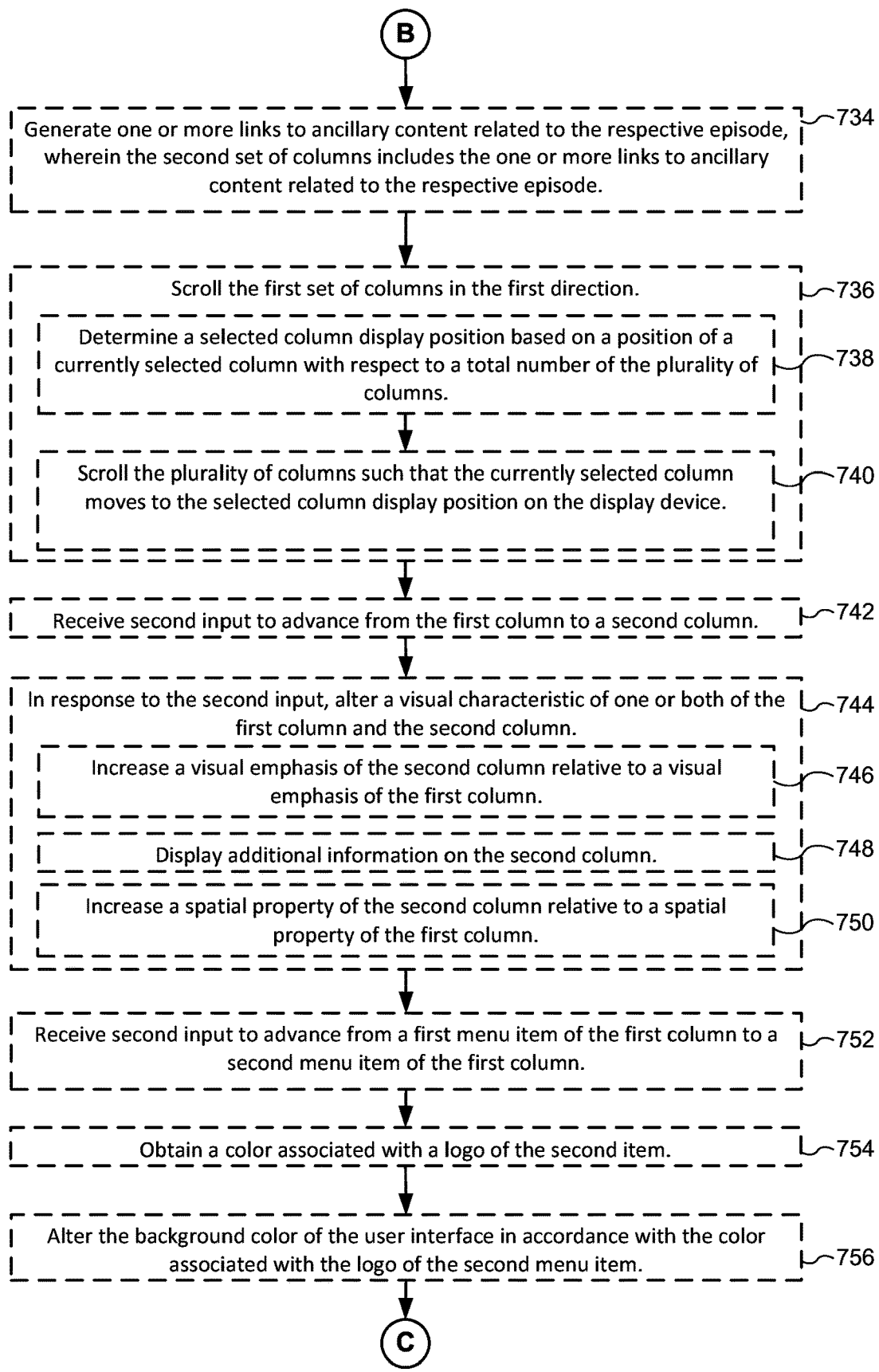
Figure 7D:
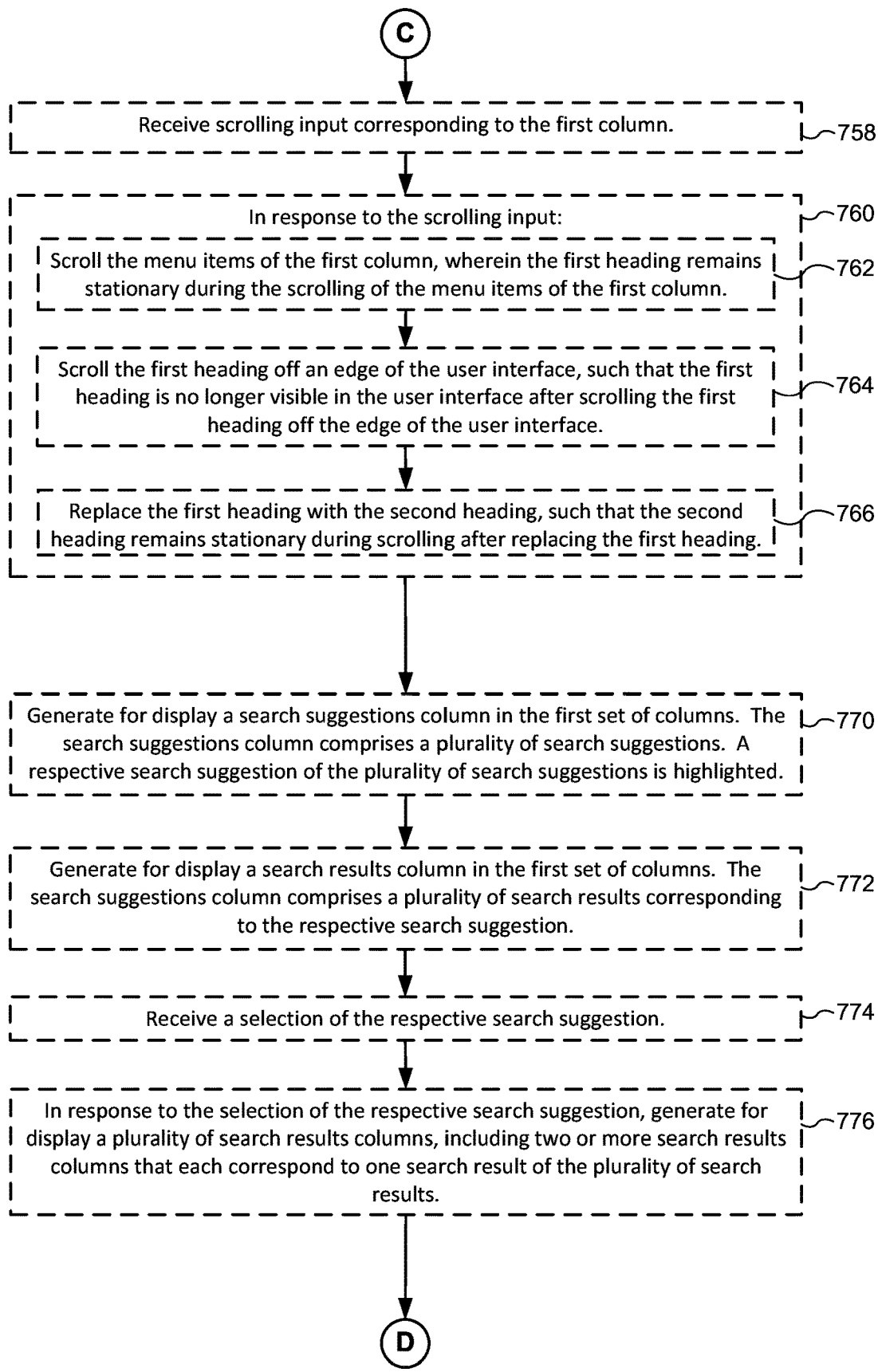
Figure 7E:
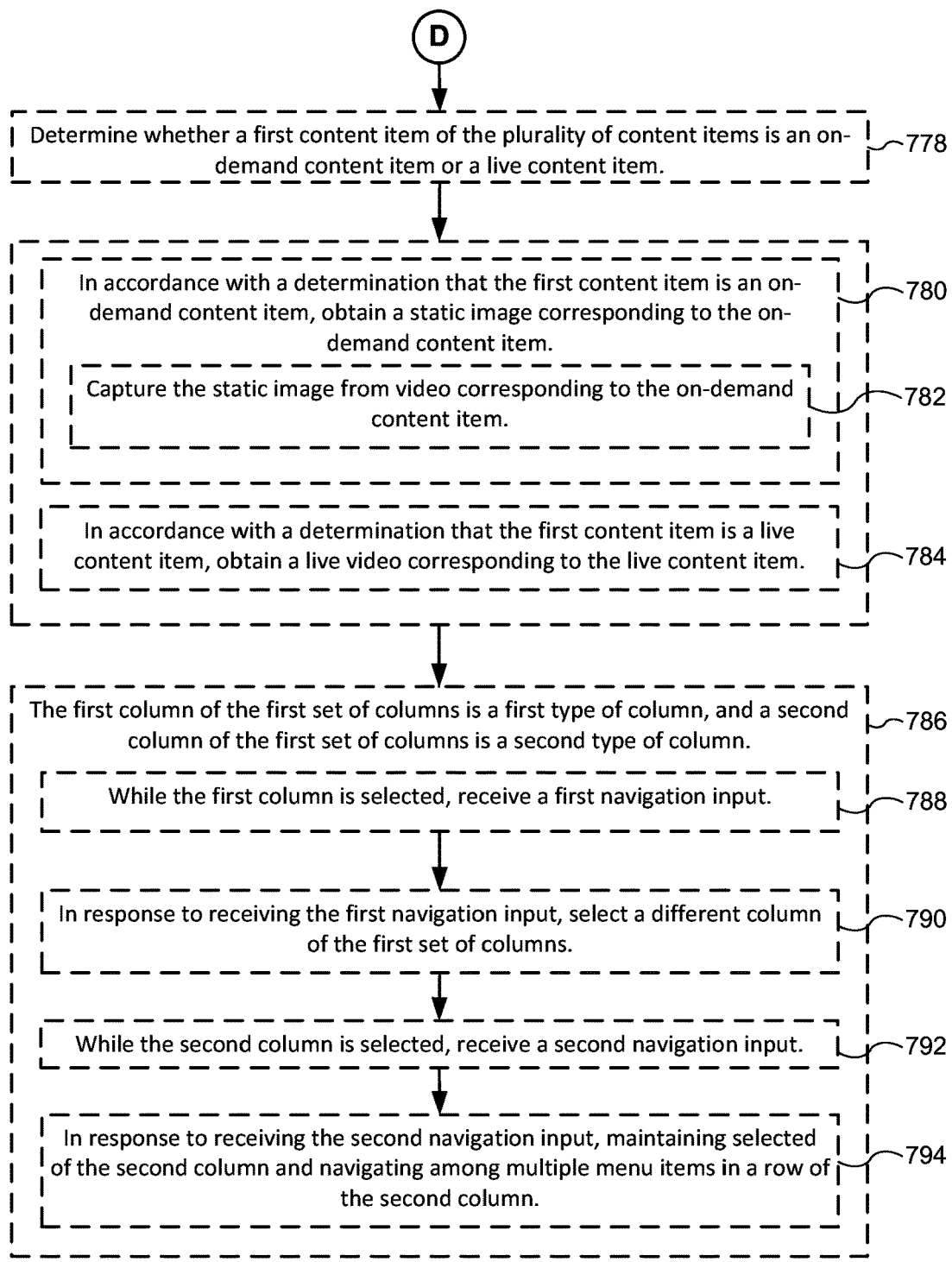

FIGS. 6J-6M illustrate horizontal scrolling of columns in the column interface. In some embodiments, one or more columns are optionally offscreen, and the user can scroll the columns to navigate to additional columns. For example, FIGS. 6K, 6L, and 6M illustrate additional column 6002-6, labeled "Just Kids", which is offscreen in FIG. 6J, move onto the display 514.

In FIGS. 6J-6M, the position of the highlighted column with respect to the display 514 is optionally proportional to the highlighted column's position with respect to the other columns. In FIG. 6J, column 6002-2 is highlighted, and its position is approximately one-third the length of the display 514 from the left edge of the display because column 6002-2 is the second column of six columns. In FIG. 6K, column 6002-3 is highlighted, and its position is approximately one-half the length of the display 514 from the left edge of the display because column 6002-3 is the third column of six columns. In FIG. 6L, column 6002-4 is highlighted, and its position is approximately two-thirds the length of the display 514 from the left edge of the display because column 6002-4 is the fourth column of six columns. In FIG. 6M, column 6002-6 is highlighted, and its position is approximately the full length of the display 514 from the left edge of the display because column 6002-6 is the sixth column of six columns.

FIGS. 6N-6P illustrate vertical scrolling of column in the column interface. Although the columns optionally scroll together horizontally (as illustrated in FIGS. 6J-6M), FIGS. 6N-6P illustrate column 6002-2 scrolling vertically independently of the other columns. In some embodiments, one or more menu items of a column are optionally offscreen, and the user can scroll a column to navigate to additional menu items. For example, FIG. 6P illustrates additional menu item 6006-6, labeled "Road House", which is offscreen in FIGS. 6N and 6O, moving onto the display 514.

FIGS. 6Q-6U illustrate vertical scrolling of a column with sticky headings 6020-1, 6020-2, 6020-3, and 6020-4 in the column interface. As the column 6002-3 is scrolled vertically, each of headings 6020-1, 6020-2, 6020-3, and 6020-4 stops scrolling at the top of the column as menu items below it continue to scroll. For example, the menu items beneath heading 6020-1 scroll up into the heading and disappear in FIGS. 6Q, 6R, and 6S. As heading 6020-2 approaches heading 6020-1 in FIGS. 6S and 6T, the heading 6020-2 replaces heading 6020-1 and at the top of the column and stops scrolling as the menu items below heading 6020-2 continue to scroll. The menu items beneath heading 6020-2 scroll up into the heading and disappear in FIGS. 6S, 6T, and 6U.

FIGS. 6V-6BB illustrate a watch list column interface according to some embodiments. The column interface described herein optionally allows a user to navigate a hierarchy of columns. For example, a user optionally selects the "Watch List" heading 6014 of column 6002-2 in the first set of columns in FIG. 6A to navigate to the second set of columns in the watch list column interface in FIGS. 6V-6BB, and a plurality of the menu items in column 6002-2 correspond to columns in the watch list column interface in FIGS. 6V-6BB.

In some embodiments, a plurality of the menu items in a column in a first set of columns are optionally grouped together in a single column in a second set of columns. For example, FIG. 6V illustrates a plurality of episodes of "Game of Thrones" as menu items 6026-1, 6026-2, and 6026-3 in column 6022-1. If a user selects the column header 6024, then a second set of columns may be displayed on display 514, with the first episode 6026-1 displayed in its own column, and the remaining episodes 6026-2 and 6026-3 grouped as menu items in an additional column.

FIGS. 6W-6BB illustrate various embodiments of indicating a highlighted column. In FIGS. 6W and 6X, the highlighted column is indicated by column focus indicators 6010-1 and 6010-2. In FIGS. 6Y and 6Z, the highlighted column is indicated by increasing the width of the highlighted column relative to the other columns. In FIGS. 6AA and 6BB, the highlighted column is indicated by displaying more information in the highlighted column relative to the other columns.

FIGS. 6CC-6DD illustrate a content series page column interface according to some embodiments. For example, a content series page as illustrated in FIGS. 6CC and 6DD is optionally displayed on the display 514 in response to selection of menu item 6006-2 in FIG. 6A or header 6032 in FIG. 6V. A splash area 6028 optionally includes a still image corresponding to the content series, the title of the content series, and other information corresponding to the content series. A plurality of columns 6030-1, 6030-2, 6030-3, 6030-4, and 6030-5 are optionally displayed in the content series page column interface. In FIG. 6DD, an "Extras" column 6030-5 includes menu items corresponding to content intelligently selected based on its relation to the content series. For example, column 6030-5 includes menu items corresponding to clips of talk shows starring cast members of the content series and a clip of a parody of the content series.

FIG. 6EE illustrates a recent content column interface according to some embodiments. The columns 6034-1, 6034-2, 6034-3, 6034-4, and 6034-5 each correspond to recently viewed content in a particular category.

FIGS. 6FF-6MM illustrate a search column interface according to some embodiments. The columns optionally include search entry column 6036-1, search suggestions column 6036-2, and search results column 6036-3. A user optionally enters letters into the partial search term 6038 using the onscreen keyboard 6040. As the letters are entered, both the search suggestions column 6036-2 and the search results column 6036-3 are automatically updated. While the letters are being entered, the search results optionally reflect an incremental search with results that literally begin with the partial search term 6038. For example, in FIG. 6FF, the partial search term 6038 is "s", so all the results in column 6036-3 begin with "s". Likewise, in FIG. 6GG, the partial search term 6038 is "su", so all the results in column 6036-3 begin with "su". And in FIG. 6HH, the partial search term 6038 is "super", so all the results in column 3036-3 begin with "super". However, once a search suggestion is highlighted in search suggestions column 6036-2, the search results column 6036-3 optionally reflect a search of the search suggestion. Thus, in FIG. 6JJ, the suggestion "superheroes" is selected, and the results in column 6036-3 are content items about superheroes (e.g., superhero movies). In FIGS. 6KK and 6LL, the menu items of the search results column 6036-3 are navigated to optionally select one of the results (as in FIG. 6KK) or add the search to a watch list (as in FIG. 6LL). Adding a search to a watch list optionally populates the watch list with the search results. FIG. 6MM illustrates a search results column interface which is optionally displayed in response to selection of the search results heading 6042. In FIG. 6MM, each column corresponds to a menu item of the search results column 6036-3 in FIGS. 6FF-6LL.

FIG. 6NN illustrates a sports column interface according to some embodiments. A sports column interface is optionally displayed on display 514 in response to selection of the sports heading 6044 in FIGS. 6A-6U. The sports column interface optionally includes columns 6046-1, 6046-2, and 6046-3, corresponding to yesterday, today, and tomorrow, respectively, although additional columns may correspond to additional days, in some embodiments. The menu items in column 6046-1 correspond to games that have already been played and are available for viewing on-demand. Selection of any of the menu items in column 6046-1 optionally causes playback of the corresponding game or highlights of the corresponding game, among other possibilities. Menu item 6048-1 in the today column 6046-2 corresponds to a game currently airing live, and the menu item 6048-1 is optionally represented by live video of the live game. Selection of the menu item 6048-1 optionally changes to the channel on which the live game is currently airing. Selection of upcoming games 6048-2, 6048-3, or any menu items in column 6046-3 optionally prompts the user to add the corresponding game to a watch list, or to display more information about the corresponding game, among other possibilities.

FIGS. 7A-7E are flow diagrams illustrating a method of providing a column user interface in accordance with some embodiments. The method is optionally performed at an electronic device as described above with reference to FIGS. 1A-B and 2-5 (e.g., electronic device 100, 300, or 500, etc.). Some operations in method 700 are, optionally, combined and/or the order of some operations is, optionally, changed.

As described below, the method 700 provides ways in which a device can display a column user interface. The method reduces the cognitive burden on a user when interacting with a user interface on the device by providing an intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device (e.g., a set top box or other user interface generating device that is in communication with a display device) with one or more processors and memory provides (702), for display on a display device (e.g., a separate display such as a television or computer monitor, or an integrated display that is part of the electronic device), a user interface including a first set of columns. Two or more columns in the first set of columns each include two or more menu items (e.g., text, images, and/or video content, some or all of which may optionally include links to content, applications, and/or other user interfaces). For example, FIGS. 6A-6NN illustrate user interfaces with sets of columns (e.g., columns 6002-1, 6002-2, 6002-3, 6002-4, 6002-5, and 6002-6). Each of the example columns has two or more menu items (e.g., menu items 6004-1, 6004-2, 6004-3, and 6004-4 in column 6002-1 and menu items 6006-1, 6006-2, 6006-3, 6006-4, and 6006-5 in column 6002-2). In some embodiments, the user interface optionally has (706) at least one background color.

In some embodiments, the first set of columns are optionally configured (704) to move together when scrolled in a first direction (e.g., a horizontal direction) and to move separately when scrolled in a second direction (e.g., a vertical direction) that is different from the first direction (e.g., when scrolling horizontally, all the columns are scrolled, and when scrolling vertically, only a selected column is scrolled; and when scrolling horizontally, the onscreen horizontal position of the selected column may be proportional to the relative position of the selected column among the total plurality of columns, including those that are offscreen). For example, FIGS. 6J-6M illustrate the columns 6002-1, 6002-2, 6002-3, 6002-4, 6002-5, and 6002-6 moving together when scrolled horizontally from right to left. Further, FIGS. 6N-6P illustrate the column 6002-2 moving separately from the other columns when scrolled horizontally.

In some embodiments, the electronic device receives (718) a selection input. In response (720) to receiving the selection input, in accordance with a determination that the selection input corresponds to selection of a first column (e.g., an input selecting a heading of the first column, such as a "Watch List" heading for a Watch List column), the electronic device provides (722), for display on the display device, a second set of columns (different from the first set of columns). Two or more of the columns in the second set of columns correspond to different subsets of menu items that were displayed in the first column that was selected in response to the selection input (e.g., each column in the second set of columns corresponds to an item in the user's Watch List) (and one or more additional columns, e.g., each subset is an episode of a television series, and the one or more additional columns include extra content related to the television series). In some embodiments, a first column in the second set of columns optionally corresponds (724) to a first menu item from the first column (and only the first menu item), and a second column in the second set of columns optionally corresponds to a second menu item from the first column that is different from (e.g., distinct from) the first menu item from the first column (and only the second menu item). For example, FIG. 6B illustrates selection of a "Watch List" heading of a watch list column 6002-2, resulting in a set of watch list columns illustrated in FIG. 6V. Several of the watch list columns in FIG. 6V correspond to different subsets of menu items in the watch list column 6002-2 in FIG. 6B (e.g., "Chronicle" menu item 6006-3 corresponds to "Chronicle" column 6022-3, "WALL-E" menu item 6006-4 corresponds to "WALL-E" column 6022-4, etc.).

In some embodiments, a first column in the second set of columns optionally corresponds (726) to a first plurality of the menu items from the first column, and a second column in the second set of columns optionally corresponds to a second plurality of the menu items from the first column that is different from (e.g., distinct from) the first plurality of menu items from the first column (e.g., a subset for each letter in the alphabet, a subset for each artist in a music collection, a subset for each television series in a Watch List, etc.). For example, FIG. 6V illustrates a plurality of episodes of "Veep" grouped in column 6022-5.

In some embodiments, in response (720) to the selection input, in accordance with a determination that the selection input corresponds to selection of a menu item from the first column (e.g., an input selecting a representation of an episode of a television show from the Watch List column) the electronic device optionally provides (730), for display on the display device, a user interface associated with the menu item that was selected (e.g., content associated with the menu item, a set of columns associated with the menu item, a grid associated with the menu item, a set of rows associated with the menu item, etc.). In some embodiments, the menu item optionally corresponds (732) to a content series (e.g., a television series, a miniseries, a set of webisodes, among other possibilities) that includes a plurality of episodes, and a respective episode of the plurality of episodes is in a watch list (e.g., a list of movies, content series, episodes, music actors, genres, searches, etc.). For example, FIG. 6D illustrates selection of a "Mad Men" menu item 6006-2, resulting in a user interface associated with the content series "Mad Men" as illustrated in FIG. 6CC.

In some embodiments, the electronic device optionally generates (734) one or more links to ancillary content related to the respective episode (e.g., a clip of a talk show featuring an actor from the episode, a clip of a parody of the episode, a song featured in the episode, among other possibilities), and the second set of columns optionally includes the one or more links to ancillary content related to the respective episode. For example, FIG. 6DD illustrates column 6030-5 comprising a plurality of links to ancillary content related to an episode of the content series "Mad Men".

In some embodiments, the first set of columns are optionally scrolled (736) in a first direction. A selected column display position (e.g., a horizontal position on the display given with respect to the user interface) is optionally determined (738) based on a position of a currently selected column with respect to a total number of the plurality of columns (e.g., the position may be the first column of twelve total columns, or the sixth column of six total columns). The plurality of columns are optionally scrolled (740) such that the currently selected column moves to the selected column display position on the display device (e.g., if there are 100 total columns, including those that are currently offscreen, and the selected column is the 20th column, then the selected column may have a horizontal position that is 20% of the total horizontal display length; similarly, if there are 100 total columns, and the selected column is the 90th column, then the selected column may have a horizontal position that is 90% of the total display length, etc.). For example, FIGS. 6J-6M illustrate the columns 6002-1, 6002-2, 6002-3, 6002-4, 6002-5, and 6002-6 with proportional scrolling, as described above with reference to FIGS. 6J-6M.

In some embodiments, second input to advance from the first column to a second column is optionally received (742), and in response to the second input, a visual characteristic of one or both of the first column and the second column is optionally altered (744). In some embodiments, altering the visual characteristic optionally includes increasing (746) a visual emphasis of the second column relative to a visual emphasis of the first column (e.g., by increasing a brightness, contrast, opacity, saturation, or other visual property of the second column). For example, FIGS. 6W and 6X illustrate increasing a visual emphasis of column 6022-3 when navigation advances from column 6022-2 to column 6022-3. In some embodiments, altering the visual characteristic optionally includes displaying (748) additional information on the second column (and/or removing information from the first column). For example, FIGS. 6AA and 6BB illustrate displaying additional information of column 6022-3 when navigation advances from column 6022-2 to column 6022-3. In some embodiments, altering the visual characteristic optionally includes increasing (750) a spatial property of the second column relative to a spatial property of the first column (e.g., by increasing a width, height, z position, or other spatial property of the second column). For example, FIGS. 6Y and 6Z illustrate increasing a width of column 6022-3 when navigation advances from column 6022-2 to column 6022-3.

In some embodiments, second input is optionally received (752) to advance from a first menu item of the first column to a second menu item of the first column. In response, a color associated with a logo of the second menu item is optionally obtained (754), and the background color of the user interface is optionally altered (756) in accordance with the color associated with the logo of the second menu item. For example, FIGS. 6C and 6D illustrate navigation advancing from menu item 6006-1 to menu item 6006-2, and a background color of the user interface optionally changes as described above with reference to FIGS. 6C and 6D.

In some embodiments, the first column optionally includes (728) first and second headings (e.g., sub-headings of the first column). A scrolling input corresponding to the first column is optionally received (758). In response (760) to the scrolling input, the menu items of the first column are optionally scrolled (762), where the first heading remains stationary during the scrolling of the menu items of the first column. The first heading is optionally scrolled (764) off an edge of the user interface, such that the first heading is no longer visible in the user interface after scrolling the first heading off the edge of the user interface. The first heading is optionally replaced (766) with the second heading, such that the second heading remains stationary during scrolling after replacing the first heading. For example, FIGS. 6Q-6U illustrate vertical scrolling of a column 6002-3 with sticky headings 6020-1, 6020-2, 6020-3, and 6020-4.

In some embodiments, the first set of columns is optionally generated based on a partial search term (708). A search suggestions column in the first set of columns is optionally generated (770) for display. The search suggestions column optionally comprises a plurality of search suggestions, and a respective search suggestion of the plurality of search suggestions is optionally highlighted. A search results column in the first set of columns is optionally generated (772) for display. The search suggestions column optionally comprises a plurality of search results corresponding to the respective search suggestion. A selection of the respective search suggestion is optionally received (774), and in response to the selection of the respective search suggestion, a plurality of search results columns is optionally generated (776) for display, including two or more search results columns that each correspond to one search result of the plurality of search results. For example, FIGS. 6FF-6LL illustrate a search user interface including search results column 6036-6, and FIG. 6MM illustrates a corresponding search results column interface, with columns corresponding to the search results in search results column 6036-6.

In some embodiments, providing the user interface including the first set of columns optionally includes generating (710) representations of a plurality of content items including a plurality of on-demand content items (e.g., content items stored locally at the electronic device or other local storage, or content items stored remotely at a server) and a plurality of live content items (e.g., content items live streaming over the internet, live broadcast content items, or other live content items). Two or more of the representations of on-demand content items optionally include static images (e.g., a movie poster, production art, a screenshot, or other placeholder image) corresponding to the on-demand content, and two or more of the representations of live content items optionally include live video corresponding to the live content. In some embodiments, the live video optionally includes (712) live video of a live sporting event, and the static images optionally represent one or more of completed sporting events, upcoming sporting events, and highlight reels. For example, FIG. 6NN illustrates a sports user interface including live video 6048-1 of a live sporting event, and static images (such as menu items 6048-2 and 6048-3) representing upcoming sporting events.

In some embodiments, it is optionally determined (778) whether a first content item of the plurality of content items is an on-demand content item or a live content item. In accordance with a determination that the first content item is an on-demand content item, a static image corresponding to the on-demand content item is optionally obtained (780). In accordance with a determination that the first content item is a live content item, a live video corresponding to the live content item is optionally obtained (784). In some embodiments, obtaining the static image optionally includes capturing the static image from video corresponding to the on-demand content item. For example, FIG. 6A illustrates live content items 6004-1, 6004-2, 6004-3, and 6004-4, and on-demand content items 6006-1, 6006-2, 6006-3, 6006-4, and 6006-5. The static image for 6006-4 is optionally obtained by capturing the image from the corresponding "WALL-E" video content.

In some embodiments, the first set of columns optionally includes (714) a first recent content column and a second recent content column. Each of the first and second recent content columns optionally includes content corresponding to a different category of recent content (e.g., a recent TV column, a recent movies column, a recent songs column, etc.). In some embodiments, the first recent content column only includes (716) content that has been viewed past a predetermined threshold (e.g., only content that has been viewed for at least 8 minutes, only content that has been viewed at least 10% of its running time, etc.; and the threshold may be different for different content categories, for example, television may have a 2 minute threshold, movies may have a 10 minutes threshold, and songs may have a 30 second threshold, etc.). For example, FIG. 6EE illustrates a recent content column user interface with recent content columns 6034-2, 6034-3, 6034-4, and 6034-5, each corresponding to recent music, recent TV, recent movies, and recent sports, respectively.

In some embodiments, the first column of the first set of columns is optionally (786) a first type of column (e.g., a column with only a single menu item in each row of the column) and a second column of the first set of columns is optionally a second type of column (e.g., a column with multiple menu items in one or more rows of the columns). While the first column is selected, a first navigation input (e.g., a swipe left or a swipe right) is optionally received (788). In response to receiving the first navigation input, a different column of the first set of columns is optionally selected (790) (e.g., a column immediately to the left or the right of the first column). While the second column is selected, a second navigation input (e.g., a swipe left or a swipe right) is optionally received (792). In response to receiving the second navigation input, selection of the second column is optionally maintained (794) and multiple menu items in a row of the second column are optionally navigated among. For example, FIGS. 6F-6I illustrate column 6002-2 being a column with only a single menu item in each row (e.g., menu item 6006-2), and column 6002-3 being a column with two items in each row (e.g., menu items 6016-1 and 6016-2). A first navigation input moves the selection from column 6002-2 in FIG. 6F to column 6002-3 in FIG. 6G. However, a second navigation input moves the selection within column 6002-3 from menu item 6016-1 in FIG. 6G to menu item 6016-2 in FIG. 6H, and selection of column 6002-3 is maintained.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 7A-7E are, optionally, implemented by components depicted in FIGS. 1A-1B. For example, providing operation 702, receiving operation 718, and providing operation 722 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 7A-7E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIGS. 7A-7E. For example, the user interfaces, columns, menu items, content items, and display devices described above with reference to method 700 optionally have one or more of the characteristics of the user interfaces, columns menu items, content items, and display devices described herein with reference to other methods described herein (e.g., methods 900, 1100, 1300 and 1500). For brevity, these details are not repeated here.

Translucent Menu

Many electronic devices have graphical user interfaces that overlay some other visual content. The sudden display of a new graphical user interface can be jarring to a smooth user experience. The embodiments described below provide a smooth transition to a graphical user interface by first displaying a translucent graphical user interface over visual content, and then decreasing the degree of translucency as the user continues to interact with the interface.

FIGS. 8A-8D illustrate exemplary translucent user interfaces in accordance with some embodiments. The user interfaces in these figures are used to illustrate processes described below, including the processes described below with reference to FIGS. 9A-9C.

Figure 8A:
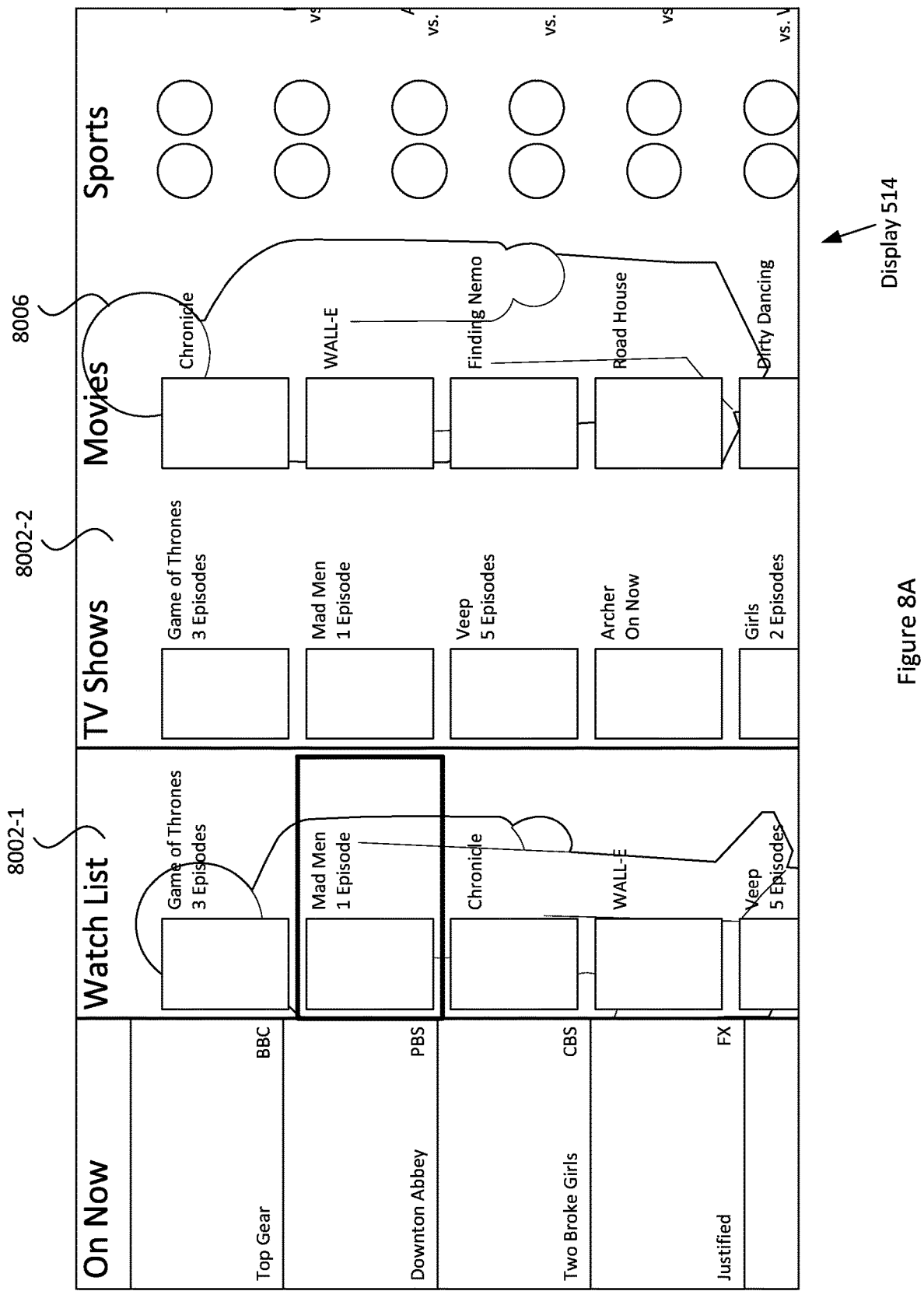
FIGS. 8A-8D illustrate exemplary translucent user interfaces in accordance with some embodiments of the disclosure.
Figure 8B:
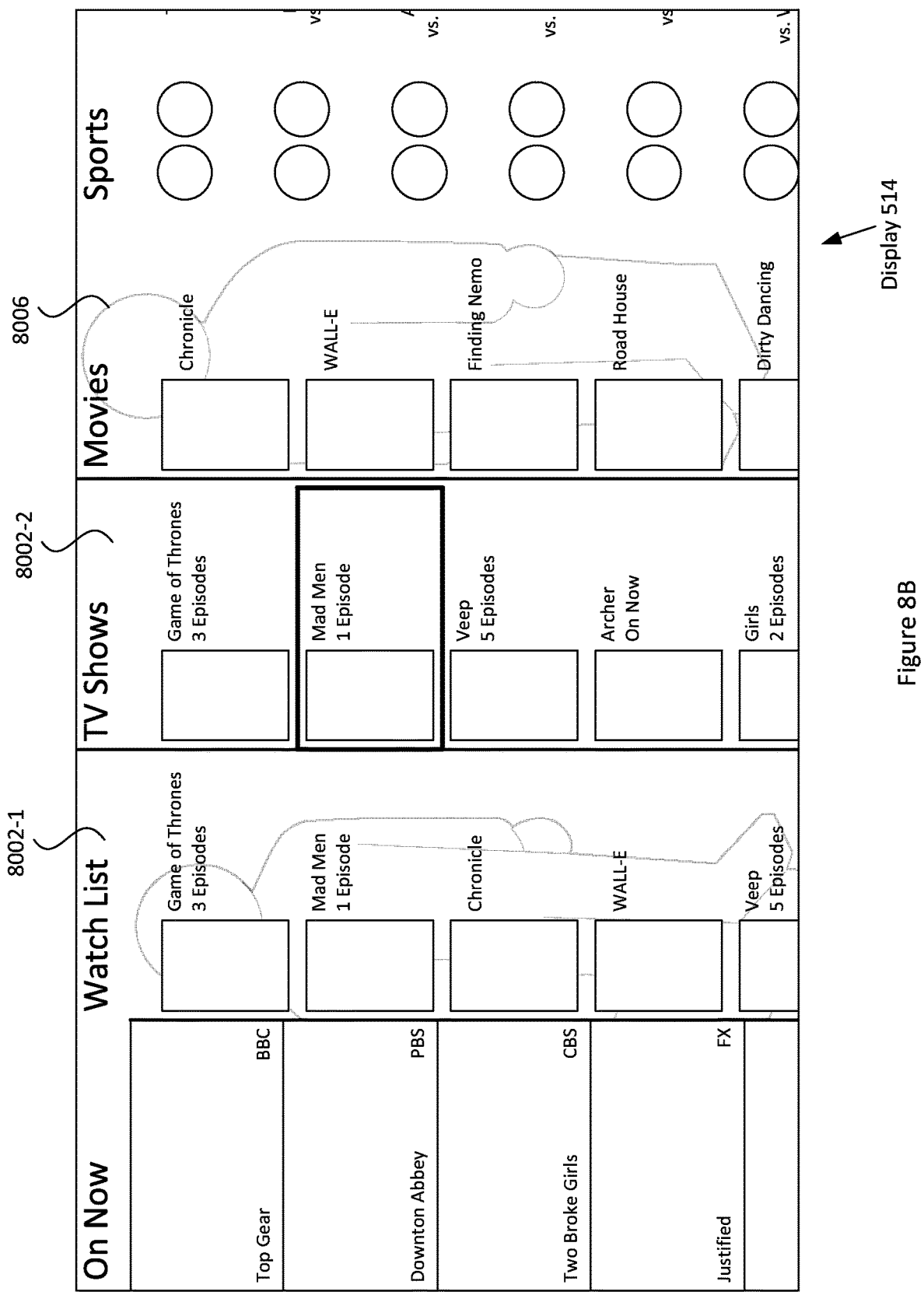

FIGS. 8A-8B illustrate an example of a translucent user interface. A user interface is displayed on display 514 of a device (e.g., device 500) and is responsive to user input, such as on touch-sensitive surface 451 and/or remote 510. The user interface in FIGS. 8A-8B includes columns 8002-1 and 8002-2 overlaid in the user interface over visual content 8006 in the background (e.g., playing video content, paused video content, a still image, etc.). At least one portion of the user interface is translucent with a first degree of translucency such that an indication of the background visual content 8006 is visible through the translucent portion. For example, the non-text and non-image portions of column 8002-2 are optionally translucent with a first degree of translucency. FIGS. 8A and 8B illustrate navigation from column 8002-1 to column 8002-2. Based on the navigation to the right, the first degree of translucency may decrease from the first degree of translucency to a second degree of translucency, such that the indication of the background visual content 8006 is less visible through the translucent portion. In some embodiments, based on navigation in the opposite direction (e.g., from column 8002-2 back to column 8002-1), the degree of translucency of the translucent portion optionally increases from the second degree back to the first degree. In some embodiments, any further interaction, in any direction, optionally causes the translucency to continue decreasing until the user interface is opaque with respect to the background visual content 8006.

Figure 8C:
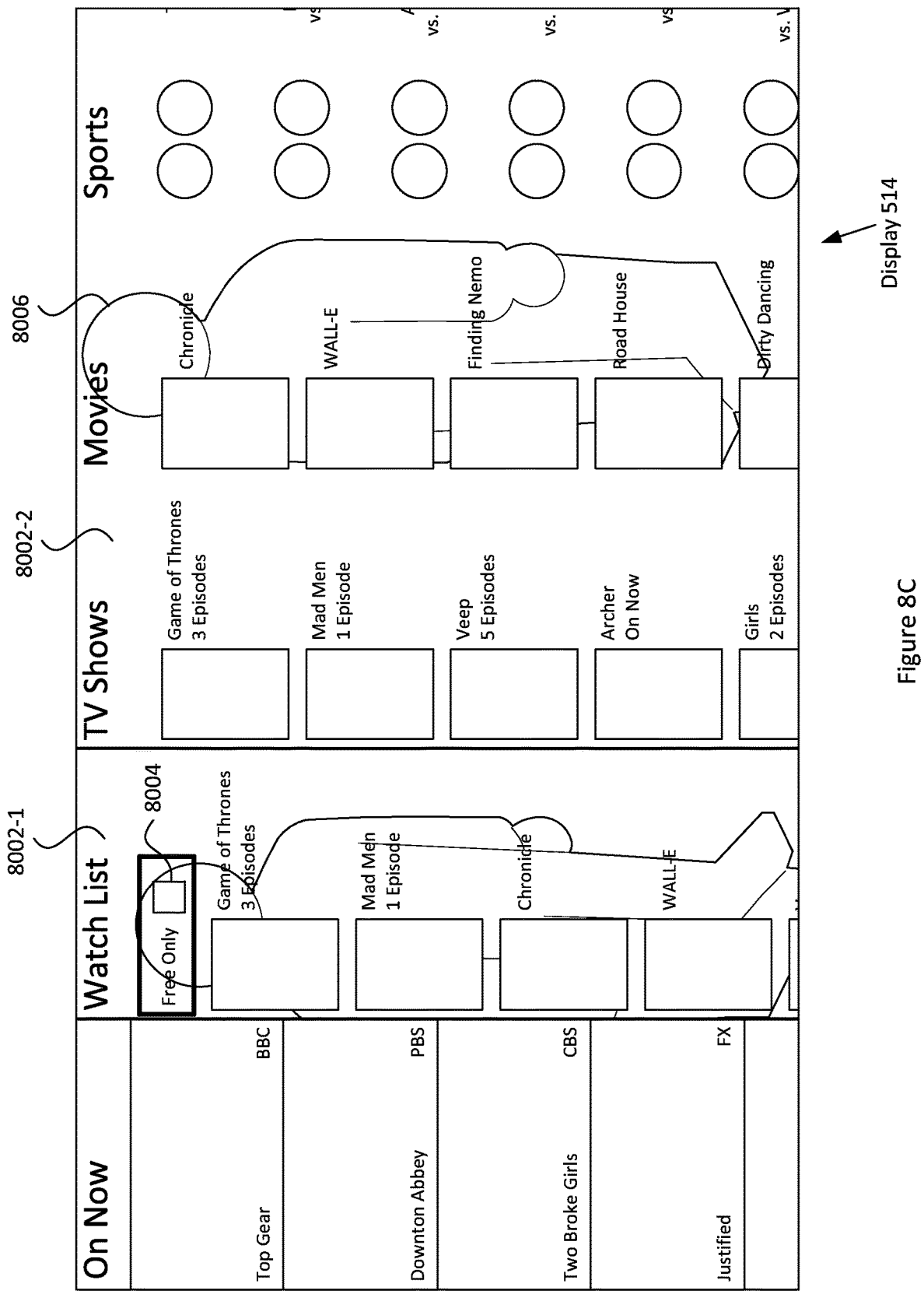
Figure 8D:
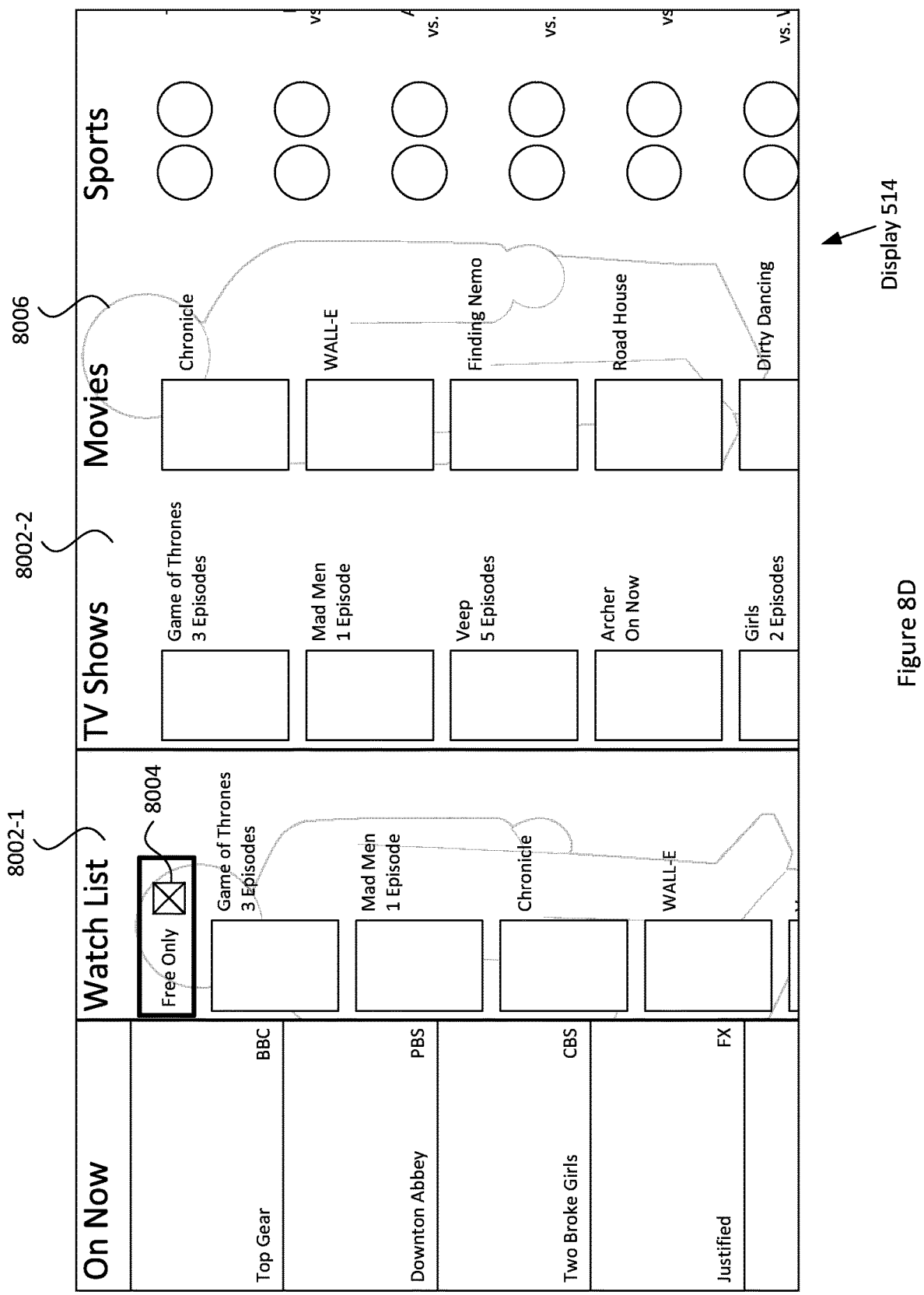

FIGS. 8C-8D illustrate another example of a translucent user interface. The user interface is overlaid over visual content 8006 in the background of the user interface. At least one portion of the user interface is translucent with a first degree of translucency such that an indication of the background visual content 8006 is visible through the translucent portion. The user interface includes checkbox 8004, and FIGS. 8C and 8D illustrate the checkbox changing state from unchecked to checked, optionally in response to selection of the checkbox. Checking the checkbox optionally causes the translucent portion of the user interface to decrease its translucency from the first degree of translucency to a second degree of translucency.

Figure 9B:
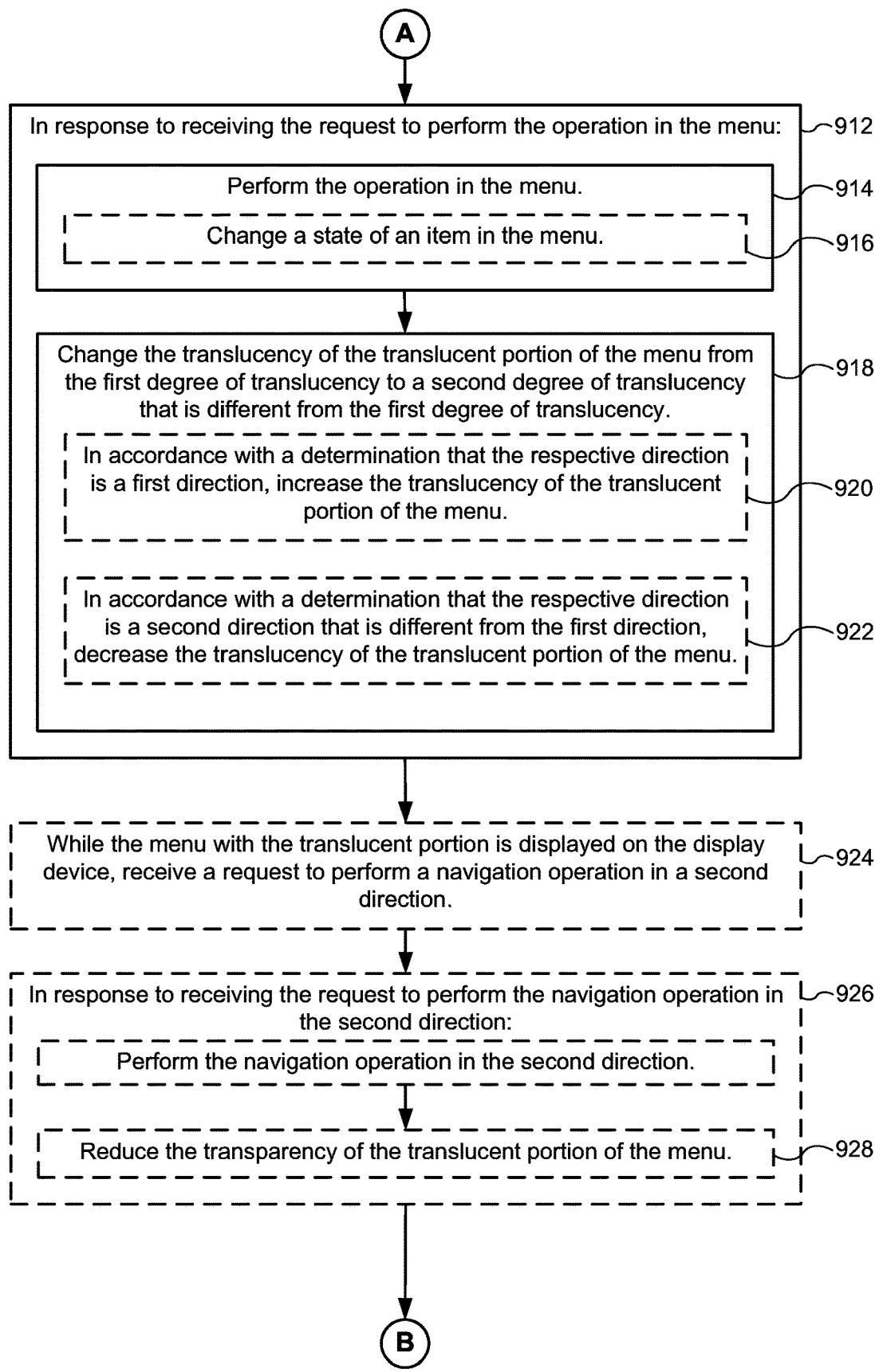
Figure 9C:
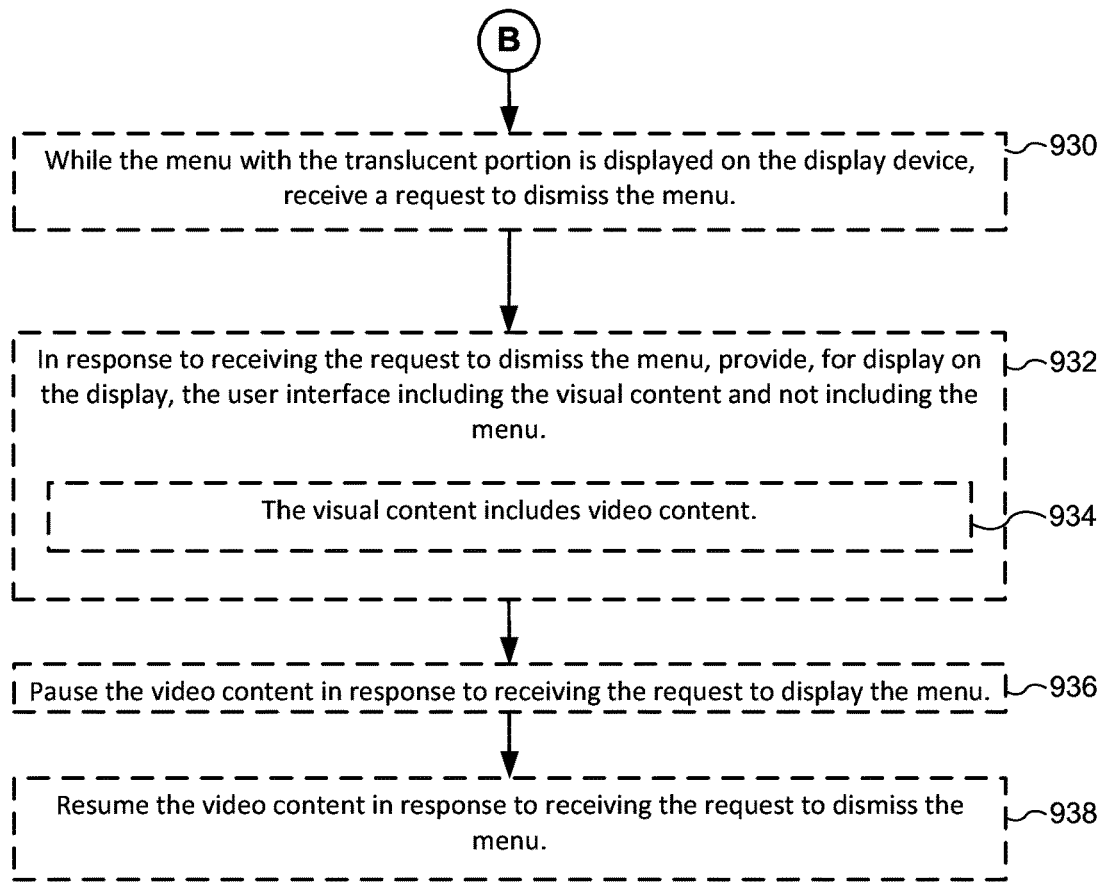

FIGS. 9A-9C are flow diagrams illustrating a method of providing a user interface with translucent portions in accordance with some embodiments. The method is optionally performed at an electronic device as described above with reference to FIGS. 1A-B and 2-5 (e.g., electronic device 100, 300, or 500, etc.). Some operations in method 900 are, optionally, combined and/or the order of some operations is, optionally, changed.

As described below, the method 900 provides ways in which a device can display a user interface with translucent portions. The method reduces the cognitive burden on a user when interacting with a user interface on the device by providing a smooth and intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device (e.g., a set top box or other user interface generating device that is in communication with a display device) with one or more processors and memory, while a user interface that includes visual content (e.g., video, still image, animation, etc.) is displayed on a display, receives (902) a request to display a menu for controlling the visual content that is displayed in the user interface.

In some embodiments, in response to receiving the request to display the menu, the electronic device provides (904), for display on the display device, an updated user interface that includes the menu, where the menu includes at least one translucent portion with a first degree (or amount) of translucency (in some examples, the whole menu is translucent), so that an indication of the visual content in the user interface can be seen through the translucent portion of the menu in accordance with the first degree of translucency. In some embodiments, the menu optionally includes (906) a first set of columns, two or more columns in the first set of columns each including two or more menu items (e.g., text, images, and/or video content, some or all of which may optionally include links to content, applications, and/or other user interfaces). For example, FIG. 8A illustrates a user interface including columns 8002-1 and 8002-2, and at least a portion of the columns are optionally translucent such that visual content 8006 can be seen through the translucent portion.

In some embodiments, while the menu with the translucent portion is displayed on the display device, the electronic device receives (908) a request to perform an operation in the menu (e.g., a menu navigation operation such as switching from displaying one column to displaying another column or advancing from a first menu item to a second menu item). In some embodiments, the menu operation is optionally (910) a navigation operation that corresponds to a request to move the menu in a respective direction.

In some embodiments, in response (912) to receiving the request to perform the operation in the menu, the electronic device performs (914) the operation in the menu. For example, FIGS. 8A and 8B illustrate a navigation operation from column 8002-1 to column 8002-2.

In some embodiments, performing the operation in the menu optionally includes (916) changing a state of an item in the menu (e.g., selecting a menu item, activating a checkbox, or manipulating a slider, among other possibilities). Thus, in some embodiments, performing the operation in the menu includes performing an operation other than merely navigating through the menu (e.g., by scrolling through items in the menu). For example, FIGS. 8C and 8D illustrate checking a checkbox 8004 in column 8002-1.

Further in response (912) to receiving the request to perform the operation in the menu, the electronic device changes (918) the translucency of the translucent portion of the menu from the first degree of translucency to a second degree of translucency that is different from the first degree of translucency (e.g., once the user has indicated an intention to interact with the menu, the visual properties of the menu are changed so as to make the menu more legible). For example, in FIGS. 8B and 8D, the translucency of a portion of the interface may different from the translucency in FIGS. 8A and 8C, respectively, such that the background visual content 8006 is less visible in FIGS. 8B and 8D than in FIGS. 8A and 8C.

In some embodiments, in accordance with a determination that the respective direction is a first direction, the translucency of the translucent portion of the menu is optionally increased (920). For example, FIG. 8A to 8B illustrates navigation to the right and translucency of the translucent portion decreasing, such that the background visual content 8006 is less visible in FIG. 8B than in FIG. 8A. In accordance with a determination that the respective direction is a second direction that is different from (e.g., opposite to) the first direction, the translucency of the translucent portion of the menu is optionally decreased (922). For example, FIG. 8B to 8A illustrates navigation to the left and translucency of the translucent portion increasing, such that background visual content 8006 is more visible in FIG. 8A than in FIG. 8B.

In some embodiments, while the menu with the translucent portion is displayed on the display device, a request is optionally received (924) to perform a navigation operation in a second direction (e.g., a direction opposite the first direction). In response to receiving the request to perform the navigation operation in the second direction, the navigation operation is optionally performed (926) in the second direction, and the translucency of the translucent portion of the menu is optionally reduced (928).

In some embodiments, while the menu with the translucent portion is displayed on the display device, a request is optionally received (930) to dismiss the menu. In response to receiving the request to dismiss the menu, the user interface including the visual content and not including the menu is optionally provided (932) for display on the display device. In some embodiments, the visual content optionally includes (934) video content. The video content is optionally paused (936) in response to receiving the request to display the menu, and the video content is optionally resumed (938) in response to receiving the request to dismiss the menu.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B. For example, receiving operation 902, providing operation 904, receiving operation 908, performing operation 914, and changing operation 918 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIGS. 9A-9C. For example, the user interfaces, columns, menu items, content items, and display devices described above with reference to method 900 optionally have one or more of the characteristics of the user interfaces, columns menu items, content items, and display devices described herein with reference to other methods described herein (e.g., methods 700, 1100, 1300 and 1500). For brevity, these details are not repeated here.

Gradual User Interface

Many electronic devices have graphical user interfaces that overlay some other visual content. The sudden display of a new graphical user interface can be jarring to a smooth user experience. The embodiments described below provide a smooth transition to a graphical user interface by presenting a first column after a column display condition (e.g., detecting presence of a user, detecting motion proximate the electronic device, or detecting a face of a user using an optical sensor, among other possibilities) has been met, and then gradually presenting additional columns of a column user interface after input is received (e.g., a swipe, a tap, or other input to expose one or more additional columns, among other possibilities).

FIGS. 10A-10F illustrate the gradual display of a column user interface over content (e.g., passive content) in accordance with some embodiments. The user interfaces in these figures are used to illustrate processes described below, including the processes described below with reference to FIGS. 11A-11B.

Figure 10A:
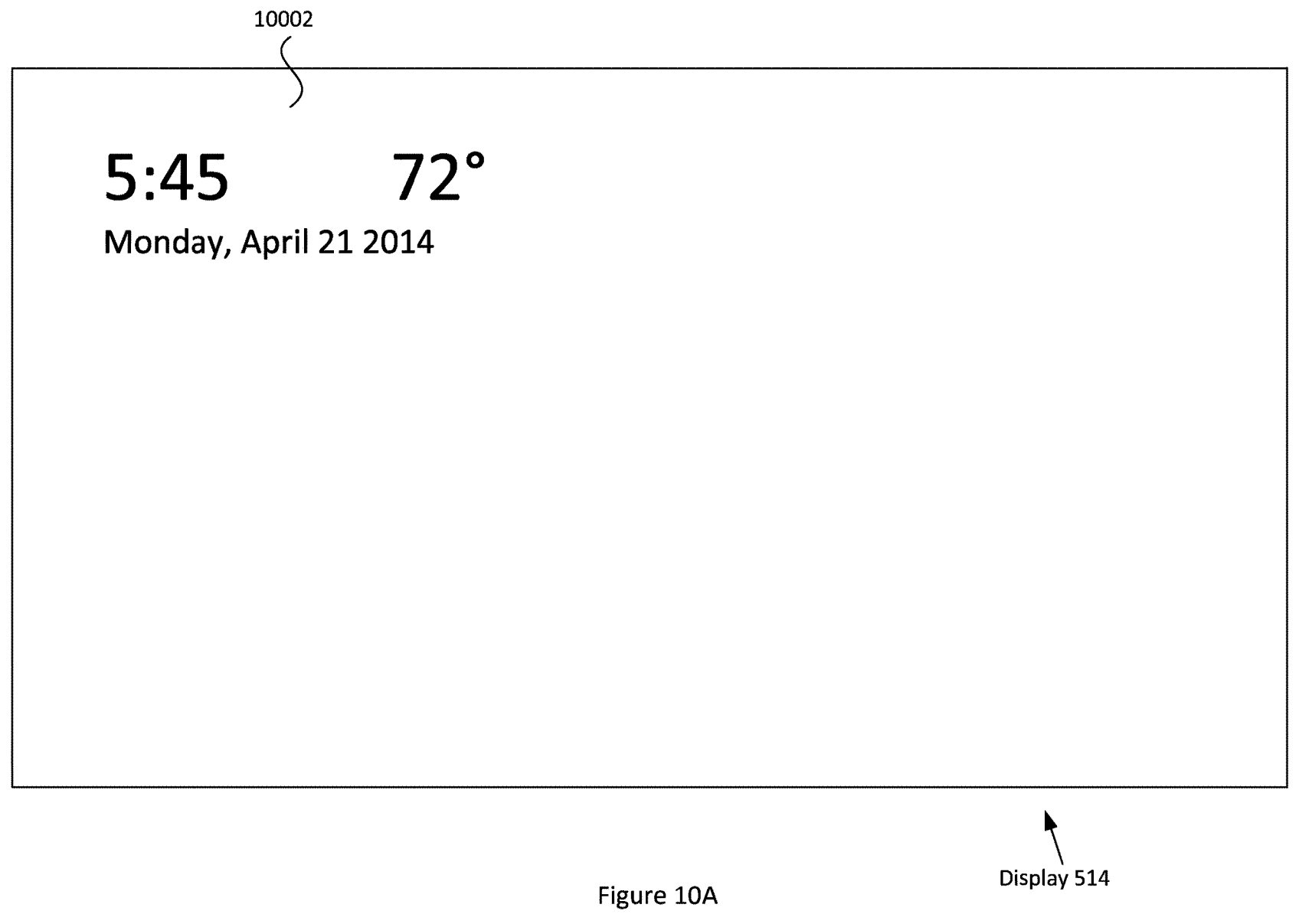

FIG. 10A illustrates display of passive content including time, date, and weather information 10002. Other passive content optionally includes a splash image, a screen saver, a background image, etc. In some embodiments, the column user interface is optionally gradually displayed over active content, such as video content.

Figure 10B:
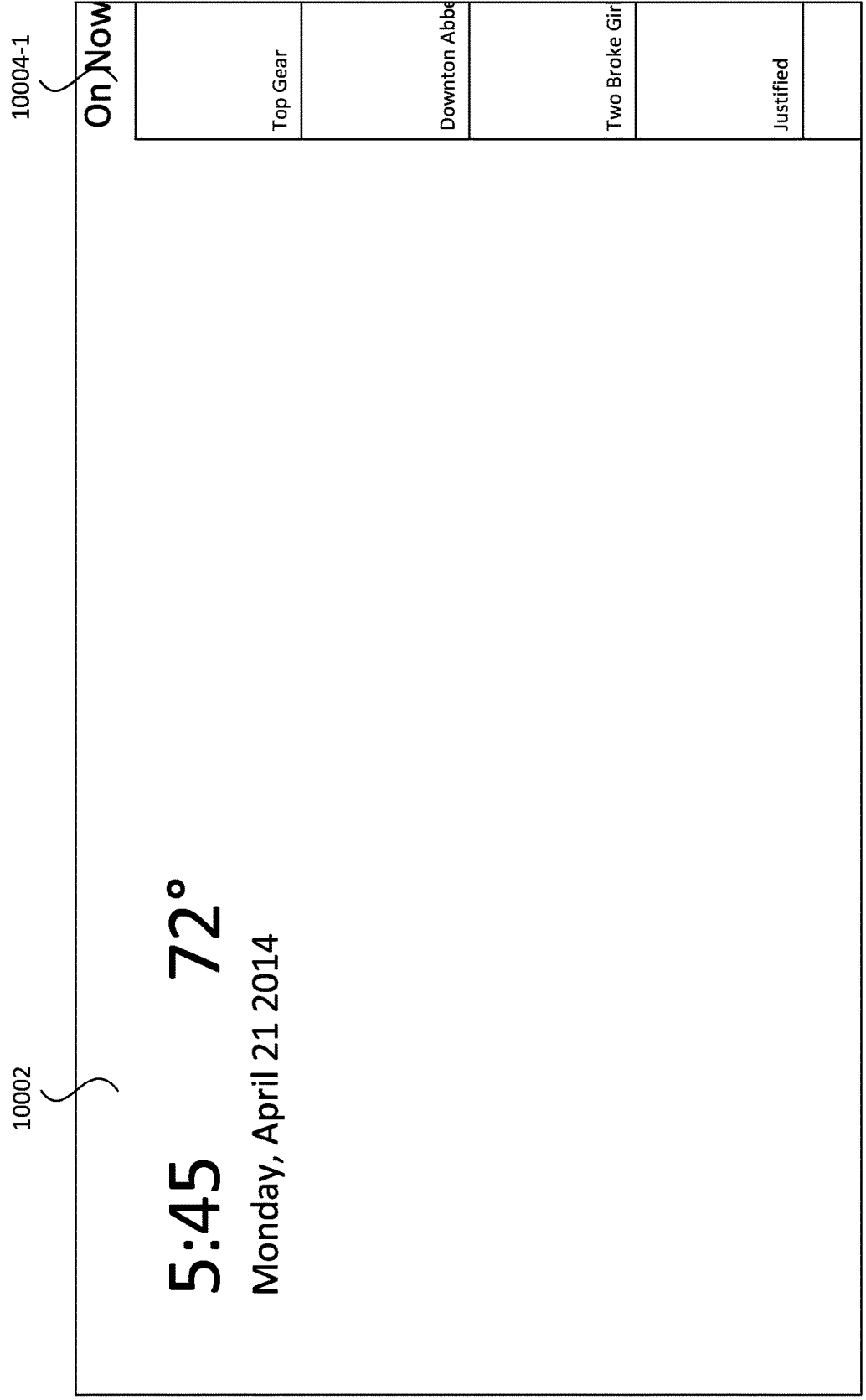
Figure 10D:
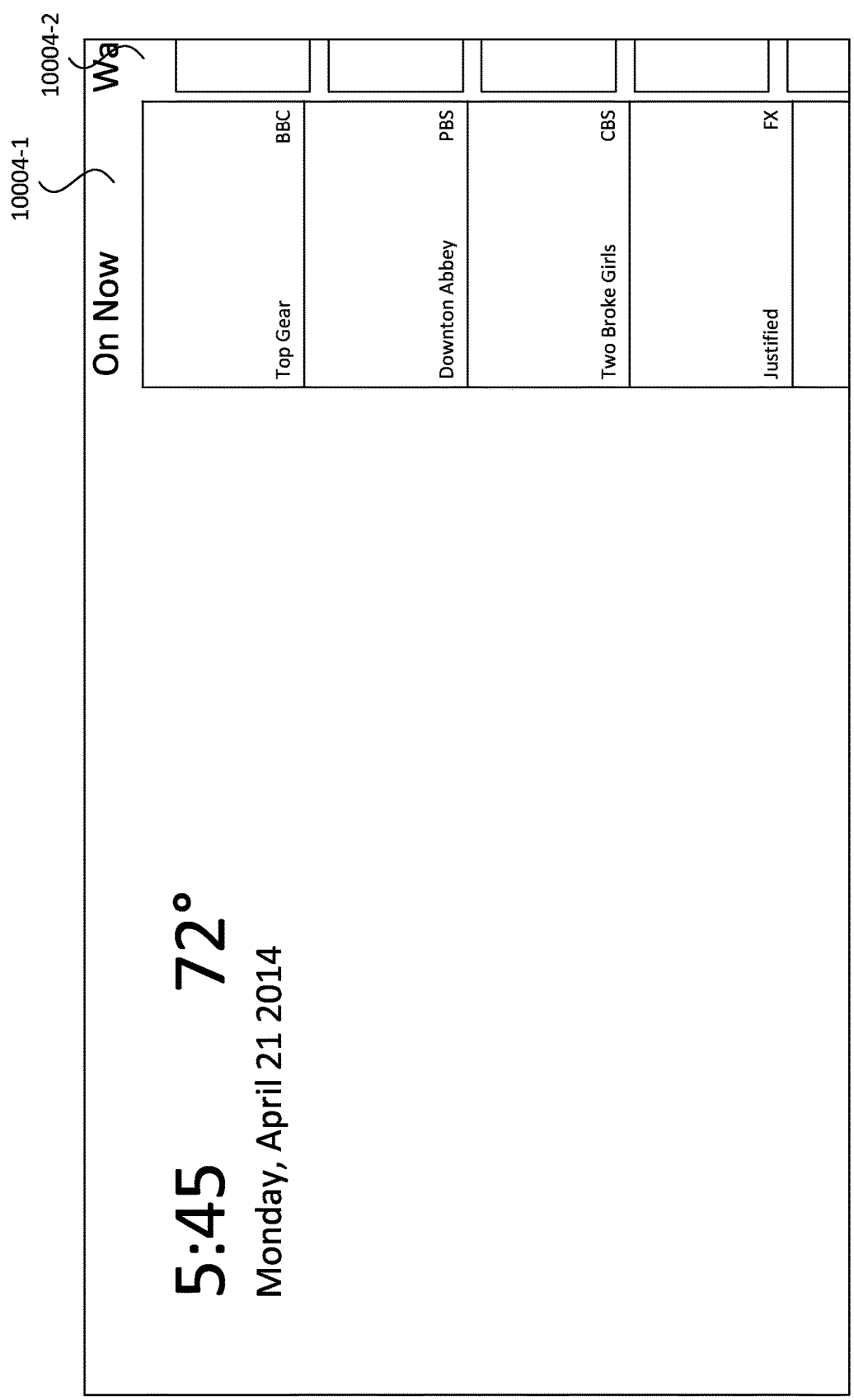

FIGS. 10B-10D illustrate an animation of a first column 10004-1 emerging from a right edge of display 514. In some embodiments, a first column 10004-1 optionally appears in response to a column display condition (e.g., detecting presence of a user, detecting motion proximate the electronic device, or detecting a face of a user using an optical sensor, among other possibilities). The first column 10004-1 optionally gradually emerges in an animation until it is fully onscreen, as illustrated in FIG. 10C. In some embodiments, the first column 10004-1 gradually emerges in an animation until it is fully onscreen and a portion of a second column 10004-2 is optionally also visible, as illustrated in FIG. 10D.

Figure 10F:
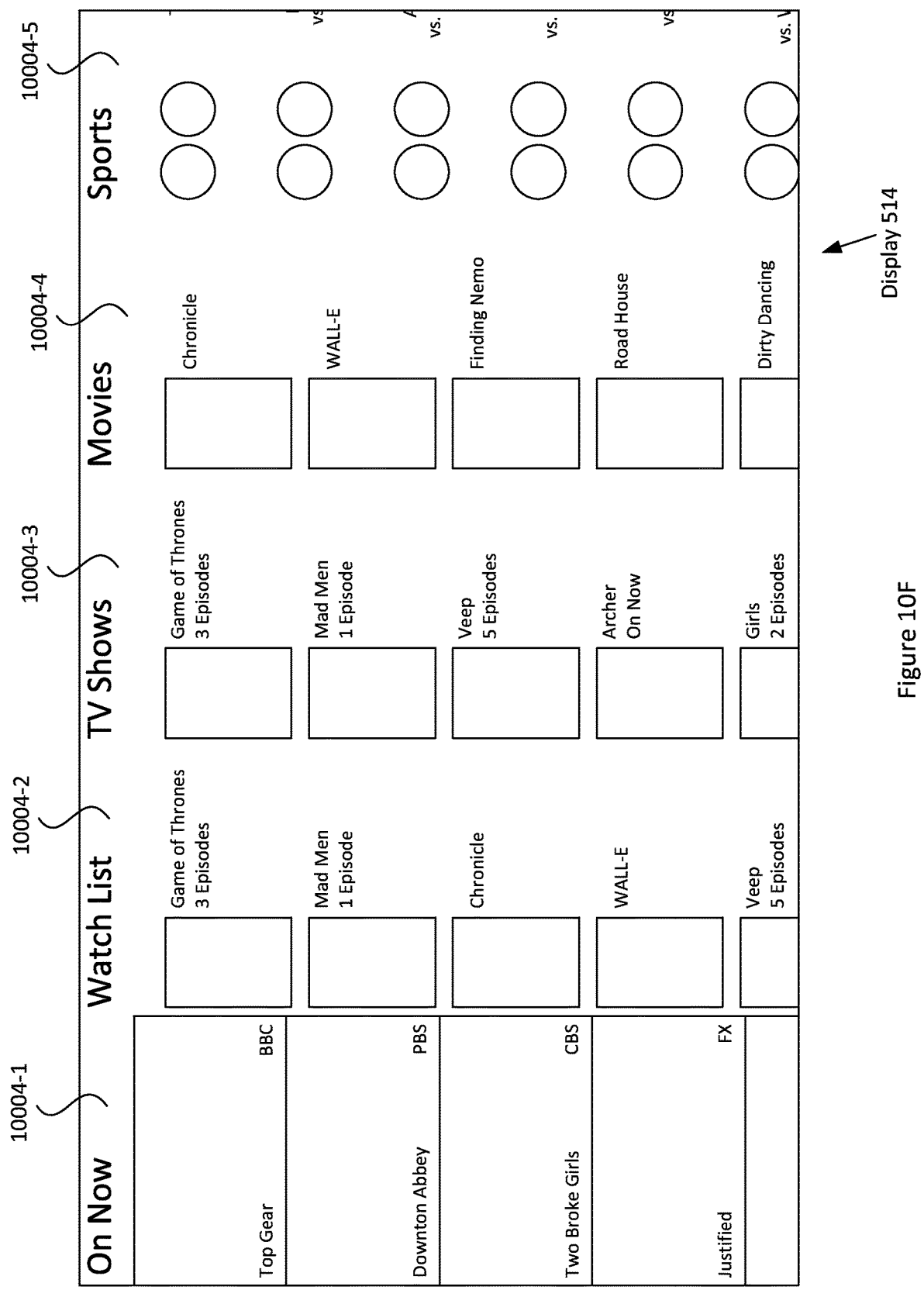

FIGS. 10D-10F illustrate an animation of a plurality of columns 10004-1, 10004-2, 10004-3, 10004-4, and 10004-5 gradually emerging until the plurality of columns are all visible on the display 514. In this example, the plurality of columns occupies a portion of the display from the left edge of the display to the right edge of the display. The animation is optionally displayed in response to receipt of input (e.g., a swipe, a tap, or other input to expose one or more additional columns, among other possibilities).

Figure 11A:
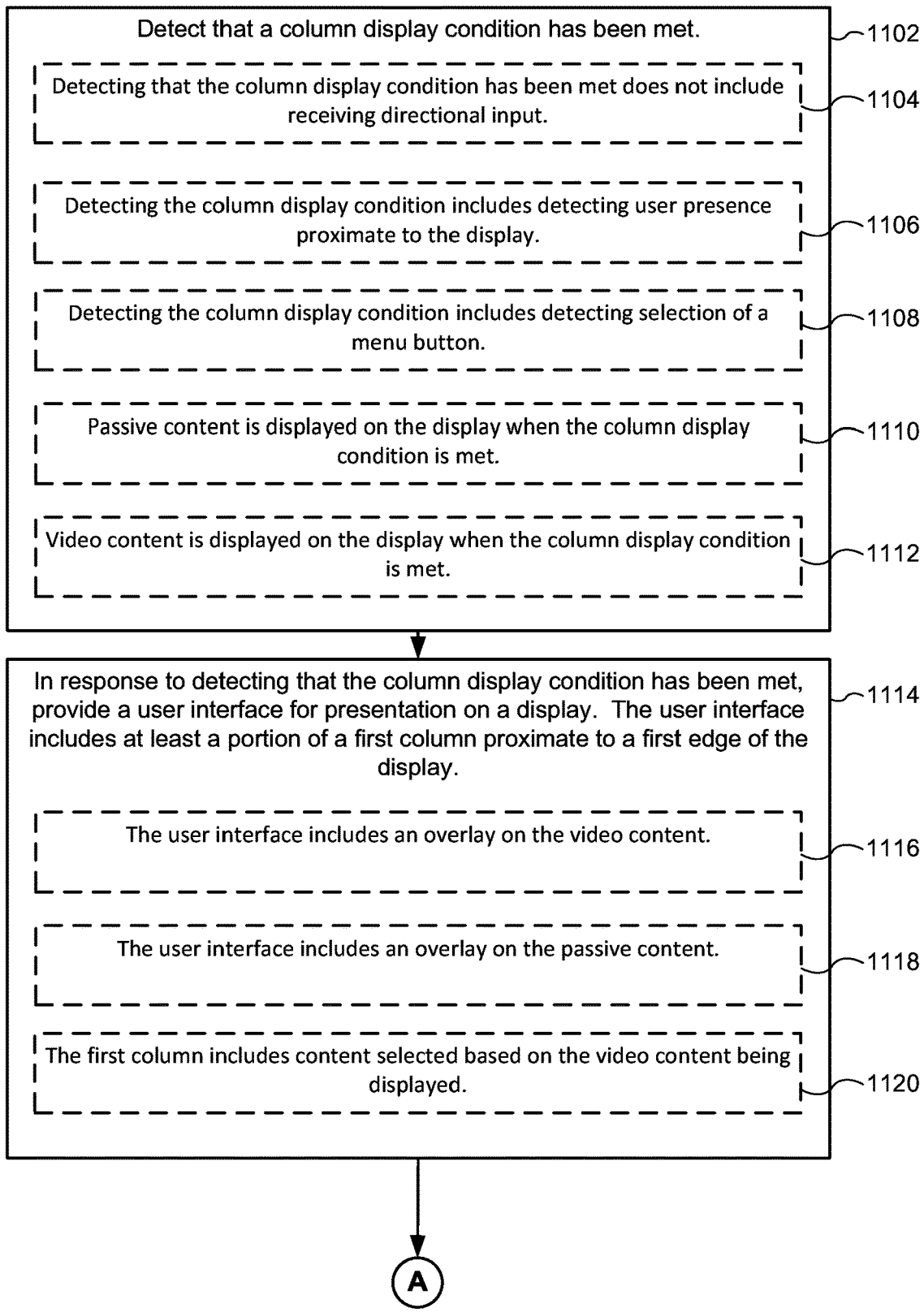
FIGS. 11A-11B are flow diagrams illustrating a method of providing a user interface that gradually appears over visual content in accordance with some embodiments.
Figure 11B:
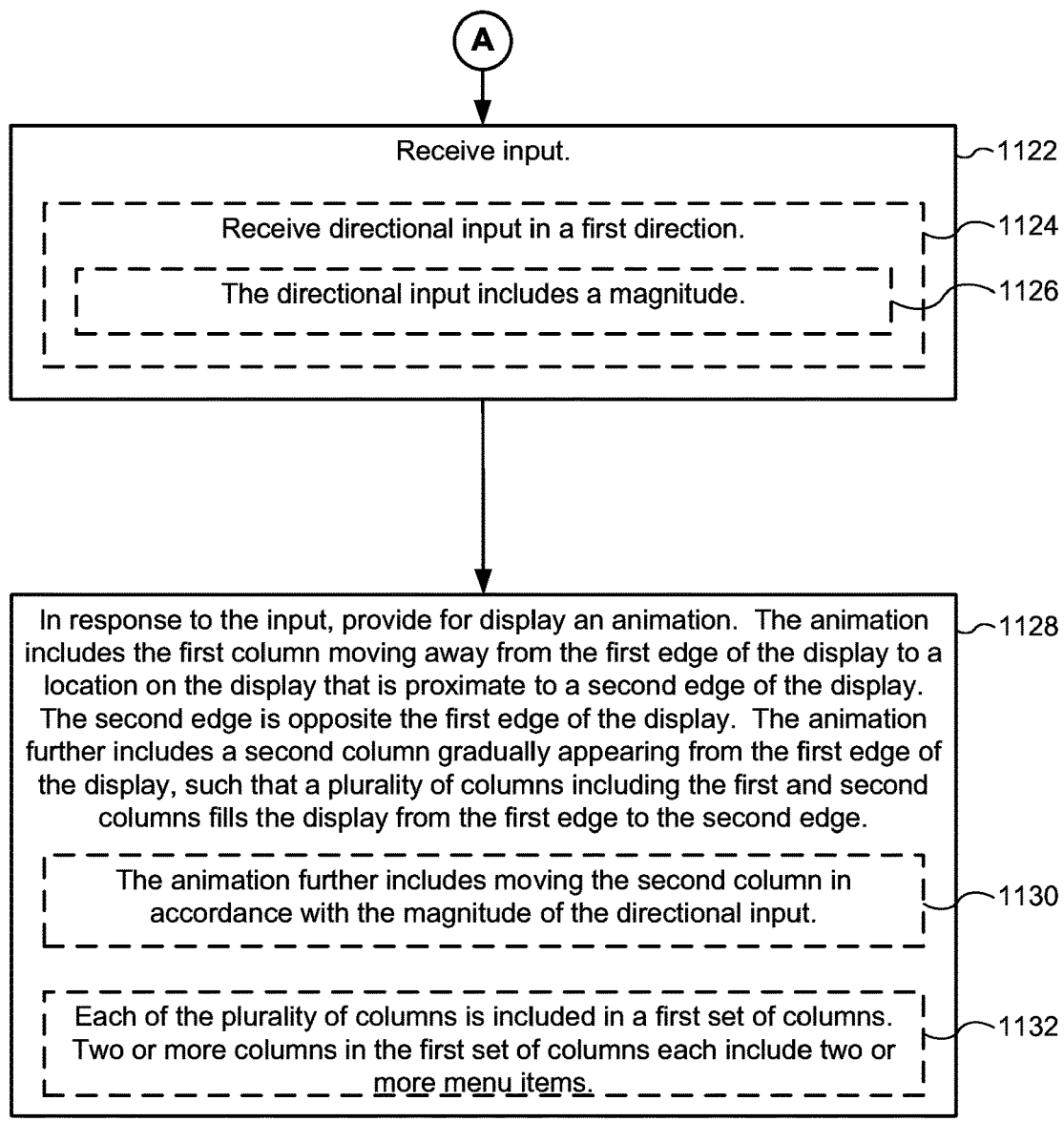

FIGS. 11A-11B are flow diagrams illustrating a method of providing a user interface that gradually appears over visual content in accordance with some embodiments. The method is optionally performed at an electronic device as described above with reference to FIGS. 1A-B and 2-5 (e.g., electronic device 100, 300, or 500, etc.). Some operations in method 1100 are, optionally, combined and/or the order of some operations is, optionally, changed.

As described below, the method 1100 provides ways in which a device can display a user interface gradually over visual content. The method reduces the cognitive burden on a user when interacting with a user interface on the device by providing a smooth and intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device (e.g., a set top box or other user interface generating device that is in communication with a display device) with one or more processors and memory detects (1102) that a column display condition (e.g., detecting presence of a user, detecting motion proximate the electronic device, or detecting a face of a user using an optical sensor, among other possibilities) has been met.

In some embodiments, in response to detecting that the column display condition has been met, the electronic device provides (1114) a user interface for presentation on a display (e.g., a separate display device or an integrated display that is part of the electronic device). The user interface optionally includes at least a portion of a first column proximate to (e.g., at or near) a first edge (e.g., the rightmost edge) of the display. For example, FIG. 10B illustrates a portion of column 10004-1 overlaying the visual content 10002.

In some embodiments, input is optionally received (1122) (e.g., a swipe, a tap, or other input to expose one or more additional columns, among other possibilities). In some embodiments, in response to the input, the electronic device provides (1128) for display an animation including the first column moving away from the first edge of the display to a location on the display that is proximate to (e.g., at or near) a second edge (e.g., the leftmost edge) of the display, the second edge being opposite the first edge. The animation further includes a second column gradually appearing from the first edge of the display, such that a plurality of columns including the first and second columns fills the display from the first edge to the second edge (e.g., the plurality of columns fills the user interface from the rightmost edge of the display to the leftmost edge of the display, although portions of the user interface above and/or below the plurality of columns may not be filled by the columns and, in some circumstances, there are margins between one or more of the columns and the edge of the display). In some embodiments, the plurality of columns is optionally included (1132) in a first set of columns, two or more columns in the first set of columns each including two or more menu items (e.g., text, images, and/or video content, some or all of which may optionally include links to content, applications, and/or other user interfaces).

For example, FIGS. 10C-10F illustrate an animation including the first column 10004-1 moving away from the right edge of the display 514 to a location that is proximate to the left edge of the display, and a second column 10004-2 gradually appearing from the right edge of the display, such that a plurality of columns fills the display from the right edge to the left edge.

In some embodiments, detecting that the column display condition has been met optionally does not include (1104) receiving directional input, and receiving the input optionally includes (1124) receiving directional input in a first direction (e.g., a swipe, a tap, or other input in a direction such as left, right, up, or down). In some embodiments, the directional input optionally includes (1126) a magnitude (e.g., an amount of movement of a contact or a velocity of movement of a contact). The animation optionally further includes (1130) moving the second column in accordance with the magnitude of the directional input (e.g., direct manipulation of the second column, such as a swipe left corresponding to movement of a contact causes the second column to move to the left by an amount that corresponds to a distance moved by the contact during the swipe left gesture or a velocity of the contact during the swipe left gesture, etc.).

In some embodiments, video content is optionally displayed (1112) on the display when the column display condition is met, the user interface optionally includes (1116) an overlay on the video content, and the first column optionally includes (1120) content (e.g., menu items of the first column) selected based on the video content being displayed (e.g., if the video content is a particular movie, the selected content included in the first column may be information related to the particular movie; if the video content is a particular television show, the selected content included in the first column may be additional episodes of the particular television show; etc.).

In some embodiments, video content is optionally displayed (1112) on the display when the column display condition is met, the user interface optionally includes (1120) an overlay on the video content, and detecting the column display condition optionally includes (1108) detecting selection of a menu button (e.g., on a touch sensitive device, on a remote control, and/or on a mobile device).

In some embodiments, passive content (e.g., splash image, screen saver, background image, etc.) is optionally displayed (1110) on the display when the column display condition is met, the user interface optionally includes (1118) an overlay on the passive content, and detecting the column display condition optionally includes (1106) detecting user presence proximate to the display (e.g., detecting motion proximate the electronic device, detecting a face of a user using an optical sensor, or detecting presence of a mobile device). For example, FIGS. 10A-10F illustrate displaying passive content 10002 when the column display condition is met, and the first column 10004-1 is subsequently displayed.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 11A-11B are, optionally, implemented by components depicted in FIGS. 1A-1B. For example, detecting operation 1102, providing operation 1114, receiving operation 1122, and providing operation 1128 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 11A-11B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIGS. 11A-11B. For example, the user interfaces, columns, menu items, content items, and display devices described above with reference to method 1100 optionally have one or more of the characteristics of the user interfaces, columns menu items, content items, and display devices described herein with reference to other methods described herein (e.g., methods 700, 900, 1300 and 1500). For brevity, these details are not repeated here.

Smart Episode User Interface

Many electronic devices have graphical user interfaces that provide access to episodes of various content series. It can be difficult for a user to keep track of which episodes have already been watched. Further, for an unwatched content series, it can be more intuitive to present either the first episode of the series or the most recent episode of the series, depending on the release status of the content series. The embodiments described below provide a more intuitive user interface by intelligently presenting contextual information for a content series based on the release status of the content series.

FIGS. 12A-12E illustrate exemplary user interfaces including intelligent presentation of contextual information for a content series in accordance with some embodiments. The user interfaces in these figures are used to illustrate the processes described below, including the processes described below with reference to FIGS. 13A-13C.

FIG. 12A illustrates an example content series user interface. The content series user interface is displayed on display 514 of a device (e.g., device 500) and is responsive to user input, such as on touch-sensitive surface 451 and/or remote 510. The content series user interface includes an affordance 12002 with information regarding the most recently released episode of the content series, selectable to view the most recently released episode of the content series. In some embodiments, the information regarding the most recently released episode of the content series is optionally displayed based on a determination that the content series is currently releasing and the most recently released episode is not marked as watched.

FIG. 12B illustrates an example content series user interface displaying information 12004 regarding a future release date and/or time of a next releasing episode. In some embodiments, information 12004 is optionally selectable to add the next releasing episode to a watch list. In some embodiments, the information 12004 regarding a future release date and/or time of a next releasing episode is optionally displayed based on a determination that the content series is currently releasing and the most recently released episode is marked as watched.

FIG. 12C illustrates an example content series user interface including an affordance 12006 with information regarding a first episode of the content series, selectable to view the first episode of the content series. In some embodiments, the information regarding the first episode of the content series is optionally displayed based on a determination that the content series is cancelled.

FIG. 12D illustrates an example content series user interface including an affordance 12008 with information regarding an earliest unwatched episode, selectable to view the earliest unwatched episode of the content series. In some embodiments, the information regarding the earliest unwatched episode is optionally displayed based on a determination that one or more other episodes of the content series are marked as watched.

FIG. 12E illustrates an example content series user interface including an affordance 12010 with information regarding an episode currently airing live on a channel, selectable to change to the channel on which the episode is currently airing live. In some embodiments, the information regarding the episode currently airing live on a channel is optionally displayed based on a determination that the content series is currently releasing and an episode of the content series is currently airing live on the channel.

Figure 13A:
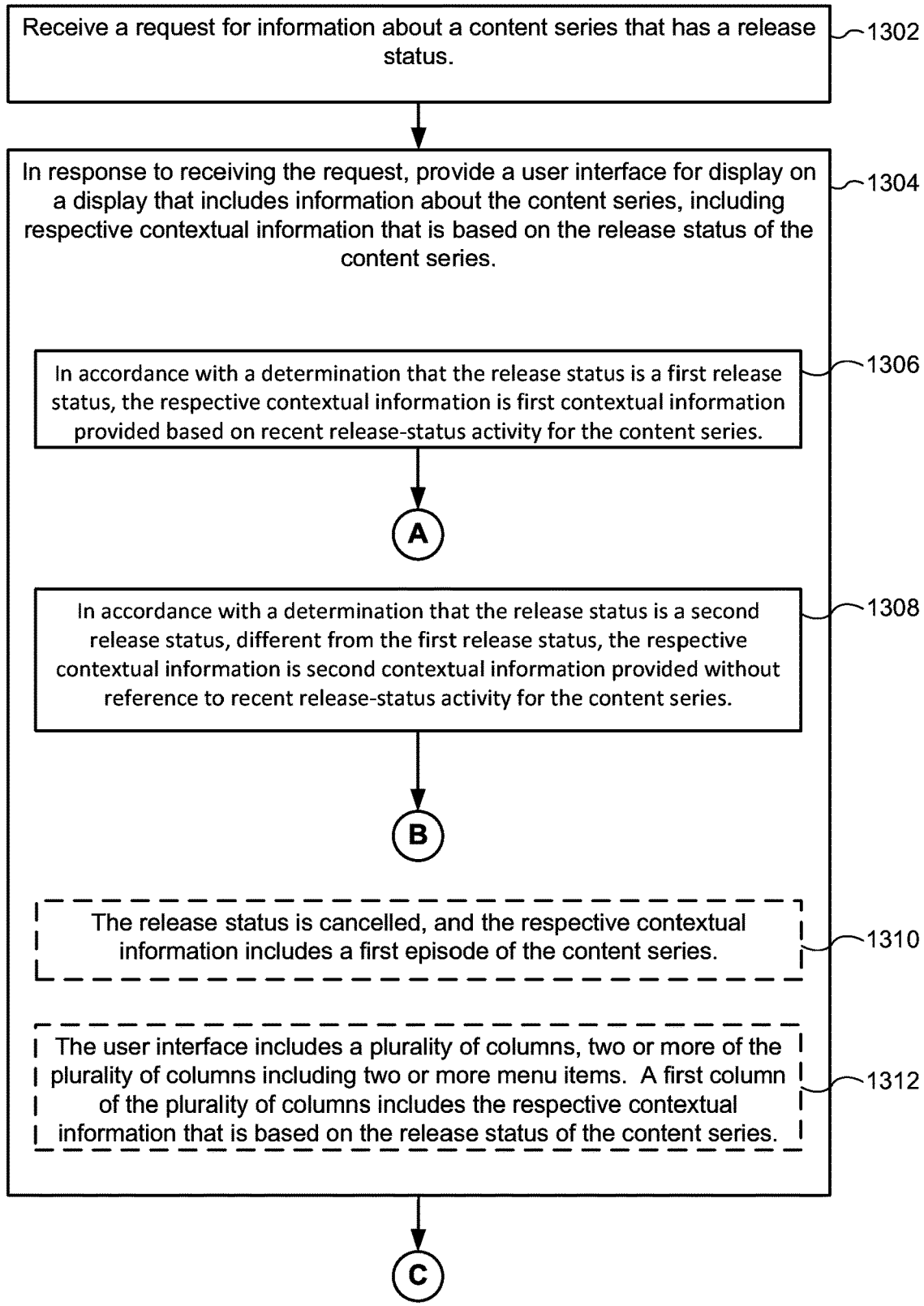
Figure 13C:
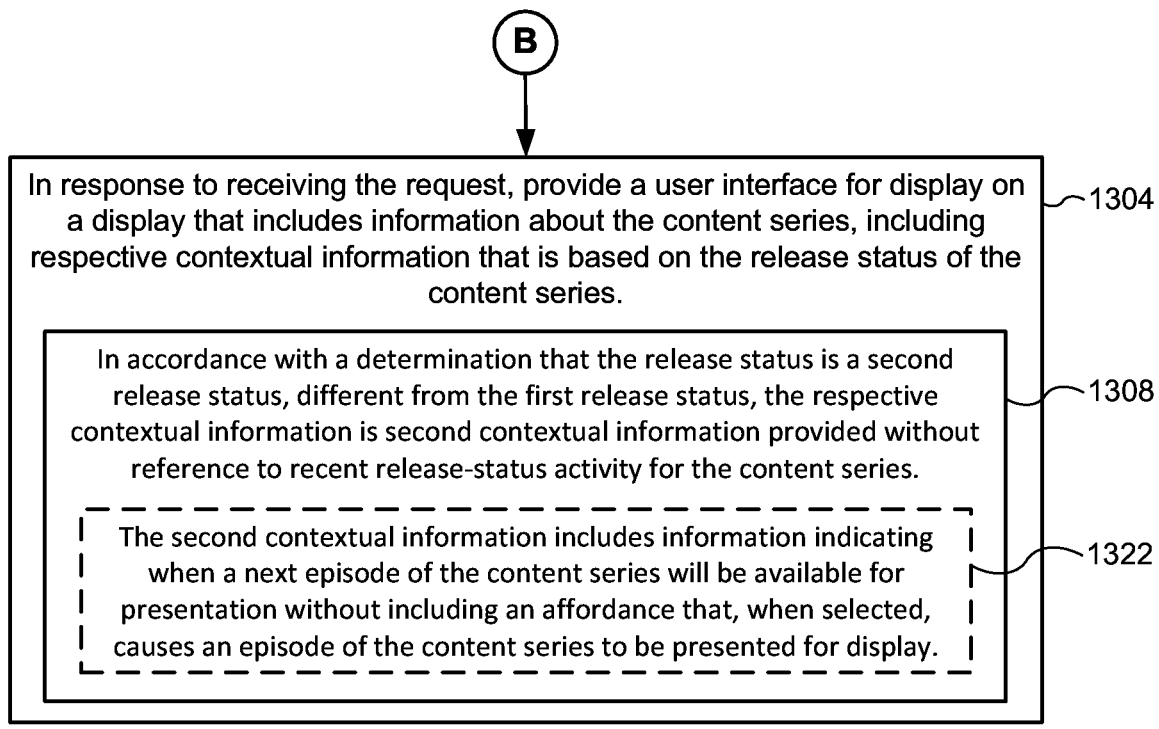
Figure 13C:
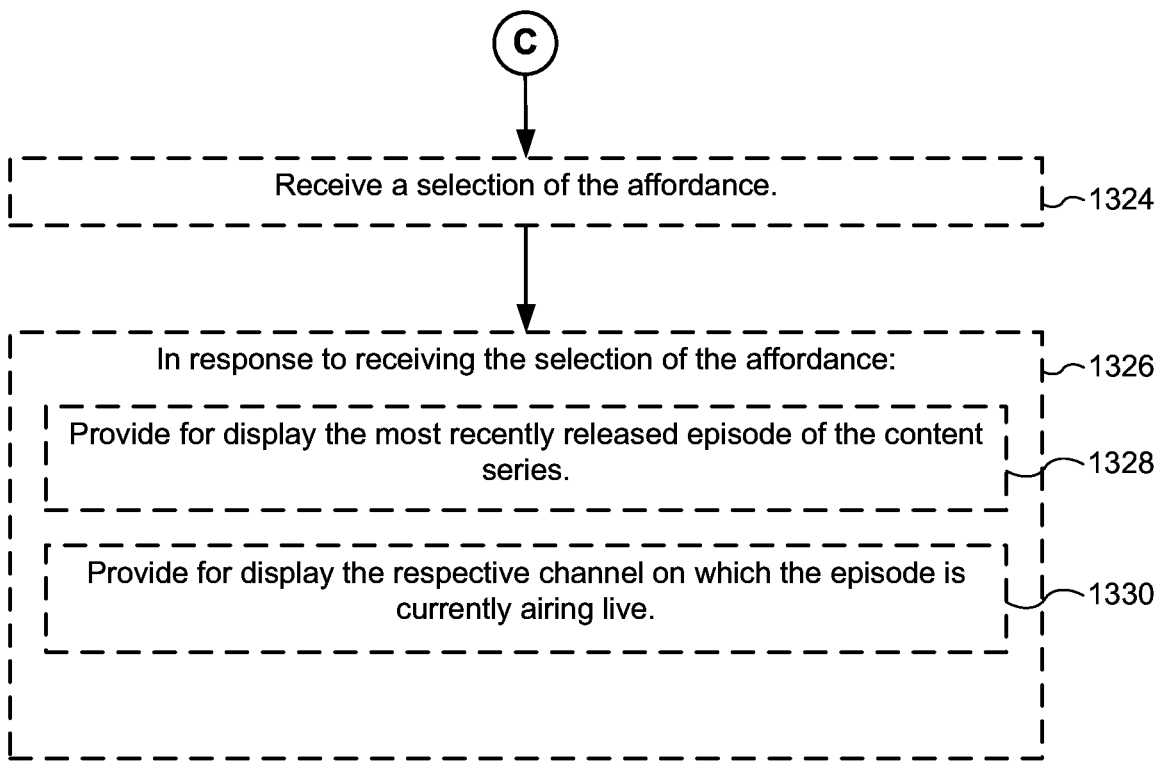

FIGS. 13A-13C are flow diagrams illustrating a method of intelligent presentation of contextual information for a content series in accordance with some embodiments. The method is optionally performed at an electronic device as described above with reference to FIGS. 1A-B and 2-5 (e.g., electronic device 100, 300, or 500, etc.). Some operations in method 1300 are, optionally, combined and/or the order of some operations is, optionally, changed.

As described below, the method 1300 provides ways in which a device can display a user interface including intelligent presentation of contextual information for a content series. The method reduces the cognitive burden on a user when interacting with a user interface on the device by providing intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device (e.g., a set top box or other user interface generating device that is in communication with a display device) with one or more processors and memory receives (1302) a request for information about a content series (e.g., a television series, a miniseries, a set of webisodes, among other possibilities) that has a release status (e.g., whether the series is still in production, whether the series has been canceled, whether there are remaining episodes that have yet to be released, among other possibilities).

In some embodiments, in response to receiving the request, the electronic device provides (1304) a user interface for display on a display (e.g., a television or other display device) that includes information about the content series, including respective contextual information that is based on the release status of the content series. In some embodiments, the user interface optionally includes (1312) a plurality of columns, two or more of the plurality of columns including two or more menu items (e.g., text, images, and/or video content, some or all of which may optionally include links to content, applications, and/or other user interfaces). A first column of the plurality of columns optionally includes the respective contextual information that is based on the release status of the content series (e.g., the column is a column dedicated to the content series, such as a "Game of Thrones" column; and/or the column is a column dedicated to a content provider of the content series, such as an HBO column with a menu item for "Game of Thrones", etc.). For example, FIGS. 12A-12E illustrate a plurality of columns regarding the content series "Mad Men", and each figure illustrates different possible contextual information 12002-12010.

In some embodiments, in accordance with a determination that the release status is a first release status (1306), the respective contextual information is first contextual information provided based on recent release-status activity (e.g., current or upcoming episodes) for the content series.

In some embodiments, in accordance with a determination that the release status is a second release status (1308), different from the first release status, the respective contextual information is second contextual information (different from the first contextual information) provided without reference to recent release-status activity (e.g., current or upcoming episodes) for the content series.

In some embodiments, the first contextual information optionally includes (1314) an affordance that, when selected, causes an episode of the content series to be provided for display on the display (in some embodiments, the device receives a selection of the affordance; and in response to receiving the selection of the affordance, presenting for display an episode of the content series). In some embodiments, the second contextual information optionally includes (1322) information indicating when a next episode of the content series will be available for presentation without including an affordance that, when selected, causes an episode of the content series to be presented for display. For example, FIG. 12B illustrates information 12004 indicating when a next episode of "Mad Men" will be available for presentation, without including an affordance that, when selected, causes an episode of "Mad Men" to be presented for display.

In some embodiments, the release status is optionally cancelled (1310) and the respective contextual information optionally includes a first episode of the content series (or a last unwatched episode of the content series). For example, FIG. 12C illustrates information 12006 including a first episode of "Mad Men".

In some embodiments, the first release status is optionally currently releasing (1316) (e.g., the content series is currently on the air and/or new episodes are being released) and a most recently released episode is marked as watched. Providing the first contextual information based on recent release-status activity optionally includes providing, for display, a date of a next releasing episode (e.g., the air date of an upcoming episode in the content series). For example, FIG. 12B illustrates information 12004 including a date of a next releasing episode of "Mad Men".

In some embodiments, the first release status is optionally currently releasing (1318) (e.g., the content series is currently on the air and/or new episodes are being released) and a most recently released episode is not marked as watched. Providing the first contextual information based on recent release-status activity optionally includes providing an affordance for presenting a most recently released episode of the content series. In some embodiments, a selection of the affordance is optionally received (1324), and in response (1326) to receiving the selection of the affordance, the most recently released episode of the content series is optionally provided for display (1328). For example, FIG. 12A illustrates an affordance 12002 for presenting a most recently released episode of "Mad Men".

In some embodiments, the first release status is optionally currently releasing (1320) (e.g., the content series is currently on the air and/or new episodes are being released) and an episode of the content series is currently airing live on a respective channel. Providing the first contextual information based on recent release-status activity optionally includes providing an affordance for providing for display the respective channel on which the episode is currently airing live. In some embodiments, a selection of the affordance is optionally received (1324), and in response (1326) to receiving the selection of the affordance, the respective channel on which the episode is currently airing live is optionally provided for display (1330). For example, FIG. 12E illustrates an affordance 12010 for providing for display a respective channel on which an episode of "Mad Men" is currently airing live.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 13A-13C are, optionally, implemented by components depicted in FIGS. 1A-1B. For example, receiving operation 1302, providing operation 1304, and receiving operation 1324 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIGS. 13A-13C. For example, the user interfaces, columns, menu items, content items, and display devices described above with reference to method 1300 optionally have one or more of the characteristics of the user interfaces, columns menu items, content items, and display devices described herein with reference to other methods described herein (e.g., methods 700, 900, 1100 and 1500). For brevity, these details are not repeated here.

Watch List with Content and Non-Content Items

Many electronic devices have graphical user interfaces that allow a user to directly add content items to a watch list for later viewing. It can be difficult for a user to keep track of potentially interesting content items as they are released. The embodiments described below provide a user interface for quickly adding both content and non-content items (e.g., actors, search terms, genres, sports leagues/players, etc.) to a watch list, so that content items related to the non-content items can be automatically populated to the watch list.

FIGS. 14A-14H illustrate exemplary user interfaces for adding both content and non-content items to a watch list in accordance with some embodiments. The user interfaces in these figures are used to illustrate the processes described below, including the processes described below with reference to FIGS. 15A-15B.

FIG. 14A illustrates an exemplary content series user interface. The content series user interface is displayed on a display 514 of a device (e.g., device 500) and is responsive to user input, such as on touch-sensitive surface 451 and/or remote 510. The content series user interface includes affordances 14002 and 14004, each selectable for adding the content series to a watch list and an individual episode of the content series to the watch list, respectively. Further, in FIG. 14A each affordance is displayed proximate to information regarding the item to be added to the watch list: affordance 14002 is proximate to general information about the content series, and affordance 14004 is in a column regarding the individual episode of the content series. Adding the individual episode to the watch list causes a menu item and/or column corresponding to the individual episode to be displayed in the watch list user interface (e.g., as illustrated in FIG. 14H). Adding the content series to the watch list causes a menu item and/or column corresponding to the content series and/or some/all of the individual episodes of the content series to be displayed in the watch list user interface. In some embodiments, episodes of the content series released after the content series is added to the watch list will optionally be automatically added to the watch list as they are released.

Figure 14B:
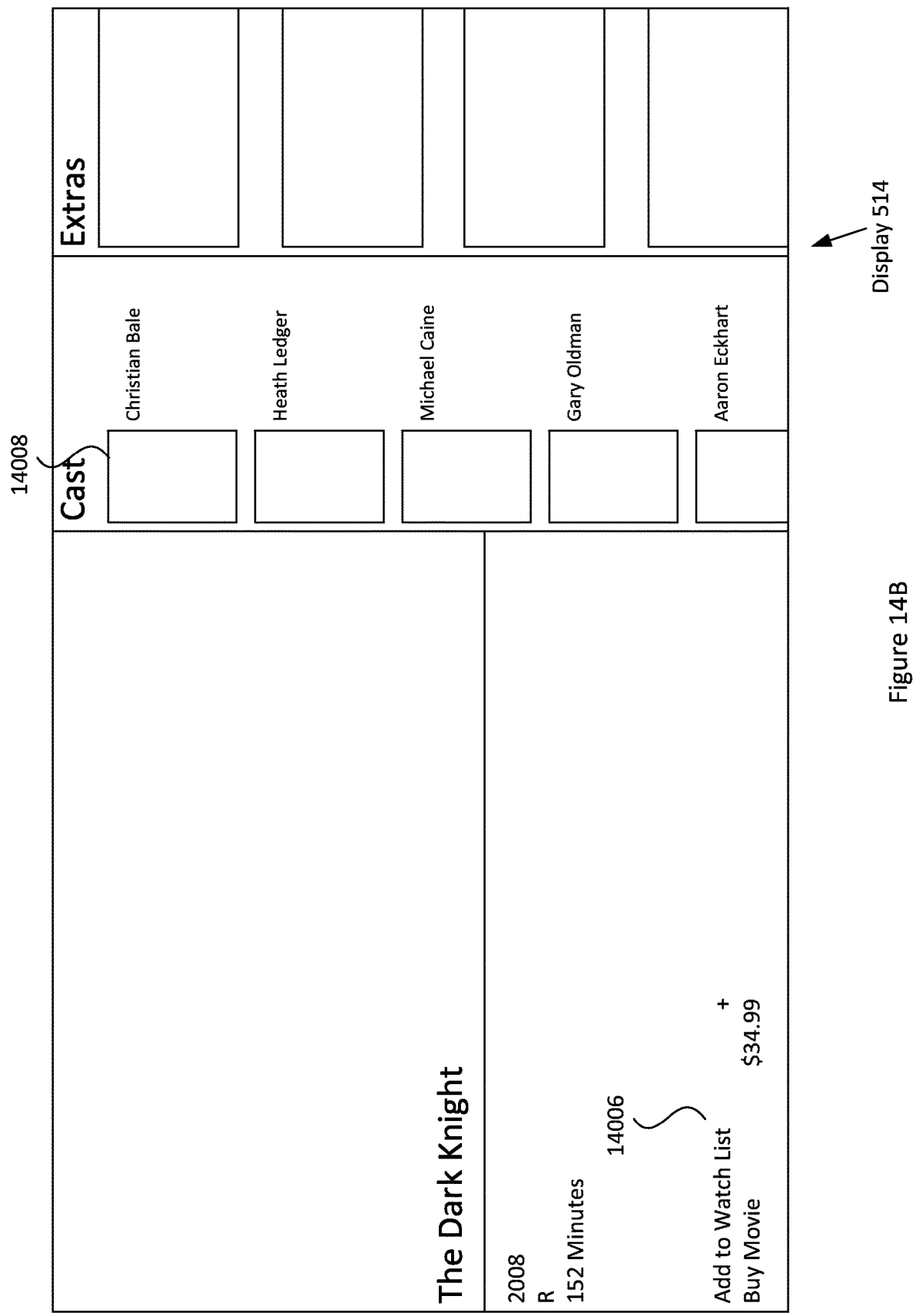
Figure 14C:
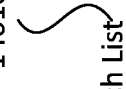

FIGS. 14B-C illustrate an exemplary movie user interface and an exemplary actor user interface. The movie user interface includes affordance 14006 selectable for adding the movie to the watch list. Affordance 14006 is displayed proximate to information regarding the movie to be added to the watch list. Adding the movie to the watch list causes a menu item and/or column corresponding to the movie to be displayed in the watch list user interface. The movie user interface further includes menu item 14008 corresponding to an actor in the cast of the movie, selectable to cause an actor user interface to be displayed, as illustrated in FIG. 14C. The actor user interface includes affordance 14010 selectable for adding the actor to the watch list. In some embodiments, affordances 14006 and 14010 optionally are substantially identical, with some variations in font size, spacing, placement, etc., but each includes the words "Add to Watch List." Affordance 14010 is displayed proximate to information regarding the actor to be added to the watch list. Adding the actor to the watch list causes menu items and/or columns each corresponding to one or more content items in which the actor appears to be displayed in the watch list user interface. In some embodiments, content items including the actor that are released after the actor is added to the watch list will optionally be automatically added to the watch list as they are released.

Figure 14D:
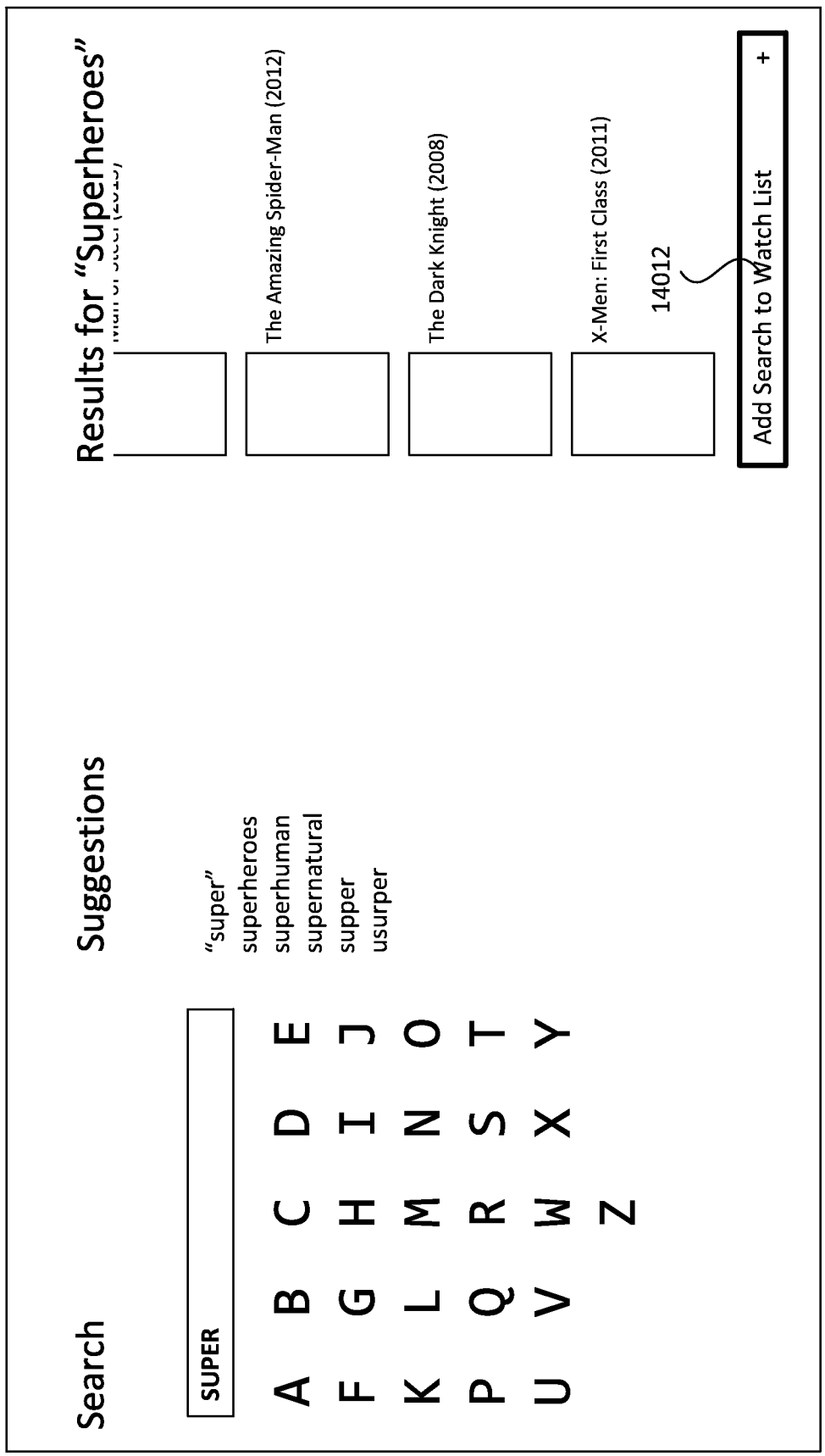

FIG. 14D illustrates an exemplary search user interface. The search user interface includes affordance 14012 selectable for adding a search term to the watch list. Affordance 14012 is displayed proximate to search results for the search term "superheroes" to be added to the watch list. Adding the search term to the watch list causes menu items and/or columns each corresponding to one or more search results of the search term to be displayed in the watch list user interface. In some embodiments, search results that are released after the search term is added to the watch list will optionally be automatically added to the watch list as they are released.

Figure 14E:
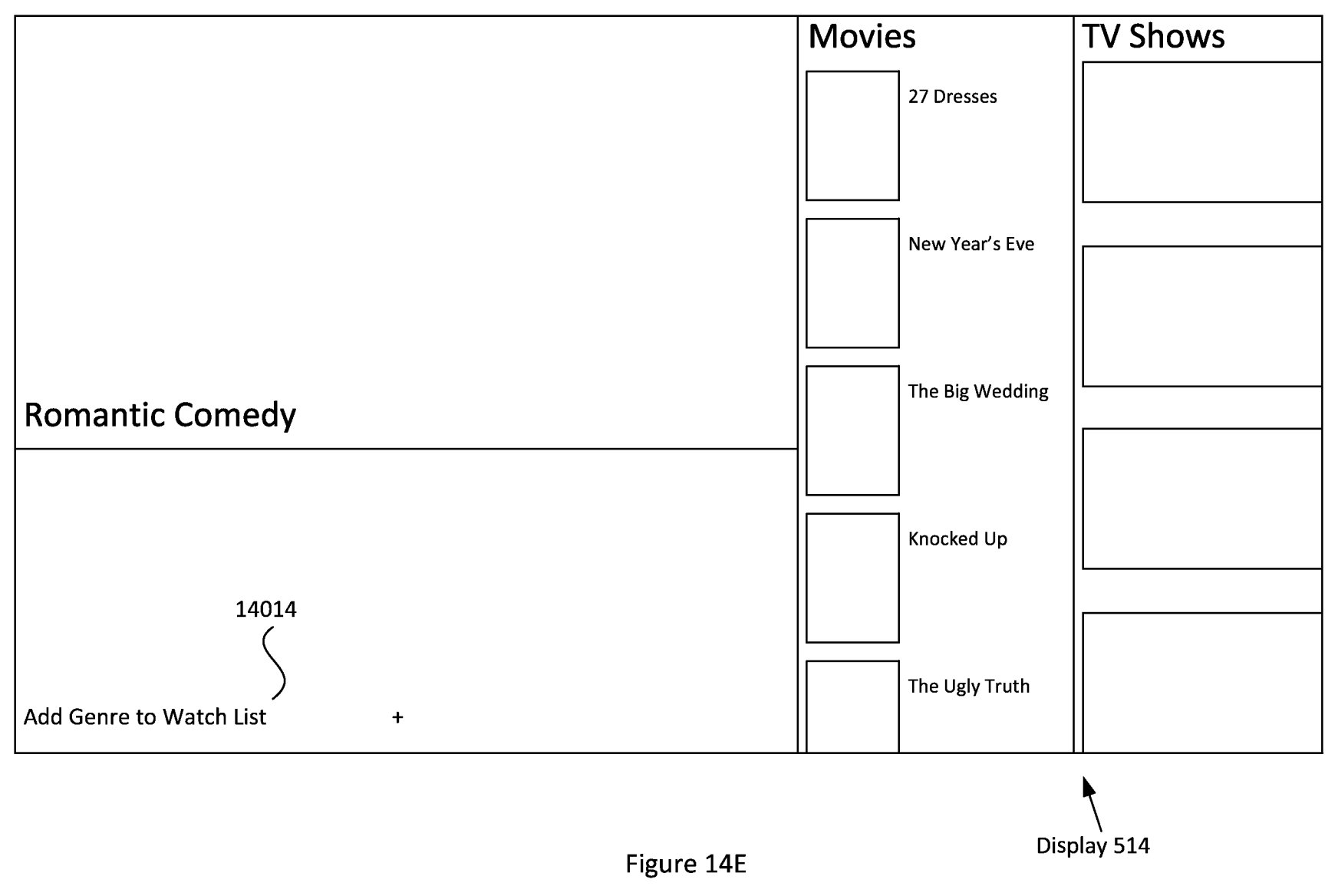

FIG. 14E illustrates an exemplary genre user interface. The genre user interface includes an affordance 14014 selectable for adding the genre to the watch list. Affordance 14014 is displayed proximate to the name of the genre "Romantic Comedy" to be added to the watch list. Adding the genre to the watch list causes menu items and/or columns each corresponding to one or more content items in the genre to be displayed in the watch list user interface. In some embodiments, content items in the genre that are released after the genre is added to the watch list will optionally be automatically added to the watch list as they are released.

Figure 14F:
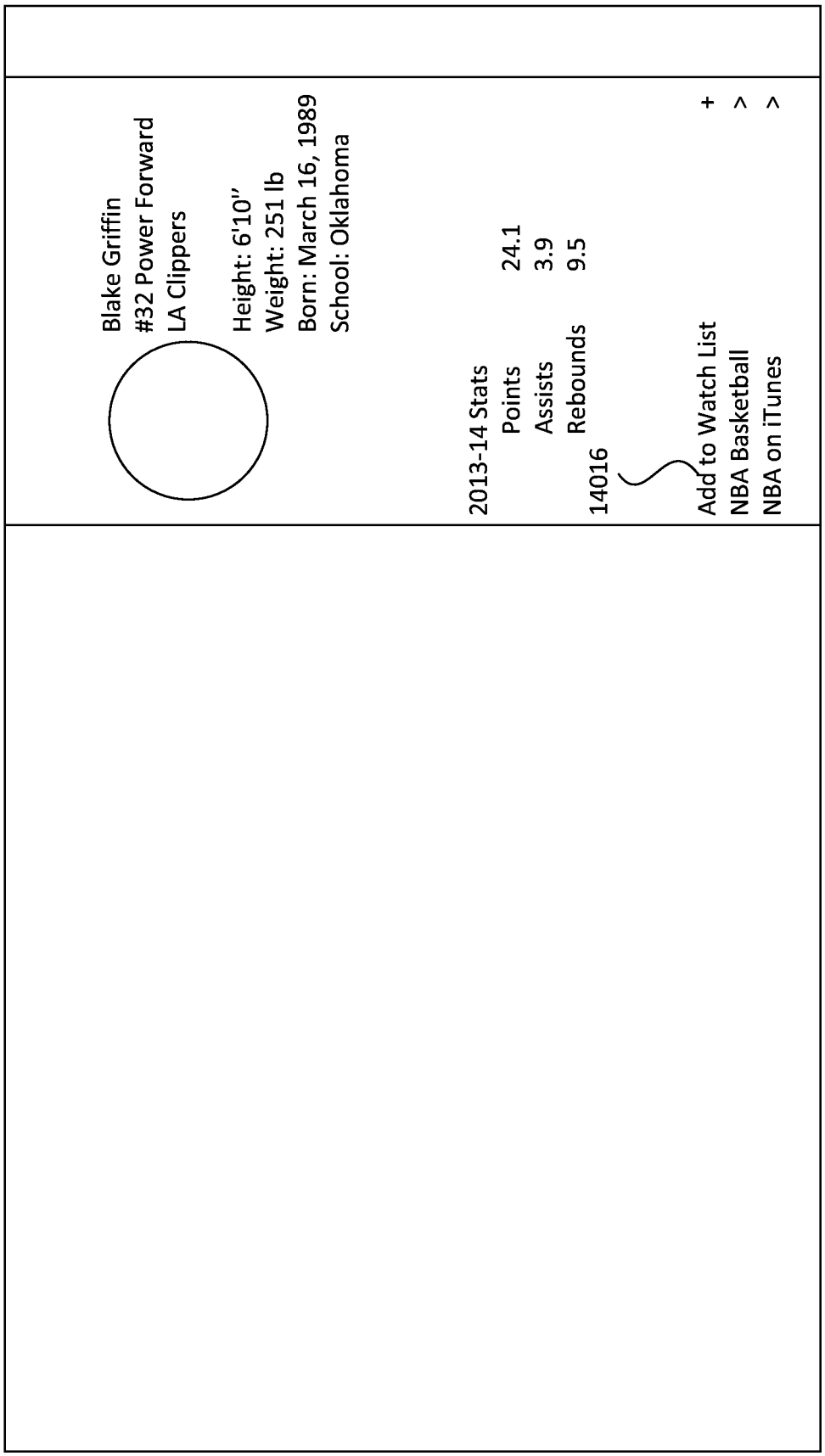

FIG. 14F illustrates an exemplary sports player user interface. The sports player user interface includes an affordance 14016 selectable for adding the sports player to the watch list. Affordance 14016 is displayed proximate to information regarding the sports player to be added to the watch list. Adding the sports player to the watch list causes menu items and/or columns each corresponding to one or more games and other content items involving the sports player to be displayed in the watch list user interface. In some embodiments, content items involving the sports player that are released after the sports player is added to the watch list will optionally be automatically added to the watch list as they are released.

Figure 14G:
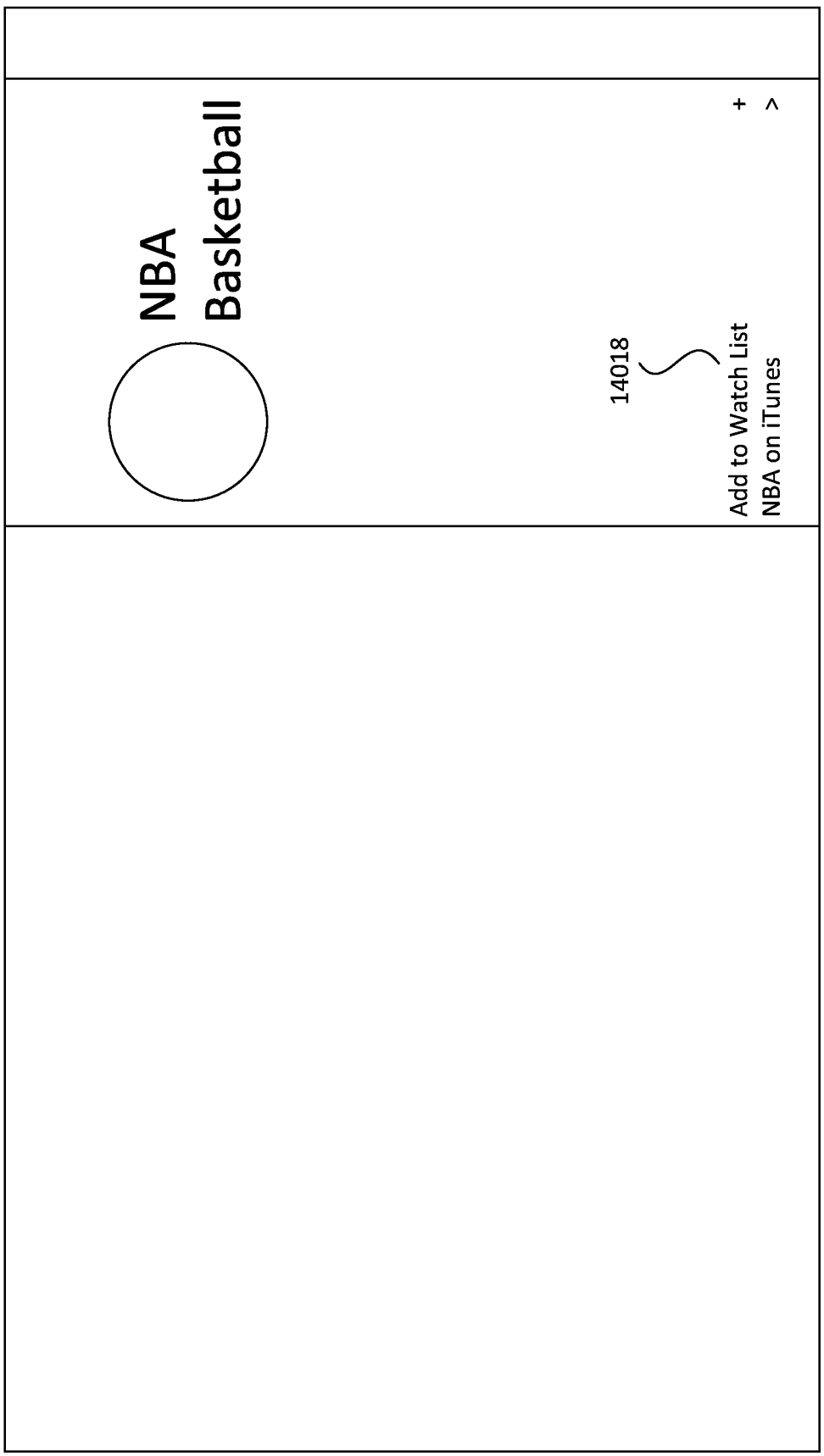
Figure 14H:
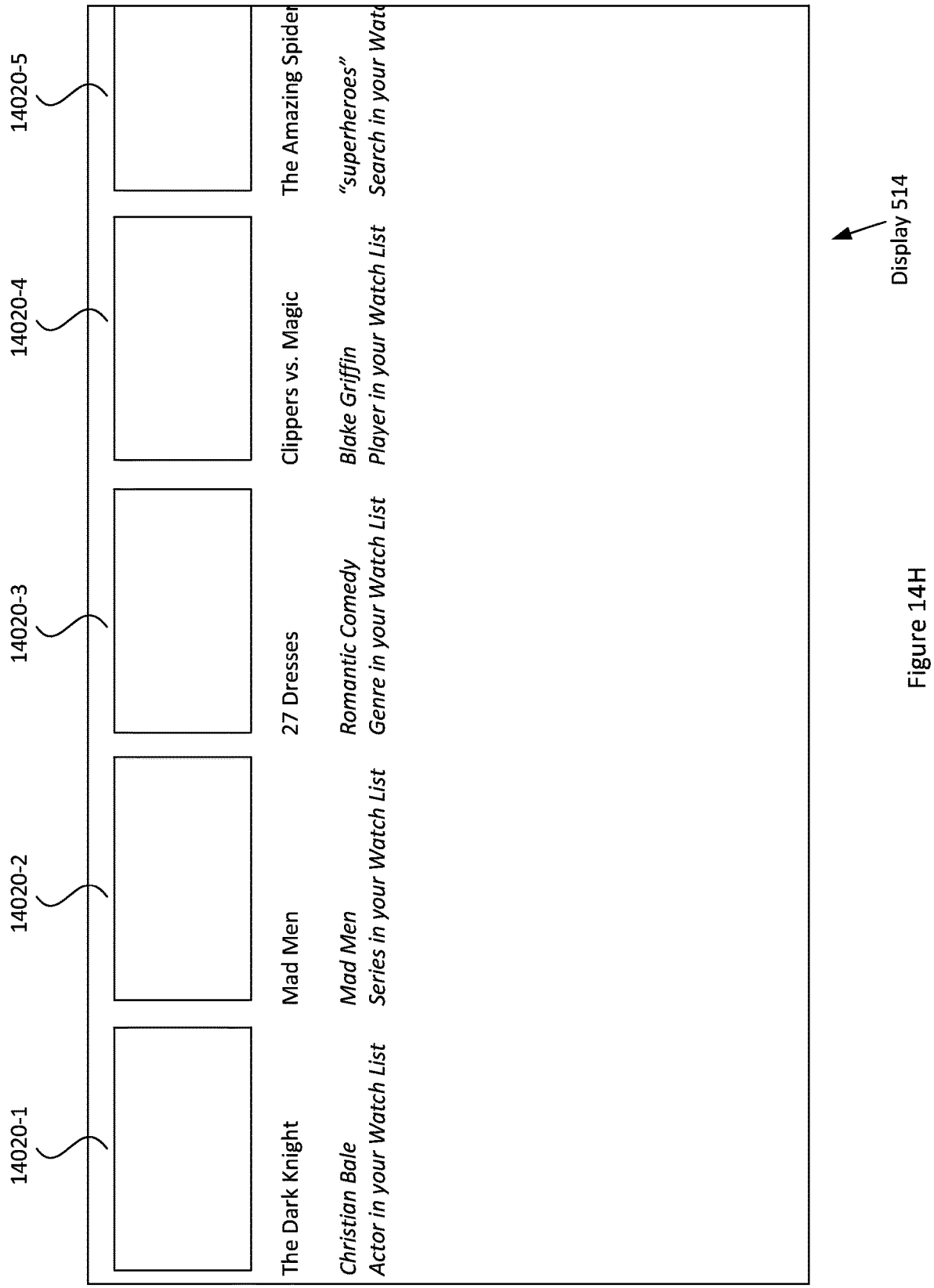

FIG. 14G illustrates an exemplary sports league user interface. The sports league user interface includes an affordance 14018 selectable for adding the sports league to the watch list. Affordance 14018 is displayed proximate to information regarding the sports league to be added to the watch list. Adding the sports league to the watch list causes menu items and/or columns each corresponding to one or more games and other content items related to the sports league to be displayed in the watch list user interface. In some embodiments, content items related to the sports league that are released after the sports league is added to the watch list will optionally be automatically added to the watch list as they are released.

FIG. 14H illustrates an exemplary watch list user interface. The watch list user interface includes columns 14020-1, 14020-2, 14020-3, 14020-4, and 14020-5, each corresponding to a content item or content series added based on a content item or non-content item added to the watch list. In some embodiments, information regarding why a content item is in the watch list is optionally displayed proximate to information regarding the content item. For example, in column 14020-1, "The Dark Knight" appears in the watch list because the actor Christian Bale, who is in the cast of "The Dark Knight," was added to the watch list. In column 14020-2, the series "Mad Men" appears in the watch list because the series was added to the watch list. In column 14020-3, "27 Dresses" appears in the watch list because the genre "Romantic Comedy" was added to the watch list. In column 14020-4, the basketball game "Clippers vs. Magic" appears in the watch list because the player Blake Griffin (who plays for the Clippers) was added to the watch list. In column 14020-5, "The Amazing Spider-Man" appears in the watch list because the search term "superheroes" was added to the watch list.

Figure 15A:
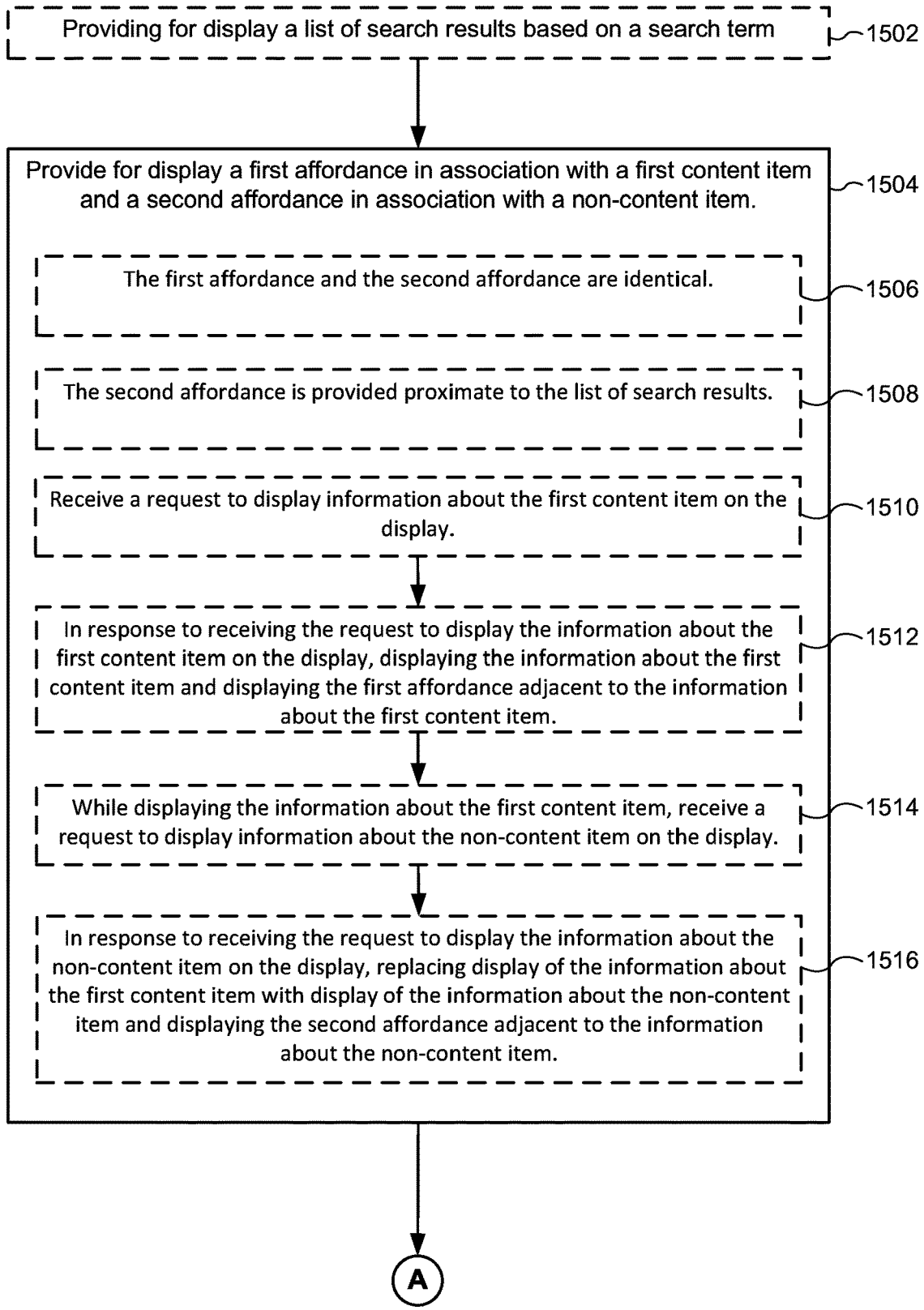
FIGS. 15A-15B are flow diagrams illustrating a method of user interfaces for adding both content and non-content items to a watch list in accordance with some embodiments.
Figure 15B:
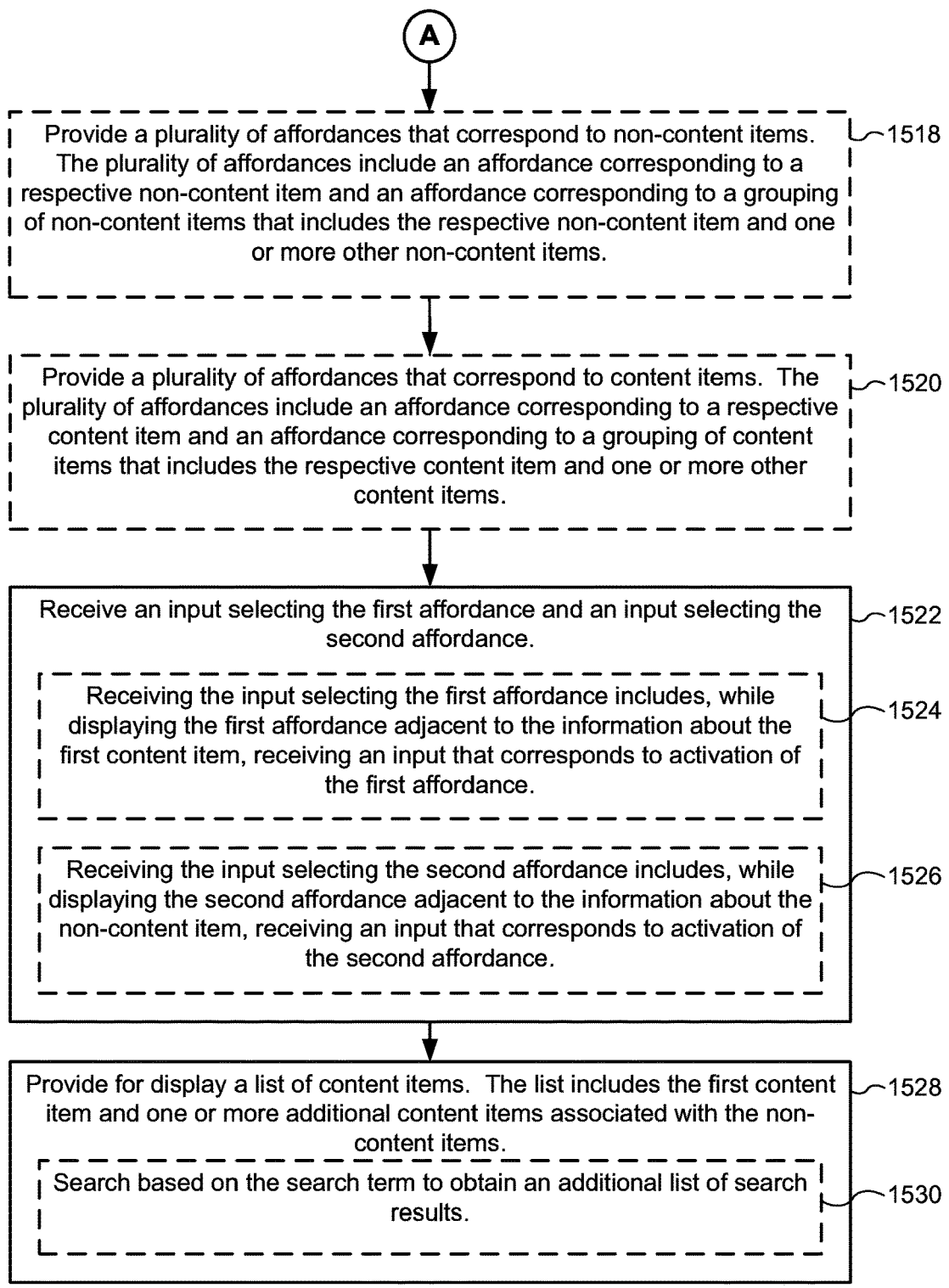

FIGS. 15A-15B are flow diagrams illustrating a method of user interfaces for adding both content and non-content items to a watch list in accordance with some embodiments. The method is optionally performed at an electronic device as described above with reference to FIGS. 1-5, including a set top box or other user interface generating device that is in communication with a remote control and a display device. Some operations in method 1500 are, optionally, combined and/or the order of some operations is, optionally, changed.

As described below, the method 1500 provides ways in which a device can display user interfaces for adding both content and non-content items to a watch list. The method reduces the cognitive burden on a user when interacting with a user interface on the device by providing intuitive user interface for selecting content items, thereby creating a more efficient human-machine interface. For battery-operated electronic devices, increasing the efficiency of the user's interaction with the user interfaces conserves power and increases the time between battery charges.

In some embodiments, an electronic device (e.g., a set top box or other user interface generating device that is in communication with a display device) with one or more processors and memory provides (1504) for display a first affordance (e.g., a button, checkbox, or other selectable user interface object) in association with a first content item (e.g., a movie, an episode, a song, a video clip, etc.) and a second affordance in association with a non-content item (e.g., an actor, a genre, a search term, etc.). For example, FIGS. 14A-14F illustrate affordances 14002, 14004, and 14006 in association with content items (a content series, an episode, and a movie, respectively), and affordances 14010, 14012, 14014, 14016, and 14018 (an actor, a search term, a genre, a sports player, and a sports league, respectively).

In some embodiments, the electronic device receives (1522) an input (e.g., a tap gesture on a touch-sensitive surface) selecting the first affordance and an input selecting the second affordance (e.g., input to add the first content item and the non-content item to a watch list). For example, input can be received selecting any of affordances 14002, 14004, 14006, 14010, 14012, 14014, 14016, and 14018 in FIGS. 14A-14F.

In some embodiments, the electronic device provides (1528) for display a list of content items (e.g., a watch list displayed as a plurality of columns, or as a plurality of menu items in a menu), the list including the first content item and one or more additional content items associated with the non-content item (e.g., movies starring the actor if the non-content item is an actor, movies from the genre if the non-content item is a genre, or results of the search if the non-content item is a search, etc.). For example, FIG. 14G illustrates a watch list of content items including items associated with various non-content items (e.g., "The Dark Knight" is associated with an actor, Christian Bale, "27 Dresses" is associated with a genre, "Romantic Comedy," etc.).

In some embodiments, the first affordance and the second affordance are optionally identical (1506) (e.g., the first and second affordances are buttons including the text "Add to Watch List"). In some embodiments, the first affordance and the second affordance are substantially identical (e.g., both affordances are buttons that include the text "Add to Watch List" so that it is clear to the user that both buttons add content associated with a currently displayed content or non-content item to the user's watch list, even if there are different shape, color, or font used in the buttons). For example, FIGS. 14A-14F illustrate affordances 14006, 14010, 14016, and 14018 as being substantially identical. Including substantially identical affordances in different portions of the user interface provide feedback to users indicating that selection of the affordances will add content associated with the affordance to the user's watchlist, even if the affordance is displayed near different types of content (e.g., actors, athletes, movies, genres, etc.)

In some embodiments, a list of search results based on a search term is optionally provided for display (1502). The second affordance is optionally provided (1508) proximate to (e.g., in association with) the list of search results (and the second affordance is generated for display proximate to the list of search results; e.g., the affordance includes the text "Add Search to Watch List"). In some embodiments, providing the list of content items optionally includes (1530) searching based on the search term to obtain an additional list of search results (and at least one of the additional search results is included in the list of content items). For example, FIG. 14D illustrates an affordance 14012 proximate to a list of search results.

In some embodiments, providing for display the first affordance in association with the first content optionally includes (1510) receiving a request to display information about the first content item on the display. In response to receiving the request to display the information about the first content item on the display, the information about the first content item is optionally displayed (1512), and the first affordance is optionally displayed adjacent to the information about the first content item. For example, in FIG. 14B, the affordance 14006 is displayed adjacent to information regarding "The Dark Knight".

While displaying the first affordance adjacent to the information about the first content item, an input is optionally received (1524) that corresponds to activation of the first affordance (e.g., a selection command received while the "add to watch list" affordance is highlighted). Providing the second affordance for display in association with the non-content item optionally includes, while displaying the information about the first content item, receiving (1514) a request to display information about the non-content item on the display. In response to receiving the request to display the information about the non-content item on the display, display of the information about the first content item is optionally replaced (1516) with display of the information about the non-content item. The second affordance is optionally displayed adjacent to the information about the non-content item. For example, in FIG. 14B, a request to display information about Christian Bale may be received if a user selects affordance 14008. Then, in FIG. 14C, an affordance 14010 is displayed adjacent to information about Christian Bale.

Receiving the input selecting the second affordance optionally includes, while displaying the second affordance adjacent to the information about the non-content item, receiving (1526) an input that corresponds to activation of the second affordance (e.g., a selection command received while the "add to watch list" affordance is highlighted). In some embodiments, one or more additional affordances are selected while navigating through a user interface that includes columns corresponding to a plurality of different content and non-content items (e.g., the user has the option of selecting from a plurality of different affordances that correspond to non-content items and a plurality of affordances that correspond to content items while navigating through a series of menus or user interfaces corresponding to the different content items and non-content items). For example, the plurality of affordances 14002, 14004, 14006, 14010, 14012, 14014, 14016, and 14018 in FIGS. 14A-14F are optionally selected while navigating through the various column user interfaces.

In some embodiments, a plurality of affordances are optionally provided (1518) that correspond to non-content items. The plurality of affordances optionally include an affordance corresponding to a respective non-content item (e.g., a sports player), and an affordance corresponding to a grouping of non-content items that includes the respective non-content item and one or more other non-content items (e.g., a team that includes the sports player or a league that includes a team). For example, FIG. 14G illustrates an affordance 14018 corresponding to a sports league.

In some embodiments, a plurality of affordances are optionally provided (1520) that correspond to content items. The plurality of affordances optionally include an affordance corresponding to a respective content item (e.g., an episode of a TV show), and an affordance corresponding to a grouping of content items that includes the respective content item and one or more other content items (e.g., a TV show that includes the episode). For example, FIG. 14A includes an affordance 14004 corresponding to an episode of "Mad Men" and an affordance 14002 corresponding to the content series "Mad Men" itself.

The operations in the information processing methods described above are, optionally, implemented by running one or more functional modules in an information processing apparatus such as general purpose processors (e.g., as described above with respect to FIGS. 1A and 3) or application specific chips.

The operations described above with reference to FIGS. 15A-15B are, optionally, implemented by components depicted in FIGS. 1A-1B. For example, providing operation 1502, providing operation 1504, providing operation 1518, providing operation 1520, receiving operation 1522, and providing operation 1528 are, optionally implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

It should be understood that the particular order in which the operations in FIGS. 15A-15B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1300) are also applicable in an analogous manner to method 1500 described above with respect to FIGS. 15A-15B. For example, the user interfaces, columns, menu items, content items, and display devices described above with reference to method 1500 optionally have one or more of the characteristics of the user interfaces, columns menu items, content items, and display devices described herein with reference to other methods described herein (e.g., methods 700, 900, 1100 and 1300). For brevity, these details are not repeated here.

Figure 16:
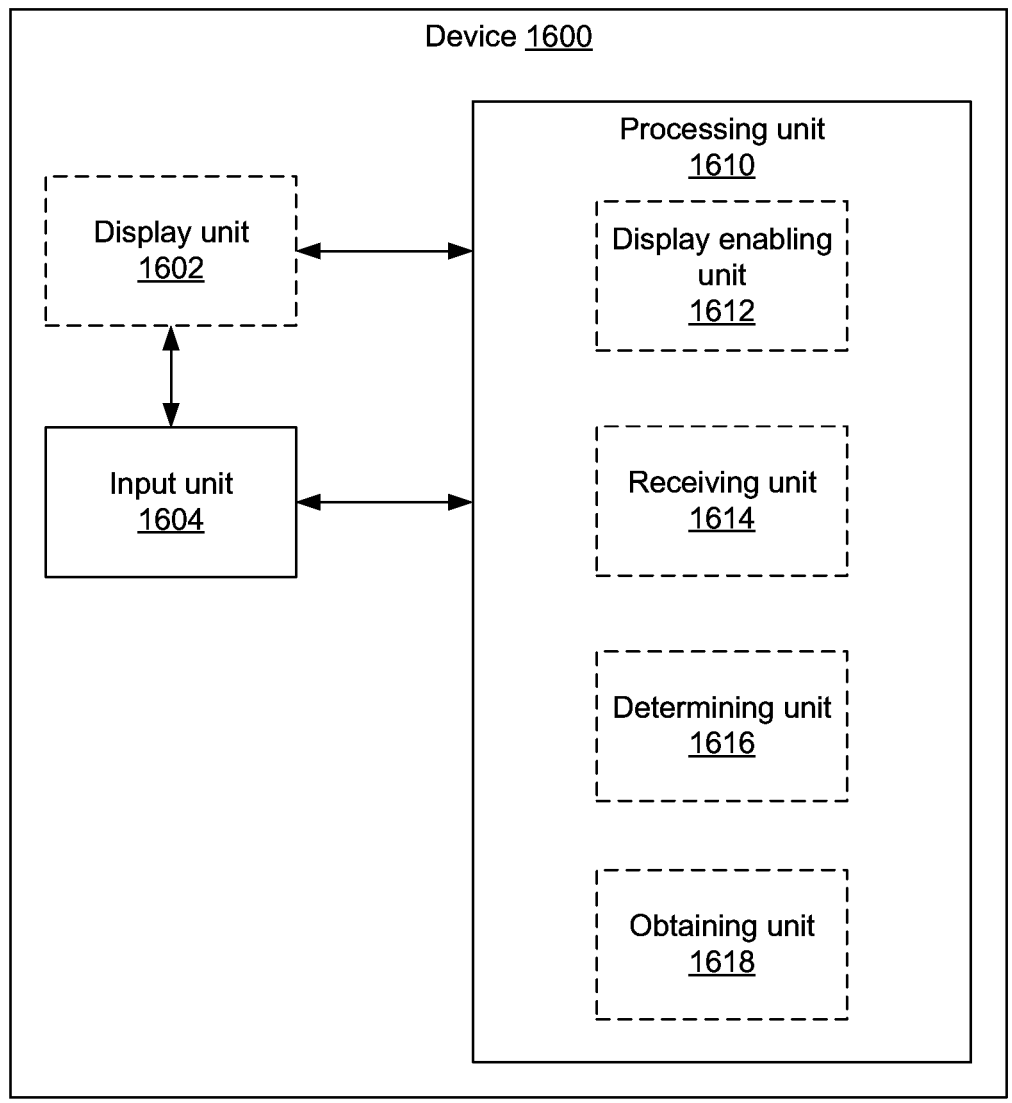
FIGS. 16-20 show functional block diagrams of electronic devices configured in accordance with the principles of the various described embodiments, in accordance with some embodiments of the disclosure.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 optionally includes a display unit 1602 configured to display a user interface including one or more user interface objects (e.g., content items, headings, etc.); an input unit 1604 to receive user input, selections, etc. (e.g., touch-sensitive surface, keyboard, mouse, or other input unit); and a processing unit 1610 coupled to the display unit 1602 and the input unit 1604. In some embodiments, the processing unit 1610 optionally includes a display enabling unit 1612, a receiving unit 1614, a determining unit 1616, and an obtaining unit 1618.

In some embodiments, the processing unit 1610 is configured to provide (e.g., with the display enabling unit 1612), for display on a display device, a user interface including a first set of columns, two or more columns in the first set of columns each including two or more menu items. The processing unit 1610 is configured to receive (e.g., with the receiving unit 1614) a selection input. In response to receiving the selection input, in accordance with a determination that the selection input corresponds to selection of a first column, the processing unit 1610 is further configured to provide (e.g., with the display enabling unit 1612), for display on the display device, a second set of columns, two or more of the columns in the second set of columns corresponding to different subsets of menu items that were displayed in the first column that was selected in response to the selection input.

In some embodiments, the processing unit 1610 is further configured to, in response to the selection input, in accordance with a determination that the selection input corresponds to selection of a menu item from the first column, provide (e.g., with the display enabling unit 1612), for display on the display device, a user interface associated with the menu item that was selected.

In some embodiments, the menu item corresponds to a content series that includes a plurality of episodes, and a respective episode of the plurality of episodes is in a watch list. The processing unit 1610 is further configured to generate (e.g., with the display enabling unit 1612) one or more links to ancillary content related to the respective episode, and the second set of columns includes the one or more links to ancillary content related to the respective episode.

In some embodiments, a first column in the second set of columns corresponds to a first menu item from the first column, and a second column in the second set of columns corresponds to a second menu item from the first column that is different from the first menu item from the first column. In some embodiments, a first column in the second set of columns corresponds to a first plurality of the menu items from the first column, and a second column in the second set of columns corresponds to a second plurality of the menu items from the first column that is different from the first plurality of menu items from the first column.

In some embodiments, the first set of columns are configured to move together when scrolled in a first direction and to move separately when scrolled in a second direction that is different from the first direction. In some embodiments, scrolling the first set of columns in the first direction includes determining (e.g., with the determining unit 1616) a selected column display position based on a position of a currently selected column with respect to a total number of the plurality of columns, and scrolling (e.g., with the display enabling unit 1612) the plurality of columns such that the currently selected column moves to the selected column display position on the display device.

In some embodiments, the processing unit 1610 is further configured to receive (e.g., with the receiving unit 1614) second input to advance from the first column to a second column, and, in response to the second input, alter (e.g., with the display enabling unit 1612) a visual characteristic of one or both of the first column and the second column. In some embodiments, altering the visual characteristic includes increasing a visual emphasis (e.g., with the display enabling unit 1612) of the second column relative to a visual emphasis of the first column. In some embodiments, altering the visual characteristic includes displaying (e.g., with the display enabling unit 1612) additional information on the second column. In some embodiments, altering the visual characteristic includes increasing (e.g., with the display enabling unit 1612) a spatial property of the second column relative to a spatial property of the first column.

In some embodiments, the user interface has at least one background color, and the processing unit 1610 is further configured to receive (e.g., with the receiving unit 1614) second input to advance from a first menu item of the first column to a second menu item of the first column, obtain (e.g., with the obtaining unit 1618) a color associated with a logo of the second menu item, and alter (e.g., with the display enabling unit 1612) the background color of the user interface in accordance with the color associated with the logo of the second menu item.

In some embodiments, the first column includes first and second headings, and the processing unit 1610 is further configured to receive (e.g., with the receiving unit 1614) a scrolling input corresponding to the first column. In response to the scrolling input, the processing unit 1610 is further configured to scroll (e.g., with the display enabling unit 1612) the menu items of the first column, wherein the first heading remains stationary during the scrolling of the menu items of the first column, scroll (e.g., with the display enabling unit 1612) the first heading off an edge of the user interface, such that the first heading is no longer visible in the user interface after scrolling the first heading off the edge of the user interface, and replace (e.g., with the display enabling unit 1612) the first heading with the second heading, such that the second heading remains stationary during scrolling after replacing the first heading.

In some embodiments, the first set of columns is generated based on a partial search term, and the processing unit 1610 is further configured to generate (e.g., with the display enabling unit 1612) for display a search suggestions column in the first set of columns, the search suggestions column comprising a plurality of search suggestions, wherein a respective search suggestion of the plurality of search suggestions is highlighted, generate (e.g., with the display enabling unit 1612) for display a search results column in the first set of columns, the search suggestions column comprising a plurality of search results corresponding to the respective search suggestion, and receive (e.g., with the receiving unit 1614) a selection of the respective search suggestion. In response to the selection of the respective search suggestion, the processing unit 1610 is further configured to generate (e.g., with the display enabling unit 1612) for display a plurality of search results columns, including two or more search results columns that each correspond to one search result of the plurality of search results.

In some embodiments, providing the user interface including the first set of columns includes generating (e.g., with the display enabling unit 1612) representations of a plurality of content items including a plurality of on-demand content items and a plurality of live content items, wherein two or more of the representations of on-demand content items include static images corresponding to the on-demand content and two or more of the representations of live content items include live video corresponding to the live content.

In some embodiments, the processing unit 1610 is further configured to determine (e.g., with the determining unit 1616) whether a first content item of the plurality of content items is an on-demand content item or a live content item, in accordance with a determination that the first content item is an on-demand content item, obtain (e.g., with the obtaining unit 1618) a static image corresponding to the on-demand content item, and in accordance with a determination that the first content item is a live content item, obtain (e.g., with the obtaining unit 1618) a live video corresponding to the live content item. In some embodiments, obtaining the static image includes capturing (e.g., with the obtaining unit 1618) the static image from video corresponding to the on-demand content item. In some embodiments, the live video includes live video of a live sporting event, and the static images represent one or more of completed sporting events, upcoming sporting events, and highlight reels.

In some embodiments, the first set of columns includes a first recent content column and a second recent content column, and each of the first and second recent content columns includes content corresponding to a different category of recent content. In some embodiments, the first recent content column only includes content that has been viewed past a predetermined threshold.

In some embodiments, the first column of the first set of columns is a first type of column and a second column of the first set of columns is a second type of column, and the processing unit 1610 is further configured to, while the first column is selected, receive (e.g., with the receiving unit 1614) a first navigation input. In response to receiving the first navigation input, the processing unit 1610 is further configured to select (e.g., with the display enabling unit 1612) a different column of the first set of columns, and, while the second column is selected, receive (e.g., with the receiving unit 1614) a second navigation input. In response to receiving the second navigation input, the processing unit 1610 is further configured to maintain selection (e.g., with the display enabling unit 1612) of the second column and navigate (e.g., with the display enabling unit 1612) among multiple menu items in a row of the second column.

Figure 17:
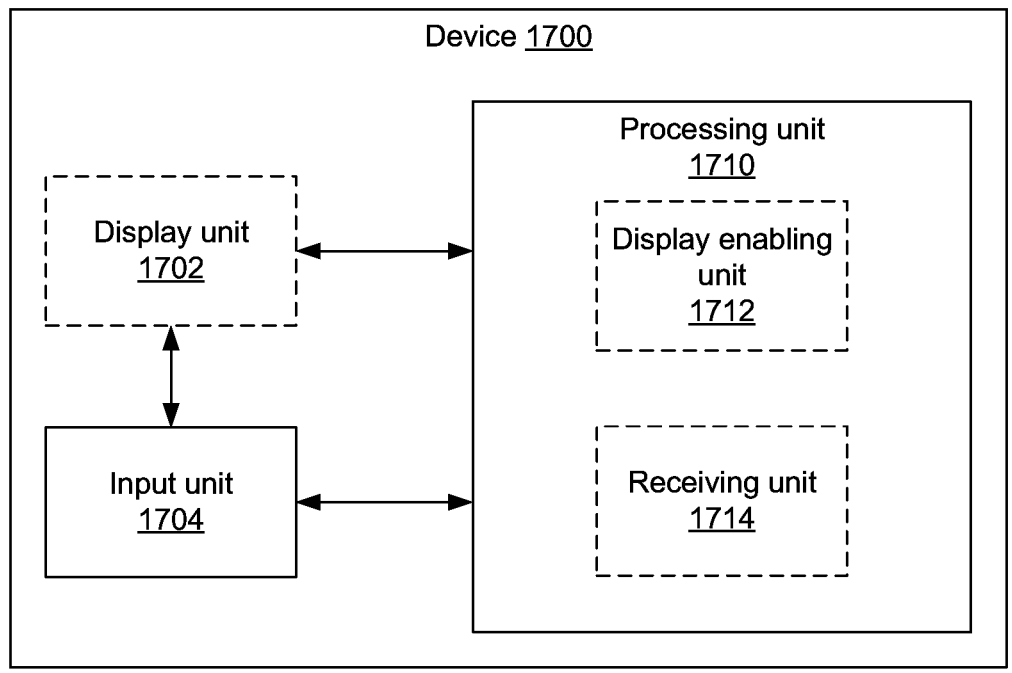

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 optionally includes a display unit 1702 configured to display a user interface including one or more user interface objects (e.g., content items, headings, etc.); an input unit 1704 to receive user input, selections, etc. (e.g., touch-sensitive surface, keyboard, mouse, or other input unit); and a processing unit 1710 coupled to the display unit 1702 and the input unit 1704. In some embodiments, the processing unit 1710 optionally includes a display enabling unit 1712 and a receiving unit 1714.

In some embodiments, the processing unit 1710 is configured to, while a user interface that includes visual content is displayed on a display, receive (e.g., with the receiving unit 1714) a request to display a menu for controlling the visual content that is displayed in the user interface. In response to receiving the request to display the menu, the processing unit 1710 is further configured to provide (e.g., with the display enabling unit 1712), for display on the display device, an updated user interface that includes the menu, and the menu includes at least one translucent portion with a first degree of translucency, so that an indication of the visual content in the user interface can be seen through the translucent portion of the menu in accordance with the first degree of translucency. While the menu with the translucent portion is displayed on the display device, the processing unit 1710 is further configured to receive (e.g., with the receiving unit 1714) a request to perform an operation in the menu. In response to receiving the request to perform the operation in the menu, the processing unit 1710 is further configured to perform (e.g., with the display enabling unit 1712) the operation in the menu and change (e.g., with the display enabling unit 1712) the translucency of the translucent portion of the menu from the first degree of translucency to a second degree of translucency that is different from the first degree of translucency.

In some embodiments, the operation is a first navigation operation in a first direction, and changing the translucency of the translucent portion of the menu includes increasing (e.g., with the display enabling unit 1712) the translucency. While the menu with the translucent portion is displayed on the display device, the processing unit 1710 is further configured to receive (e.g., with the receiving unit 1714) a request to perform a navigation operation in a second direction. In response to receiving the request to perform the navigation operation in the second direction, the processing unit 1710 is further configured to perform (e.g., with the display enabling unit 1712) the navigation operation in the second direction and reduce (e.g., with the display enabling unit 1712) the translucency of the translucent portion of the menu.

In some embodiments, the operation is a navigation operation that corresponds to a request to move the menu in a respective direction, and changing the translucency of the translucent portion of the menu includes: in accordance with a determination that the respective direction is a first direction, increasing (e.g., with the display enabling unit 1712) the translucency of the translucent portion of the menu; and in accordance with a determination that the respective direction is a second direction that is different from the first direction, decreasing (e.g., with the display enabling unit 1712) the translucency of the translucent portion of the menu.

In some embodiments, performing the operation in the menu includes changing (e.g., with the display enabling unit 1712) a state of an item in the menu.

In some embodiments, the processing unit 1710 is further configured to, while the menu with the translucent portion is displayed on the display device, receive (e.g., with the receiving unit 1714) a request to dismiss the menu, and, in response to receiving the request to dismiss the menu, provide (e.g., with the display enabling unit 1712), for display on the display device, the user interface including the visual content and not including the menu.

In some embodiments, the visual content includes video content, and the processing unit 1710 is further configured to pause the video content (e.g., with the display enabling unit 1712) in response to receiving the request to display the menu, and resume the video content (e.g., with the display enabling unit 1712) in response to receiving the request to dismiss the menu. In some embodiments, the menu includes a first set of columns, two or more columns in the first set of columns each including two or more menu items.

Figure 18:
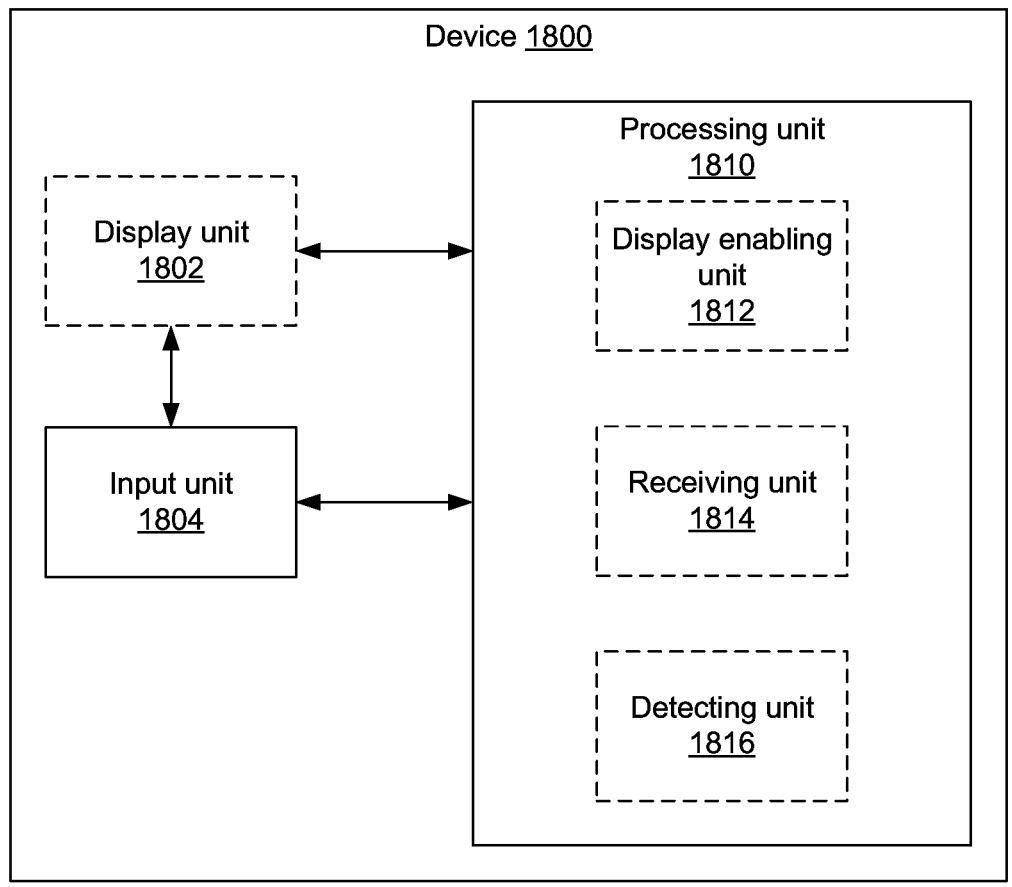

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 optionally includes a display unit 1802 configured to display a user interface including one or more user interface objects (e.g., content items, headings, etc.); an input unit 1804 to receive user input, selections, etc. (e.g., touch-sensitive surface, keyboard, mouse, or other input unit); and a processing unit 1810 coupled to the display unit 1802 and the input unit 1804. In some embodiments, the processing unit 1810 optionally includes a display enabling unit 1812, a receiving unit 1814, and a detecting unit 1816.

In some embodiments, the processing unit 1810 is configured to detect (e.g., with the detecting unit 1816) that a column display condition has been met. In response to detecting that the column display condition has been met, the processing unit 1810 is further configured to provide (e.g., with the display enabling unit 1812) a user interface for presentation on a display, the user interface including at least a portion of a first column proximate to a first edge of the display. The processing unit 1810 is further configured to receive input (e.g., with the receiving unit 1814). In response to the input, the processing unit 1810 is further configured to provide (e.g., with the display enabling unit 1812) for display an animation including the first column moving away from the first edge of the display to a location on the display that is proximate to a second edge of the display, the second edge being opposite the first edge, and a second column gradually appearing from the first edge of the display, such that a plurality of columns including the first and second columns fills the display from the first edge to the second edge.

In some embodiments, detecting that the column display condition has been met does not include receiving directional input, and receiving the input includes receiving (e.g., with the receiving unit 1814) directional input in a first direction. In some embodiments, the directional input includes a magnitude, and the animation further includes moving (e.g., with the display enabling unit 1812) the second column in accordance with the magnitude of the directional input. In some embodiments, video content is displayed on the display (e.g., with the display enabling unit 1812) when the column display condition is met, the user interface includes an overlay on the video content, and the first column includes content selected based on the video content being displayed.

In some embodiments, video content is displayed on the display (e.g., with the display enabling unit 1812) when the column display condition is met, the user interface includes an overlay on the video content; and detecting the column display condition includes detecting (e.g., with the detecting unit 1816) selection of a menu button. In some embodiments, passive content is displayed on the display (e.g., with the display enabling unit 1812) when the column display condition is met, the user interface includes an overlay on the passive content, and detecting the column display condition includes detecting (e.g., with the detecting unit 1816) user presence proximate to the display. In some embodiments, the plurality of columns is included in a first set of columns, two or more columns in the first set of columns each including two or more menu items.

Figure 19:
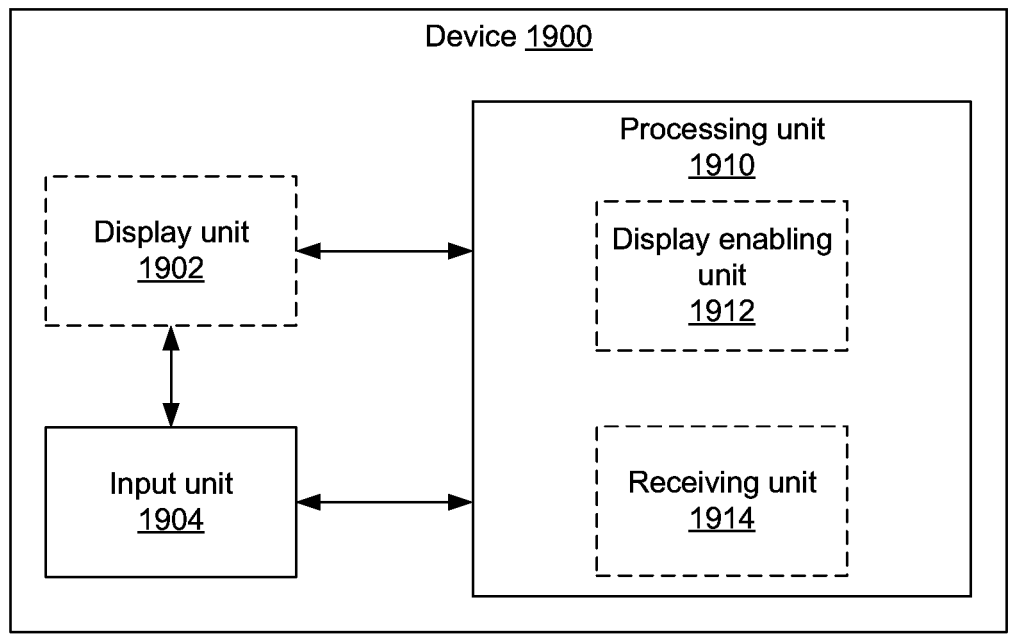

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 optionally includes a display unit 1902 configured to display a user interface including one or more user interface objects (e.g., content items, headings, etc.); an input unit 1904 to receive user input, selections, etc. (e.g., touch-sensitive surface, keyboard, mouse, or other input unit); and a processing unit 1910 coupled to the display unit 1902 and the input unit 1904. In some embodiments, the processing unit 1910 optionally includes a display enabling unit 1912 and a receiving unit 1914.

In some embodiments, the processing unit 1910 is configured to receive (e.g., with the receiving unit 1914) a request for information about a content series that has a release status. In response to receiving the request, the processing unit 1910 is further configured to provide (e.g., with the display enabling unit 1912) a user interface for display on a display that includes information about the content series, including respective contextual information that is based on the release status of the content series. In accordance with a determination that the release status is a first release status, the respective contextual information is first contextual information provided based on recent release-status activity for the content series, and in accordance with a determination that the release status is a second release status, different from the first release status, the respective contextual information is second contextual information provided without reference to recent release-status activity for the content series.

In some embodiments, the first contextual information includes an affordance that, when selected, causes (e.g., with the display enabling unit 1912) an episode of the content series to be provided for display on the display, and the second contextual information includes information indicating when a next episode of the content series will be available for presentation without including an affordance that, when selected, causes (e.g., with the display enabling unit 1912) an episode of the content series to be presented for display.

In some embodiments, the release status is cancelled and the respective contextual information includes a first episode of the content series. In some embodiments, the first release status is currently releasing and a most recently released episode is marked as watched, and providing the first contextual information based on recent release-status activity includes providing, for display, (e.g., with the display enabling unit 1912) a date of a next releasing episode.

In some embodiments, the first release status is currently releasing and a most recently released episode is not marked as watched, providing the first contextual information based on recent release-status activity includes providing (e.g., with the display enabling unit 1912) an affordance for presenting a most recently released episode of the content series, and the processing unit 1910 is further configured to receive (e.g., with the receiving unit 1914) a selection of the affordance. In response to receiving the selection of the affordance, the processing unit 1910 is further configured to provide (e.g., with the display enabling unit 1912) for display the most recently released episode of the content series.

In some embodiments, the first release status is currently releasing and an episode of the content series is currently airing live on a respective channel, and providing the first contextual information based on recent release-status activity includes providing (e.g., with the display enabling unit 1912) an affordance for providing for display the respective channel on which the episode is currently airing live, and the processing unit 1910 is further configured to receive (e.g., with the receiving unit 1914) a selection of the affordance. In response to receiving the selection of the affordance, the processing unit 1910 is further configured to provide (e.g., with the display enabling unit 1912) for display the respective channel on which the episode is currently airing live.

In some embodiments, the user interface includes a plurality of columns, two or more of the plurality of columns including two or more menu items, wherein a first column of the plurality of columns includes the respective contextual information that is based on the release status of the content series.

Figure 20:
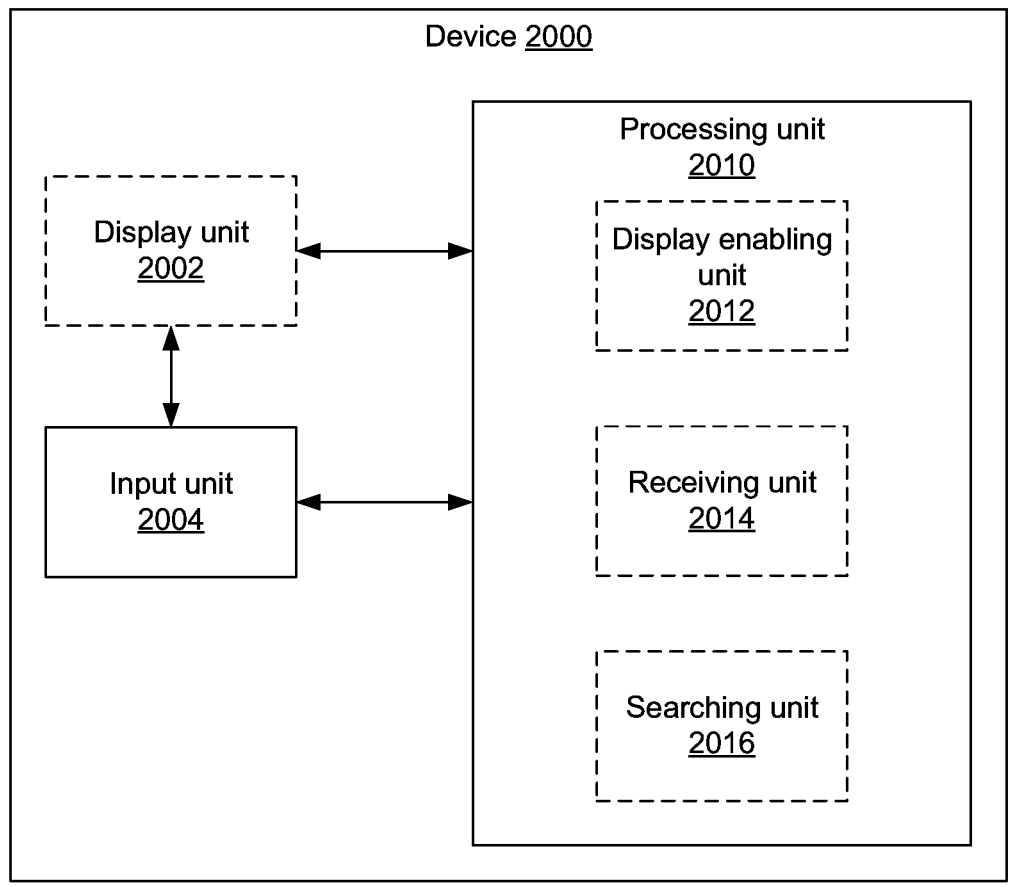

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 optionally includes a display unit 2002 configured to display a user interface including one or more user interface objects (e.g., content items, headings, etc.); an input unit 2004 to receive user input, selections, etc. (e.g., touch-sensitive surface, keyboard, mouse, or other input unit); and a processing unit 2010 coupled to the display unit 2002 and the input unit 2004. In some embodiments, the processing unit 2010 optionally includes a display enabling unit 2012, a receiving unit 2014, and a searching unit 2016.

In some embodiments, the processing unit 2010 is configured to provide (e.g., with the display enabling unit 2012) for display a first affordance in association with a first content item and a second affordance in association with a non-content item. The processing unit 2010 is further configured to receive (e.g., with the receiving unit 2014) an input selecting the first affordance and an input selecting the second affordance, and provide (e.g., with the display enabling unit 2012) for display a list of content items, the list including the first content item and one or more additional content items associated with the non-content item. In some embodiments, the first affordance and the second affordance are identical.

In some embodiments, the processing unit 2010 is further configured to provide (e.g., with the display enabling unit 2012) for display a list of search results based on a search term, wherein the second affordance is provided proximate to the list of search results. In some embodiments, providing the list of content items includes searching (e.g., with the searching unit 2016) based on the search term to obtain an additional list of search results.

In some embodiments, providing for display the first affordance in association with the first content includes receiving (e.g., with the receiving unit 2014) a request to display information about the first content item on the display and, in response to receiving the request to display the information about the first content item on the display, displaying (e.g., with the display enabling unit 2012) the information about the first content item and displaying the first affordance adjacent to the information about the first content item. Receiving the input selecting the first affordance includes, while displaying the first affordance adjacent to the information about the first content item, receiving (e.g., with the receiving unit 2014) an input that corresponds to activation of the first affordance. Providing for display the second affordance in association with the non-content item includes, while displaying the information about the first content item, receiving (e.g., with the receiving unit 2014) a request to display information about the non-content item on the display and, in response to receiving the request to display the information about the non-content item on the display, replacing (e.g., with the display enabling unit 2012) display of the information about the first content item with display of the information about the non-content item and displaying (e.g., with the display enabling unit 2012) the second affordance adjacent to the information about the non-content item. Receiving the input selecting the second affordance includes, while displaying the second affordance adjacent to the information about the non-content item, receiving (e.g., with the receiving unit 2014) an input that corresponds to activation of the second affordance.

In some embodiments, the processing unit 2010 is further configured to provide (e.g., with the display enabling unit 2012) a plurality of affordances that correspond to non-content items, the plurality of affordances including: an affordance corresponding to a respective non-content item, and an affordance corresponding to a grouping of non-content items that includes the respective non-content item and one or more other non-content items.

In some embodiments, the processing unit 2010 is further configured to provide (e.g., with the display enabling unit 2012) a plurality of affordances that correspond to content items, the plurality of affordances including: an affordance corresponding to a respective content item, and an affordance corresponding to a grouping of content items that includes the respective content item and one or more other content items.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method for displaying columns in a user interface, the method comprising:
    at an electronic device with one or more processors and memory:
        providing, for display on a display device, a user interface including a first set of columns, two or more columns in the first set of columns each including two or more menu items, wherein the first set of columns includes a first column including a first menu item and a second menu item, different from the first menu item;
        receiving a selection input; and
        in response to receiving the selection input, in accordance with a determination that the selection input corresponds to selection of the first column in the first set of columns, providing, for display on the display device, a second set of columns including:
            a first column in the second set of columns that corresponds to the first menu item that was displayed in the first column in the first set of columns, wherein the first column in the second set of columns includes information, corresponding to the first menu item, that was not displayed in the first column in the first set of columns; and
            a second column in the second set of columns that corresponds to the second menu item that was displayed in the first column in the first set of columns, wherein the second column in the second set of columns includes information, corresponding to the second menu item, that was not displayed in the first column in the first set of columns.

2. The method of claim 1, further comprising, in response to the selection input:
    in accordance with a determination that the selection input corresponds to selection of a menu item from the first column in the first set of columns, providing, for display on the display device, a user interface associated with the menu item that was selected.

3. The method of claim 2, wherein the menu item corresponds to a content series that includes a plurality of episodes, and wherein a respective episode of the plurality of episodes is in a watch list, the method further comprising:
    generating one or more links to ancillary content related to the respective episode, wherein the second set of columns includes the one or more links to ancillary content related to the respective episode.

4. The method of claim 2, wherein the user interface associated with the menu item that was selected is provided for display without displaying the first set of columns or the second set of columns.

5. The method of claim 1, wherein:
    the first column in the second set of columns corresponds to a first plurality of the menu items from the first column in the first set of columns; and the second column in the second set of columns corresponds to a second plurality of the menu items from the first column in the first set of columns that is different from the first plurality of menu items from the first column in the first set of columns.

6. The method of claim 1, wherein the first set of columns are configured to move together when scrolled in a first direction and to move separately when scrolled in a second direction that is different from the first direction.

7. The method of claim 6, wherein scrolling the first set of columns in the first direction includes:
   determining a selected column display position based on a position of a currently selected column with respect to a total number of the plurality of columns; and
   scrolling the plurality of columns such that the currently selected column moves to the selected column display position on the display device.

8. The method of claim 1, the method further comprising:
   receiving second input to advance from the first column in the first set of columns to a second column in the first set of columns; and
   in response to the second input, altering a visual characteristic of one or both of the first column and the second column in the first set of columns.

9. The method of claim 8, wherein altering the visual characteristic includes increasing a visual emphasis of the second column in the first set of columns relative to a visual emphasis of the first column in the first set of columns.

10. The method of claim 8, wherein altering the visual characteristic includes displaying additional information on the second column in the first set of columns.

11. The method of claim 8, wherein altering the visual characteristic includes increasing a spatial property of the second column in the first set of columns relative to a spatial property of the first column in the first set of columns.

12. The method of claim 1, wherein the user interface has at least one background color, the method further comprising:
   receiving second input to advance from a first menu item of the first column in the first set of columns to a second menu item of the first column in the first set of columns;
   obtaining a color associated with a logo of the second menu item; and
   altering the background color of the user interface in accordance with the color associated with the logo of the second menu item.

13. The method of claim 1, wherein the first column in the first set of columns includes first and second headings, the method further comprising:
   receiving a scrolling input corresponding to the first column in the first set of columns; and
   in response to the scrolling input:
      scrolling the menu items of the first column in the first set of columns, wherein the first heading remains stationary during the scrolling of the menu items of the first column in the first set of columns;
      scrolling the first heading off an edge of the user interface, such that the first heading is no longer visible in the user interface after scrolling the first heading off the edge of the user interface; and
      replacing the first heading with the second heading, such that the second heading remains stationary during scrolling after replacing the first heading.

14. The method of claim 1, wherein the first set of columns is generated based on a partial search term, the method further comprising:

generating for display a search suggestions column in the first set of columns, the search suggestions column comprising a plurality of search suggestions, wherein a respective search suggestion of the plurality of search suggestions is highlighted;
generating for display a search results column in the first set of columns, the search results column comprising a plurality of search results corresponding to the respective search suggestion;
receiving a selection of the respective search suggestion; and
in response to the selection of the respective search suggestion, generating for display a plurality of search results columns, including two or more search results columns that each correspond to one search result of the plurality of search results.

15. The method of claim 1, wherein providing the user interface including the first set of columns includes:
   generating representations of a plurality of content items including a plurality of on-demand content items and a plurality of live content items, wherein two or more of the representations of on-demand content items include static images corresponding to the on-demand content and two or more of the representations of live content items include live video corresponding to the live content.

16. The method of claim 15, the method further comprising:
   determining whether a first content item of the plurality of content items is an on-demand content item or a live content item;
   in accordance with a determination that the first content item is an on-demand content item, obtaining a static image corresponding to the on-demand content item; and
   in accordance with a determination that the first content item is a live content item, obtaining a live video corresponding to the live content item.

17. The method of claim 16, wherein obtaining the static image includes capturing the static image from video corresponding to the on-demand content item.

18. The method of claim 15, wherein the live video includes live video of a live sporting event, and the static images represent one or more of completed sporting events, upcoming sporting events, and highlight reels.

19. The method of claim 1, wherein the first set of columns includes a first recent content column and a second recent content column, and each of the first and second recent content columns includes content corresponding to a different category of recent content.

20. The method of claim 19, wherein the first recent content column only includes content that has been viewed past a predetermined threshold.

21. The method of claim 1, wherein the first column of the first set of columns is a first type of column and the second column of the first set of columns is a second type of column, the method further comprising:
   while the first column of the first set of columns is selected, receiving a first navigation input;
   in response to receiving the first navigation input, selecting a different column of the first set of columns;
   while the second column of the first set of columns is selected, receiving a second navigation input; and
   in response to receiving the second navigation input, maintaining selection of the second column of the first set of columns and navigating among multiple menu items in a row of the second column of the first set of columns.

22. The method of claim 1, further comprising:
in response to receiving the selection input, in accordance with the determination that the selection input corresponds to selection of the first column of the first set of columns, ceasing the display of the first set of columns.

23. The method of claim 1, wherein the selection input that corresponds to the selection of the first column comprises selection of an area of the first column outside of the first menu item and the second menu item, the method further comprising:
in response to receiving the selection input, in accordance with a determination that the selection input comprises selection of the first menu item:
forgoing providing for display, on the display device, the second set of columns; and
displaying, on the display device, a user interface corresponding to the first menu item.

24. An electronic device for displaying columns in a user interface, comprising:
one or more processors;
memory; and
one or more programs, wherein the one or more programs are stored in the memory and configured to be executed by the one or more processors, the one or more programs including instructions for:
providing, for display on a display device, a user interface including a first set of columns, two or more columns in the first set of columns each including two or more menu items, wherein the first set of columns includes a first column including a first menu item and a second menu item, different from the first menu item;
receiving a selection input; and
in response to receiving the selection input, in accordance with a determination that the selection input corresponds to selection of the first column in the first set of columns, providing, for display on the display device, a second set of columns including:
a first column in the second set of columns that corresponds to the first menu item that was displayed in the first column in the first set of columns, wherein the first column in the second set of columns includes information, corresponding to the first menu item, that was not displayed in the first column in the first set of columns; and
a second column in the second set of columns that corresponds to the second menu item that was displayed in the first column in the first set of columns, wherein the second column in the second set of columns includes information, corresponding to the second menu item, that was not displayed in the first column in the first set of columns.

25. The electronic device of claim 24, the one or more programs further including instructions for, in response to the selection input:
in accordance with a determination that the selection input corresponds to selection of a menu item from the first column in the first set of columns, providing, for display on the display device, a user interface associated with the menu item that was selected.

26. The electronic device of claim 25, wherein the menu item corresponds to a content series that includes a plurality of episodes, and wherein a respective episode of the plurality of episodes is in a watch list, the one or more programs further including instructions for:
generating one or more links to ancillary content related to the respective episode, wherein the second set of columns includes the one or more links to ancillary content related to the respective episode.

27. The electronic device of claim 25, wherein the user interface associated with the menu item that was selected is provided for display without displaying the first set of columns or the second set of columns.

28. The electronic device of claim 24, wherein:
the first column in the second set of columns corresponds to a first plurality of the menu items from the first column in the first set of columns; and
the second column in the second set of columns corresponds to a second plurality of the menu items from the first column in the first set of columns that is different from the first plurality of menu items from the first column in the first set of columns.

29. The electronic device of claim 24, wherein the first set of columns are configured to move together when scrolled in a first direction and to move separately when scrolled in a second direction that is different from the first direction.

30. The electronic device of claim 29, wherein scrolling the first set of columns in the first direction includes:
determining a selected column display position based on a position of a currently selected column with respect to a total number of the plurality of columns; and
scrolling the plurality of columns such that the currently selected column moves to the selected column display position on the display device.

31. The electronic device of claim 24, the one or more programs further including instructions for:
receiving second input to advance from the first column in the first set of columns to a second column in the first set of columns; and
in response to the second input, altering a visual characteristic of one or both of the first column and the second column in the first set of columns.

32. The electronic device of claim 31, wherein altering the visual characteristic includes increasing a visual emphasis of the second column in the first set of columns relative to a visual emphasis of the first column in the first set of columns.

33. The electronic device of claim 31, wherein altering the visual characteristic includes displaying additional information on the second column in the first set of columns.

34. The electronic device of claim 31, wherein altering the visual characteristic includes increasing a spatial property of the second column in the first set of columns relative to a spatial property of the first column in the first set of columns.

35. The electronic device of claim 24, wherein the user interface has at least one background color, the one or more programs further including instructions for:
receiving second input to advance from a first menu item of the first column in the first set of columns to a second menu item of the first column in the first set of columns;
obtaining a color associated with a logo of the second menu item; and
altering the background color of the user interface in accordance with the color associated with the logo of the second menu item.

36. The electronic device of claim 24, wherein the first column in the first set of columns includes first and second headings, the one or more programs further including instructions for:
receiving a scrolling input corresponding to the first column in the first set of columns; and
in response to the scrolling input:

scrolling the menu items of the first column in the first set of columns, wherein the first heading remains stationary during the scrolling of the menu items of the first column in the first set of columns;

scrolling the first heading off an edge of the user interface, such that the first heading is no longer visible in the user interface after scrolling the first heading off the edge of the user interface; and replacing the first heading with the second heading, such that the second heading remains stationary during scrolling after replacing the first heading.

37. The electronic device of claim 24, wherein the first set of columns is generated based on a partial search term, the one or more programs further including instructions for:

generating for display a search suggestions column in the first set of columns, the search suggestions column comprising a plurality of search suggestions, wherein a respective search suggestion of the plurality of search suggestions is highlighted;

generating for display a search results column in the first set of columns, the search results column comprising a plurality of search results corresponding to the respective search suggestion;

receiving a selection of the respective search suggestion; and in response to the selection of the respective search suggestion, generating for display a plurality of search results columns, including two or more search results columns that each correspond to one search result of the plurality of search results.

38. The electronic device of claim 24, wherein providing the user interface including the first set of columns includes:

generating representations of a plurality of content items including a plurality of on-demand content items and a plurality of live content items, wherein two or more of the representations of on-demand content items include static images corresponding to the on-demand content and two or more of the representations of live content items include live video corresponding to the live content.

39. The electronic device of claim 38, the one or more programs further including instructions for:

determining whether a first content item of the plurality of content items is an on-demand content item or a live content item;

in accordance with a determination that the first content item is an on-demand content item, obtaining a static image corresponding to the on-demand content item; and in accordance with a determination that the first content item is a live content item, obtaining a live video corresponding to the live content item.

40. The electronic device of claim 39, wherein obtaining the static image includes capturing the static image from video corresponding to the on-demand content item.

41. The electronic device of claim 38, wherein the live video includes live video of a live sporting event, and the static images represent one or more of completed sporting events, upcoming sporting events, and highlight reels.

42. The electronic device of claim 24, wherein the first set of columns includes a first recent content column and a second recent content column, and each of the first and second recent content columns includes content corresponding to a different category of recent content.

43. The electronic device of claim 42, wherein the first recent content column only includes content that has been viewed past a predetermined threshold.

44. The electronic device of claim 24, wherein the first column of the first set of columns is a first type of column and the second column of the first set of columns is a second type of column, the one or more programs further including instructions for:

while the first column of the first set of columns is selected, receiving a first navigation input;

in response to receiving the first navigation input, selecting a different column of the first set of columns;

while the second column of the first set of columns is selected, receiving a second navigation input; and in response to receiving the second navigation input, maintaining selection of the second column of the first set of columns and navigating among multiple menu items in a row of the second column of the first set of columns.

45. The electronic device of claim 24, the one or more programs further including instructions for:

in response to receiving the selection input, in accordance with the determination that the selection input corresponds to selection of the first column of the first set of columns, ceasing the display of the first set of columns.

46. The electronic device of claim 24, wherein the selection input that corresponds to the selection of the first column comprises selection of an area of the first column outside of the first menu item and the second menu item, the one or more programs further including instructions for:

in response to receiving the selection input, in accordance with a determination that the selection input comprises selection of the first menu item:

forgoing providing for display, on the display device, the second set of columns; and displaying, on the display device, a user interface corresponding to the first menu item.

47. A non-transitory computer readable storage medium storing one or more programs, the one or more programs comprising instructions, which when executed by an electronic device with one or more processors and memory, cause the device to:

provide, for display on a display device, a user interface including a first set of columns, two or more columns in the first set of columns each including two or more menu items, wherein the first set of columns includes a first column including a first menu item and a second menu item, different from the first menu item;

receive a selection input; and in response to receiving the selection input, in accordance with a determination that the selection input corresponds to selection of the first column in the first set of columns, provide, for display on the display device, a second set of columns including:

a first column in the second set of columns that corresponds to the first menu item that was displayed in the first column in the first set of columns, wherein the first column in the second set of columns includes information, corresponding to the first menu item, that was not displayed in the first column in the first set of columns; and a second column in the second set of columns that corresponds to the second menu item that was displayed in the first column in the first set of columns, wherein the second column in the second set of columns includes information, corresponding to the second menu item, that was not displayed in the first column in the first set of columns.

48. The non-transitory computer readable storage medium of claim 47, the instructions further causing the device to, in response to the selection input:
in accordance with a determination that the selection input corresponds to selection of a menu item from the first column in the first set of columns, provide, for display on the display device, a user interface associated with the menu item that was selected.

49. The non-transitory computer readable storage medium of claim 48, wherein the menu item corresponds to a content series that includes a plurality of episodes, and wherein a respective episode of the plurality of episodes is in a watch list, the instructions further causing the device to:
generate one or more links to ancillary content related to the respective episode, wherein the second set of columns includes the one or more links to ancillary content related to the respective episode.

50. The non-transitory computer readable storage medium of claim 48, wherein the user interface associated with the menu item that was selected is provided for display without displaying the first set of columns or the second set of columns.

51. The non-transitory computer readable storage medium of claim 47, wherein:
the first column in the second set of columns corresponds to a first plurality of the menu items from the first column in the first set of columns; and
the second column in the second set of columns corresponds to a second plurality of the menu items from the first column in the first set of columns that is different from the first plurality of menu items from the first column in the first set of columns.

52. The non-transitory computer readable storage medium of claim 47, wherein the first set of columns are configured to move together when scrolled in a first direction and to move separately when scrolled in a second direction that is different from the first direction.

53. The non-transitory computer readable storage medium of claim 52, wherein scrolling the first set of columns in the first direction includes:
determining a selected column display position based on a position of a currently selected column with respect to a total number of the plurality of columns; and
scrolling the plurality of columns such that the currently selected column moves to the selected column display position on the display device.

54. The non-transitory computer readable storage medium of claim 47, the instructions further causing the device to:
receive second input to advance from the first column in the first set of columns to a second column in the first set of columns; and
in response to the second input, alter a visual characteristic of one or both of the first column and the second column in the first set of columns.

55. The non-transitory computer readable storage medium of claim 54, wherein altering the visual characteristic includes increasing a visual emphasis of the second column in the first set of columns relative to a visual emphasis of the first column in the first set of columns.

56. The non-transitory computer readable storage medium of claim 54, wherein altering the visual characteristic includes displaying additional information on the second column in the first set of columns.

57. The non-transitory computer readable storage medium of claim 54, wherein altering the visual characteristic includes increasing a spatial property of the second column in the first set of columns relative to a spatial property of the first column in the first set of columns.

58. The non-transitory computer readable storage medium of claim 47, wherein the user interface has at least one background color, the instructions further causing the device to:
receive second input to advance from a first menu item of the first column in the first set of columns to a second menu item of the first column in the first set of columns;
obtain a color associated with a logo of the second menu item; and
alter the background color of the user interface in accordance with the color associated with the logo of the second menu item.

59. The non-transitory computer readable storage medium of claim 47, wherein the first column in the first set of columns includes first and second headings, the instructions further causing the device to:
receive a scrolling input corresponding to the first column in the first set of columns; and
in response to the scrolling input:
scroll the menu items of the first column in the first set of columns, wherein the first heading remains stationary during the scrolling of the menu items of the first column in the first set of columns;
scroll the first heading off an edge of the user interface, such that the first heading is no longer visible in the user interface after scrolling the first heading off the edge of the user interface; and
replace the first heading with the second heading, such that the second heading remains stationary during scrolling after replacing the first heading.

60. The non-transitory computer readable storage medium of claim 47, wherein the first set of columns is generated based on a partial search term, the instructions further causing the device to:
generate for display a search suggestions column in the first set of columns, the search suggestions column comprising a plurality of search suggestions, wherein a respective search suggestion of the plurality of search suggestions is highlighted;
generate for display a search results column in the first set of columns, the search results column comprising a plurality of search results corresponding to the respective search suggestion;
receive a selection of the respective search suggestion; and
in response to the selection of the respective search suggestion, generate for display a plurality of search results columns, including two or more search results columns that each correspond to one search result of the plurality of search results.

61. The non-transitory computer readable storage medium of claim 47, wherein providing the user interface including the first set of columns includes:
generating representations of a plurality of content items including a plurality of on-demand content items and a plurality of live content items, wherein two or more of the representations of on-demand content items include static images corresponding to the on-demand content and two or more of the representations of live content items include live video corresponding to the live content.

62. The non-transitory computer readable storage medium of claim 61, the instructions further causing the device to:

determine whether a first content item of the plurality of content items is an on-demand content item or a live content item;

in accordance with a determination that the first content item is an on-demand content item, obtain a static image corresponding to the on-demand content item; and in accordance with a determination that the first content item is a live content item, obtain a live video corresponding to the live content item.

63. The non-transitory computer readable storage medium of claim 62, wherein obtaining the static image includes capturing the static image from video corresponding to the on-demand content item.

64. The non-transitory computer readable storage medium of claim 61, wherein the live video includes live video of a live sporting event, and the static images represent one or more of completed sporting events, upcoming sporting events, and highlight reels.

65. The non-transitory computer readable storage medium of claim 47, wherein the first set of columns includes a first recent content column and a second recent content column, and each of the first and second recent content columns includes content corresponding to a different category of recent content.

66. The non-transitory computer readable storage medium of claim 65, wherein the first recent content column only includes content that has been viewed past a predetermined threshold.

67. The non-transitory computer readable storage medium of claim 47, wherein the first column of the first set of columns is a first type of column and the second column of the first set of columns is a second type of column, the instructions further causing the device to:

while the first column of the first set of columns is selected, receive a first navigation input;

in response to receiving the first navigation input, select a different column of the first set of columns;

while the second column of the first set of columns is selected, receive a second navigation input; and in response to receiving the second navigation input, maintain selection of the second column of the first set of columns and navigating among multiple menu items in a row of the second column of the first set of columns.

68. The non-transitory computer readable storage medium of claim 47, the instructions further causing the device to:

in response to receiving the selection input, in accordance with the determination that the selection input corresponds to selection of the first column of the first set of columns, cease the display of the first set of columns.

69. The non-transitory computer readable storage medium of claim 47, wherein the selection input that corresponds to the selection of the first column comprises selection of an area of the first column outside of the first menu item and the second menu item, the instructions further causing the device to:

in response to receiving the selection input, in accordance with a determination that the selection input comprises selection of the first menu item:

forgo providing for display, on the display device, the second set of columns; and display, on the display device, a user interface corresponding to the first menu item.

\* \* \* \* \*